United States Patent [19]
Alexander

[11] 3,790,767
[45] Feb. 5, 1974

[54] PULSE ANALYZING TESTER

[76] Inventor: Arthur Duane Alexander, 4412 Embleton Dr., Raleigh, N.C. 27609

[22] Filed: Dec. 4, 1972

[21] Appl. No.: 311,584

Related U.S. Application Data

[63] Continuation of Ser. No. 88,298, Nov. 10, 1970.

[52] U.S. Cl... 235/151.31, 235/92 MT, 235/92 CA, 324/73 AT, 324/77 A
[51] Int. Cl............................................ G01r 19/16
[58] Field of Search..... 235/92 MT, 92 CA, 151.31; 324/73 R, 73 AT

[56] References Cited
UNITED STATES PATENTS
3,641,509  2/1972  Di Vita et al. .................. 340/173 R

*Primary Examiner*—Malcolm A. Morrison
*Assistant Examiner*—R. Stephen Dildine, Jr.
*Attorney, Agent, or Firm*—George E. Clark; Elmer W. Galbi; J. Jancin, Jr.

[57] ABSTRACT

A test instrument is provided for performing analysis and control functions. Analogue input signals in excess of a clipping level are converted to digital signals which are sampled at numerous points in real time in order to provide a digital pattern representative of the sampled signal. The digital pattern is stored for subsequent analysis, and the stored pattern is displayed in digital form for visual analysis by an operator. Repetitive signals can be analyzed by the test instrument for the purpose of measuring pulse parameters such as amplitude, width, pulse shape, pulse separation, and the like. Controls are included for stopping the test instrument and signaling the device under test in response to any one of several conditions which may be selected. The test instrument includes equipment for detecting and storing signals which deviate from a reference pattern. When a deviation is detected, the test instrument may be stopped in which event the device under test is signaled, and the pattern of the deviation signal is displayed.

51 Claims, 73 Drawing Figures

INVENTOR
ARTHUR D. ALEXANDER
BY *Thomas & Thomas*
ATTORNEYS

NORMAL OUTPUT

NORMAL OUTPUT

INVERTED OUTPUT

INVERTED OUTPUT

PULSE ANALYZING TESTER

This is a continuation, of application Ser. No. 88,298 filed Nov. 10, 1970.

BACKGROUND OF THE INVENTION

1. This invention relates to electrical test instruments and more specifically to such instruments for analyzing and testing electrical pulse signals utilizing digital techniques on analogue signals.

2. Instruments employed in the past to analyze direct current signals, alternating signals, and pulse signals include basically the voltmeter and the oscilloscope. In less complicated technology these instruments are adequate to perform analysis of such signals. However, as the complexity of electrical systems increase and the speed of operation changes from millisecond to picosecond signals, such instruments and the techniques used for measuring the characteristics of these faster signals were inadequate for many of the situations encountered. The voltmeter can measure voltage that is present with a high degree of accuracy, and it can measure the RMS value of an alternating current signal. It may, with limitations, detect the presence of pulsations. The voltmeter, however, cannot determine if an input signal consists of one signal, several superimposed signals, or some complex set of irregular pulsations. An alternating current voltmeter cannot give information concerning frequencies or give direct information concerning peak voltage. It cannot discern variations of frequency in an alternating current signal.

The oscilloscope can be used to perform all of the functions performed by a voltmeter, and it can do more. It can be employed by an operator to measure voltage, display waveshapes, determine frequencies, and discriminate between varying frequencies with no difficulty. The oscilloscope cannot measure a direct current voltage with the precision of a highly accurate voltmeter. While an oscilloscope may be employed to display waveshapes, it really represents such shapes only approximately because the circuitry of the instrument introduces definite degrees of distortion. Furthermore, as the repetitive rate of a transient electrical event increases. an increasingly smaller percentage of the total number of such changes is displayed by the oscilloscope because of the interruptions required for flyback time during which the display is blanked. In certain instances the oscilloscope is inadequate because of its inability to retain the display. In this connection it is pointed out that a signal must be repeated many times in order to be seen on an oscilloscope. Thus a signal which occurs once, and only once, is seen fleetingly if at all, even by an alert operator. As sophisticated computer systems and other complex electronic devices utilize circuit components with faster speeds of operation, an oscilloscope capable of operating at these high speeds becomes much more expensive, and its capabilities are often inadequate for the many test purposes. Specific skills for operating the oscilloscope and interpreting the results must be cultivated. For example, a waveform may be easy to see on the oscilloscope. Nevertheless, waveshapes must be estimated, deduced, or calculated, and the precision obtained ia inadequate for many purposes. While these techniques may be adequate for general or rough determinations, even such rough or general determination become increasingly difficult as the nature of the waveform becomes more unpredictable. If the waveform appears infrequently, the visual pattern presented on the oscilloscope may be even more difficult to analyze since it appears but momentarily. More sophisticated instruments such as the storage oscilloscope have the ability to store certain pulse information on the face of the scope. However, even these devices are inadequate for numerous purposes especially those involving measurements of high speed transient signals. Such signals are difficult to capture in the first instance, and efforts to measure the parameters of such high speed transient signals leave much to be desired. Sampling oscilloscopes are especially engineered to characterize extremely short transient information. However, their presentation is based on a signal averaging scheme, and because of this irregular or random deviations cannot be observed. Sampling oscilloscopes do not operate in real time.

The measurements obtained with the use of any kind of oscilloscope depends in great measure on the skill of the operator. An operator, however skilled, has definite disadvantages. Chief among them is the inability of the eye to see fleeting events. Fatigue further reduces the alertness of an operator even with good sight. In short, judgment of the operator, however skilled, varies with many human factors, and measurements with an oscilloscope have these inherent deficiencies.

In troubleshooting, complex electronic systems and devices, or even less sophisticated discrete circuit counterparts, one of the most challenging tasks from the human standpoint is that of isolating a general class of problems referred to as intermittent or sporadic abreations in electrical signals, particularly those which occur unpredictably and infrequently. The prime reason for the great challenge and relatively low probability of success is that the existing test instruments depend upon a human sensor as the vital link in the measurement system. For example, test instruments such as oscilloscopes require visual detection of the failure event. In practice, moreover, there are many combinations of pulse duration and repetition rate which have contrast ratios on an oscilloscope below the range of normal human visual perception. In addition other factors are involved such as eyeblink rate, discouragment, alertness, fatigue, and a progressively decreasing performance level of operators as the intermittent signals increases which reduce the effectiveness of personnel. Other devices have been developed which are referred to as "babysitters," diagnostic analyzers, and a number of other names. Such devices utilize a discrete monitoring circuit which is attached by wires to various points in the system under test in such a manner that the probability parameters surrounding the suspected network are anticipated or predicted in advance. If the assumption turns out to be incorrect, the circuit responds with an indication such as a light and remains on until reset. The analyzers and the "babysitters" have been utilized somewhat effectively. Both approaches have enjoyed limited success at best with more difficult problems because of their dependence on the instrument operator. It is to this field of endeavor, with all of its shortcomings, that this invention is directed with a view to making precise measurements not heretofore made and obtaining such measurements without being subjected to operator deficiencies.

SUMMARY OF THE INVENTION

A test instrument is provided according to this invention which overcomes the foregoing instrument and operator deficiencies, and it provides for the measurement of the parameters of electrical signals with an accuracy limited only by machine error.

In one arrangement according to this invention incoming signals are supplied to one or more amplitude discriminators each of which has an adjustable clipping level. If the input signal exceeds the clipping level, an up signal level is provided. Otherwise, a down signal is provided. Up and down are arbitratily selected to indicate different discrete levels. Output signals from the amplitude discriminators are supplied to upper and lower buffers. A ring circuit connected to the upper and lower buffers responds to timing pulses, the frequency of which may be varied selectively, to operate successive stages of the upper and lower buffers. As the ring circuit is successively stepped stages of the upper and lower buffers are successively turned on then off for successive sample periods or time windows. Digital signals stored in the upper and lower buffers represent samples taken at various points of the incoming signal, and these samples are stored. The stored samples constitute a pattern of the incoming signals. A digital display device is connected to the upper and lower buffers for visually presenting the stored patterns. The display device includes an upper row of illuminable indicators and a lower row of illuminable indicators. The illuminable indicators may be neon indicator lamps, electroluminescent elements, light emitting diodes, and the like. The upper buffer is connected to the display elements in the upper row, and the lower buffer is connected to the display elements in the lower row. An internal oscillator or an external pulse source may be selected to operate the ring circuit to perform one cycle of operation hereinafter referred to as a sweep. The internal oscillator may be triggered by external pulses, and the external pulses may be controlled to trigger the oscillator by their leading edges or on their trailing edges. The external trigger pulses may be delayed by a time interval which is selectively variable from zero to a fixed predetermined maximum amount. Triggering of the oscillator may be selectively controlled to take place manually, take place automatically from an internal trigger source, or take place in response to an external signal. A comparator is connected to the upper and lower buffers for comparing the content of the two buffers. The comparator is connected to a first latch, arbitrarily termed a compare error latch, which is controlled to represent a match or a mismatch condition of the content of the upper and lower buffers. This latch in turn may be selectively connected to a second latch, termed a controlled stop latch, which in turn is operated to signal an external device or a system under test when a controlled stop takes place. The controlled stop latch terminates operation of the test instrument at the end of the sweep thereby to store and visually display the pattern of the incoming signal which creates the match or mismatch condition. Incoming signals which are to be sampled and stored in the upper and lower buffers are delayed or temporarily stored by a signal delay circuit which delays the incoming data signals by an amount of time equal to the delay required to start a sweep in response to such incoming data signals where this mode of operation is selected. The display device selectively may be operated (1) to be blanked at all times, (2) to be unblanked at all times, or (3) to be automatically unblanked when incoming signals are presented and automatically blanked in the absence of incoming signals. The test instrument selectively may be operated in any one of various modes of operation. Signals in the upper and lower buffers may be selectively supplied to external devices, and signals from external devices may be supplied selectively to the upper and lower buffers. Signals from such external sources representing a reference pattern may be supplied to the upper buffer or the lower buffer. In one mode of operation a pattern of signals may be stored in the upper buffer and compared with the stored pattern of an incoming signal in the lower buffer. Alternatively, an incoming signal may be stored in both the upper and lower buffers during one sweep. Subsequent incoming signals may be supplied only to the lower buffer while the content of the upper buffer is preserved undisturbed. If a mismatch condition is sought, all incoming signals are supplied to the lower buffer only during each susequent sweep. If a mismatch is found, this is indicated by the out signal from the comparator which then operates the first latch. The first latch operates a visual indicator and the second latch which in turn signals the device under test and stops the test instrument. Visual indicators are provided to indicate to an operator the status of the basic control devices.

It is a feature of this invention to provide an improved test instrument for measuring the parameters of input signals including width, amplitude, frequency, rise time, fall time, waveshape, and the like.

It is a feature of this invention to provide a test instrument which automatically detects the presence of sporadic or intermittent signals.

It is a feature of this invention to provide for the automatic detection of spurious pulses, either positive or negative, by the comparison of the stored pattern of such spurious signals with a reference pattern.

It is a feature of this invention to provide for the automatic detection of spurious pulses, either positive or negative, by the comparison of the stored pattern of such spurious pulses with a reference pattern and to stop the test instrument in response to the result of the comparison.

It is a feature of this invention to provide for a controlled stop of the test instrument selectively in response to any one of several conditions and to signal the device under test whenever the test instrument is stopped.

It is another feature of this invention to provide for a controlled stop of a test instrument in response to an external input signal or in response to a match or a mismatch condition between a reference pattern and the stored pattern of an incoming signal.

It is a feature of this invention to provide a test instrument which may be triggered into operation automatically in response to the leading edge or the trailing edge of an external signal with or without delay of the external signal prior to initiating a triggering operation.

It is a feature of this invention to provide an improved test instrument which delays the incoming signal for subsequent sampling and storage operations.

It is another feature of this invention to provide for the measurement and digital display of the stored pattern of the incoming signal in either the normal or inverted form.

It is another feature of this invention to provide a test instrument with a digital display device which may be blanked at all times, unblanked at all times, or automatically unblanked in response to an incoming signal and automatically blanked in the absence of an incoming signal.

It is a feature of this invention to provide for the display of an incoming signal in both rows of a digital display device which has two rows or to provide for the display of two simultaneously incoming signals in the two rows of a digital display with one signal displayed in one row and the other signal displayed in the other row.

It is a feature of this invention to provide an improved test instrument with run indicators alternately operated by signals from an oscillator to indicate symmetry of the oscillator pulses by like intensity of the run indicators and a lack of symmetry by the difference in intensity of the run indicators.

It is a feature of this invention to provide an improved test instrument which includes an oscillator for stepping a ring circuit to define time windows wherein the oscillator is triggered, either internally or externally, into operation and is synchronized with the triggering pulse.

It is a feature of this invention to provide an improved test instrument with a digital display having an upper row of display elements and a lower row of display elements wherein incoming data is displayed in one row of display elements, and a triggering pulse which initiates a sweep is displayed in the other row of display elements whereby the time period between the triggering pulse and the incoming data signals may be viewed and/or determined by inspection.

It is a feature of this invention to provide a test instrument with upper and lower buffers connected to a digital display wherein patterns representing data may be supplied serially or in parallel to the upper and lower buffers.

It is a feature of this invention to provide a test instrument which may be operated in any one of several modes to detect the presence of spurious signals, either negative or positive, and wherein the test instrument is stopped upon detection of a spurious signal and restarted in response to an external signal from a remote device.

It is a feature of this invention to provide an improved test instrument wherein the circuits of which it is constructed employ the same technology used in constructing the circuits of the device it checks whereby the speed of operation of the circuits in the test instrument is identical to the speed of operation of the device it checks.

It is a feature of this invention to provide an improved test instrument which analyzes signals from a device under test and stops the device under test when predetermined conditions are found.

The foregoing and other objects, features and advantages of the invention will be apparent from the following more particular description of a preferred embodiment of the invention, as illustrated in the accompanying drawings.

BRIEF DESCRIPTION OF THE DRAWINGS

FIGS. 12B through 12H illustrate waveforms helpful in explaining the operation of the invention.

DESCRIPTION OF THE PREFERRED EMBODIMENTS

Figure 1:
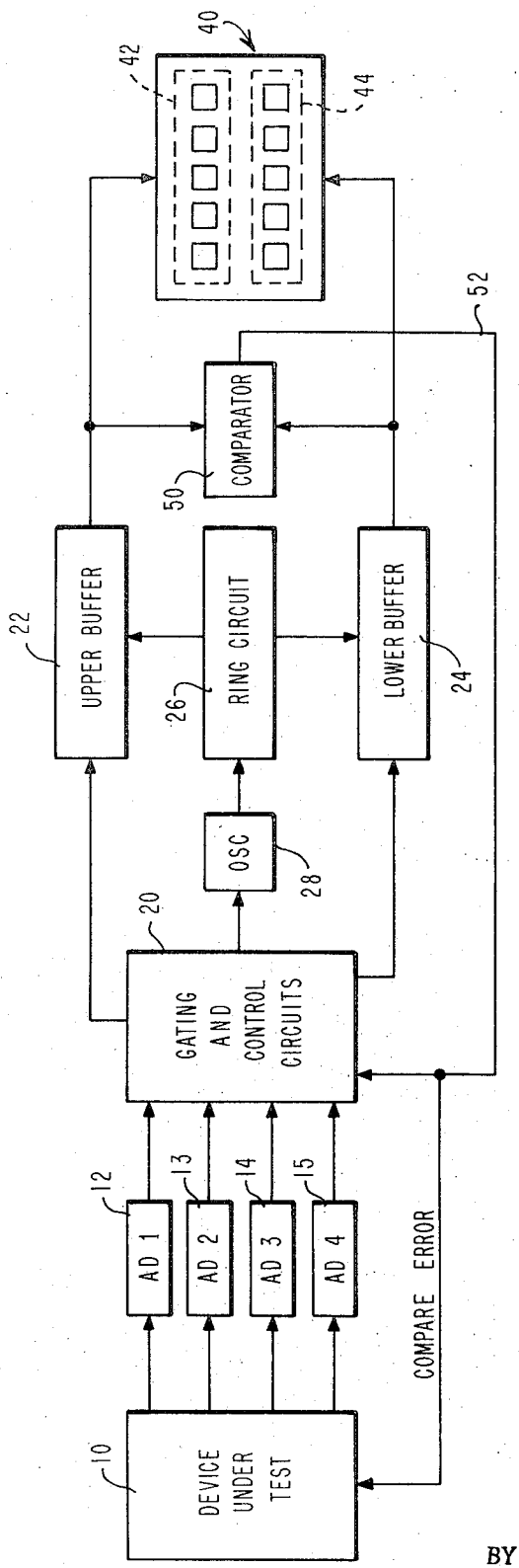
FIG. 1 illustrates in block form a test instrument according to this invention.

Reference is made to FIG. 1 which illustrates in block form the general system of a test instrument according to this invention. A device under test 10 supplies signals to amplitude discriminators 12 through 15. Signals from the amplitude discriminators 12 through 15 are supplied through gating and control circuits 20 to an upper buffer 22 and a lower buffer 24. Alternatively, signals from the amplitude discriminators 12 through 15 may be supplied through the gating and control circuits 20 to the lower buffer 24 only. A ring circuit 26 operates successively stages of the upper buffer 22 and the lower buffer 24 to sample and store signals from the amplitude discriminators 12 through 15. The ring circuit 26 is operated by an oscillator 28. The oscillator 28 is turned on and off in response to control signals from the gating and control circuits 20. A display device 40 has an upper row 42 of electroluminescent elements and a lower row 44 of electroluminescent elements. Information stored in the upper buffer 22 may be displayed by the upper row 42 of electroluminescent elements, and information stored in the lower buffer 24 may be displayed in the lower row of 44 of electroluminescent elements. A comparator 50 is employed to compare signals stored in the upper buffer 22 with signals stored in the lower buffer 24. When the signals in these two buffers are unlike, a compare error signal is supplied on a line 52 to the gating and control circuits and to the device under test 10. The compare error signal on the line 52 may be utilized to stop the oscillator 28 if desired, and it may be used also to stop the device under test 10.

Figure 2:
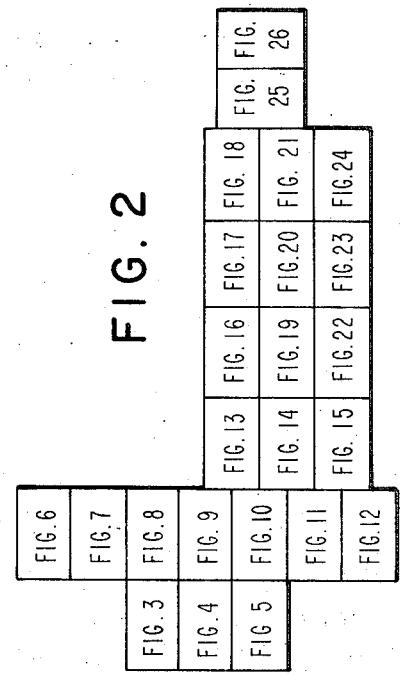
FIG. 2 illustrates the manner in which FIG. 3 through 26 should be arranged.

Reference is made next to FIGS. 2 through 26 for a more detailed illustration of the system shown in block form in FIG. 1. FIG. 2 illustrates the manner in which FIGS. 3 through 26 should be arranged with respect to each other. Positive logic is employed for purposes of illustration. More specifically, a logic circuit responds to positive input signals to provide a positive output signal. However, exceptions to the general rule are these:

(1) if a negative input signal is required on an input line to operate a device, this is indicated by the upper half of an arrowhead on such input line at its junction with the device;

(2) if a device provides a negative signal on an output line when operated, this is indicated by the upper half of an arrowhead on such line at its output junction from the device;

(3) if a device responds only to a negative going signal on one of its input lines, as contrasted with a negative level, this is signified by the letter "N" in the block representing the device at the junction of such line and the device; and (4) where mechanical switches are employed, devices having inputs connected to grounded contacts are rendered inoperative, and devices having inputs connected to open contacts are rendered operative. Latches, however, are an exception. A ground level or a negative level to a latch sets or resets the latch depending on which input is so energized. If a grounded contact is connected to a line which has a half arrowhead at the junction with a device, the ground level is effective to condition such input line to operate the device. Where the operation of any device deviates from the foregoing conventions, this variation is discussed with respect to such device.

Figure 3:
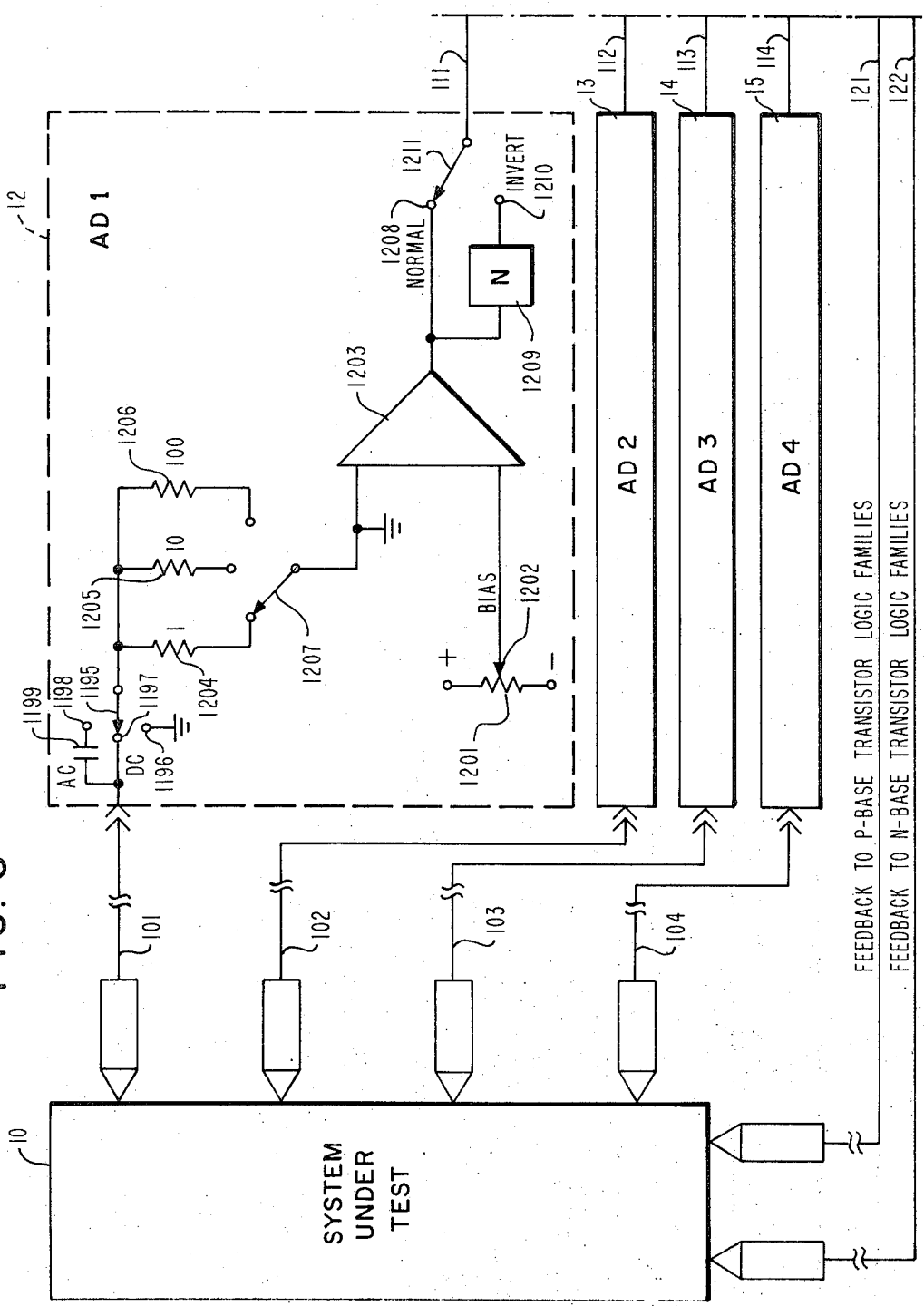
FIGS. 3 through 26 illustrate in detail the test instrument shown in block form in FIG. 1.
Figure 4:
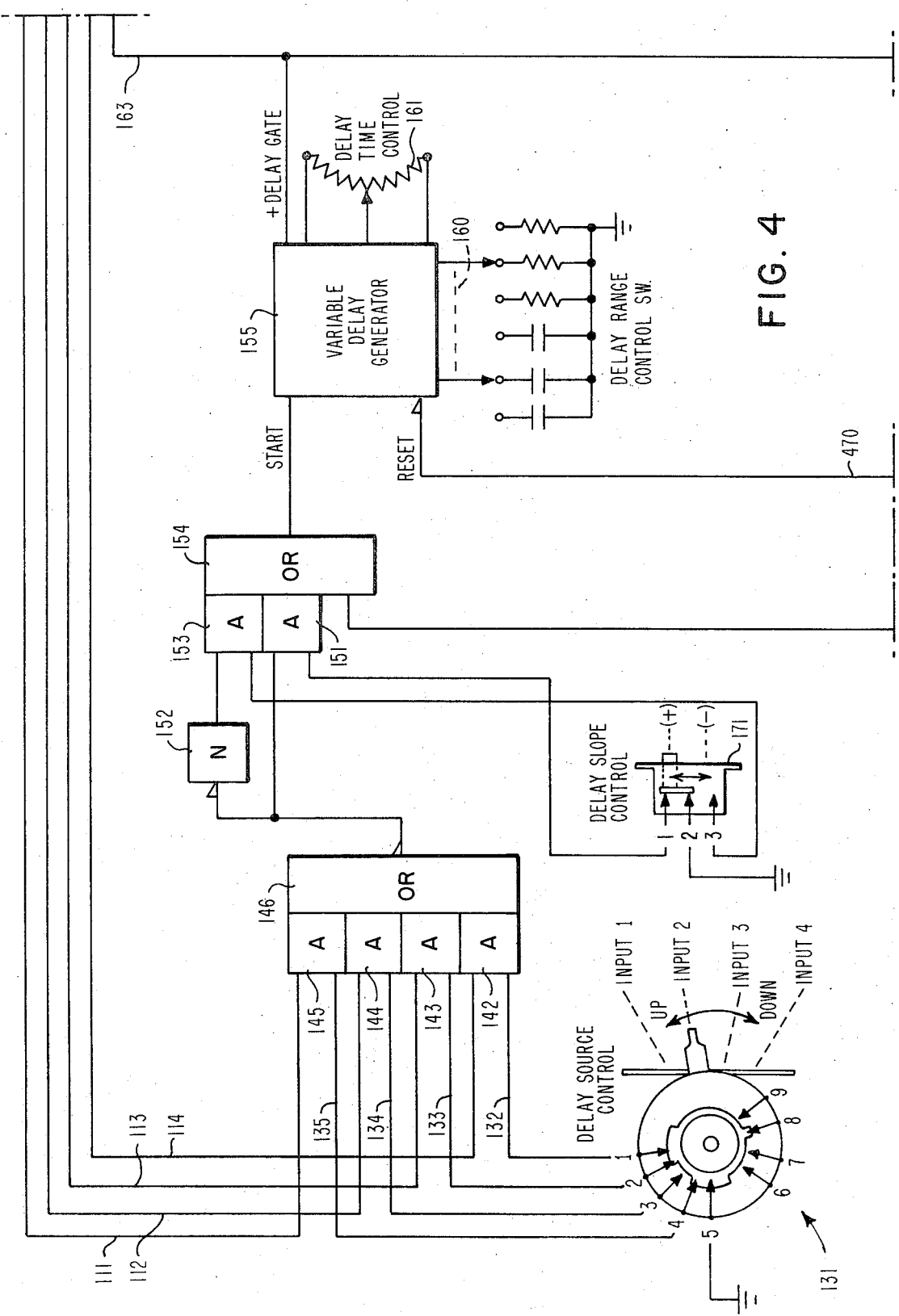

Referring to FIG. 4, a delay source control switch 131 is a four-position lever switch which employs a grounding technique for logic control purposes. That is, ground potential serves to deactivate the associated input to a logic device. The potential on ungrounded contacts serves to activate the associated inputs of logic devices. The delay source control switch 131 has 9 contacts. Table 1 below shows which ones of these contacts are grounded whenever the switch lever is operated. The inputs 1 through 4 select respective amplitude discriminators 15 through 12 in FIG. 3 as input devices. An X in Table 1 below, as in subsequent switch tables, signifies that the associated contact is grounded for the indicated switch position.

TABLE 1

| Lever position | Contacts | | | | | | | | |
|---|---|---|---|---|---|---|---|---|---|
| | 1 | 2 | 3 | 4 | 5 | 6 | 7 | 8 | 9 |
| Input: | | | | | | | | | |
| 1 | X | X | X | | X | | | | X |
| 2 | X | X | | X | X | | | X | |
| 3 | X | | X | X | X | | X | | |
| 4 | | X | X | X | X | X | | | |

The delay source control switch 131 controls the signal level on output lines 132 through 135 to respective And circuits 142 through 145 which are connected to an Or circuit 146. The Or circuit 146 responds to a positive signal from any one of the And circuits 142 through 145, and it supplies a negative output signal to an And circuit 151 and through an inverter 152 to and And circuit 153. The And circuits 151 and 153 are connected to an Or circuit 154. The Or circuit 154 responds to a positive signal from either one of the And or 151 and 153, and it supplies a positive output signal to a variable delay generator 155. The variable delay generator 155 has a delay range control switch 160 which permits the selection of different resistor-capacitor combinations shown, and operation of the switch 160 permits the selection of different ranges of time delay. A delay time potentiometer 161 serves as a vernier control which permits selective adjustment of the time delay in a given range selected by the switch 160. The variable delay generator 155 responds to a positive start signal from the Or circuit 154, and it provides a positive signal of adjustable duration on an output line 163. The amount of the time delay between the positive start input signal to the variable delay generator 155 and the duration of the positive output signal on the line 163 is determined by the setting of the switch 160 and potentiometer 161. The time delay may be varied by changing the position of the controls 160 and 161, thus delay time is a reuslt of the positioning of the trailing edge of the positive pulse on line 163.

A delay slope control switch 171 in FIG. 4 is operated to either of its two positions, and it serves to select direction, rising or falling, of the slope of the signal from the Or circuit 146 which operates the variable delay generator 155. If the switch 171 is operated to the lower position, contact 3 is connected to grounded contact 2, and the ground level potential is supplied to decondition the And circuit 153. When a negative going signal is supplied to the Or circuit 146, it is changed by the Or circuit 146 and supplied as a positive going signal to the And circuit 151. The contact 1 of the delay source control switch 131 is open, and this conditions the lower input of And circuit 151. Therefore, the And circuit 151 supplies a positive output signal through the Or circuit 154 to the start input of the variable delay generator 155. If the delay slope control switch 171 in FIG. 4 is operated to the upper position, contact 1 is connected to grounded contact 2, and the ground level potential is supplied to decondition the And circuit 151. When a positive going signal is supplied to the Or circuit 146, it is changed to a negative going signal by the Or circuit 146 and supplied to the inverter 152 which changes this signal to a positive going signal. The And circuit 153 passes this positive signal through the Or circuit 154 to the start input of the variable delay generator 155. Thus it is seen how the delay source control 131 and the delay slope control switch 171 control the variable delay generator 155 to initiate a given time delay on either a positive going signal or a negative going signal from a selected one of the amplitude discriminators 12 through 15 in FIG. 3.

Figure 5:
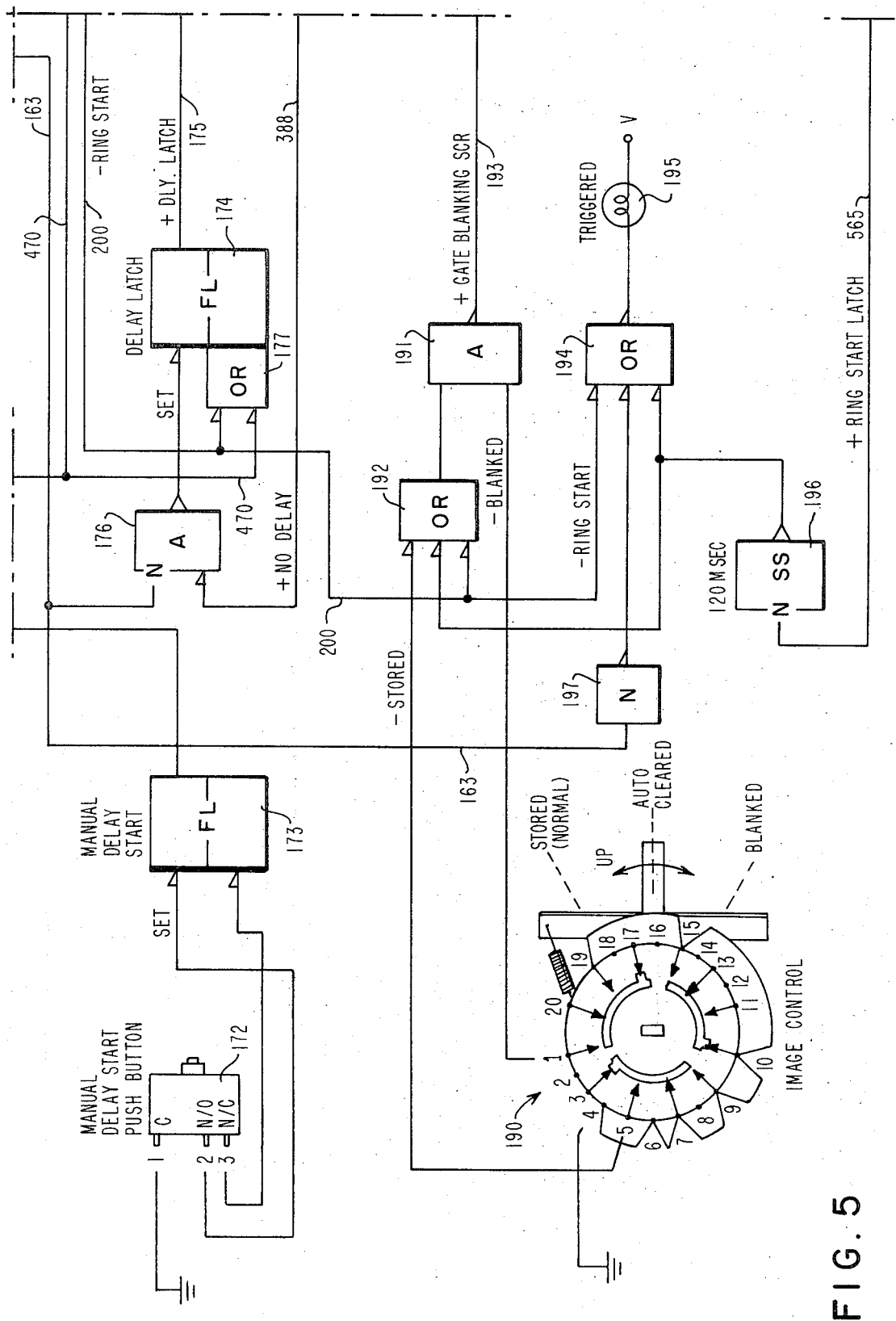

Reference is made next to FIG. 5. A manual delay start push-button switch 172 is operated to control the state of a latch 173. When the push-button switch 172 is depressed, contact 2 is grounded, and the ground signal level is sufficiently negative to set the manual delay start latch 173 which then provides a positive output signal from its set output through the Or circuit 154 to operate the variable delay generator 155 thereby to provide a delayed positive signal on the output line 163. When the push-button switch 172 is released, contact 3 is grounded, and the ground level is sufficiently negative to reset the manual delay start latch 173.

A delay latch 174 in FIG. 5 responds to the trailing edge of this positive delay gate signal on the line 163 from the variable delay generator to provide a positive signal on the set output line 175, and this positive output signal is employed to start the oscillator 28 and drive the ring circuit 26 in FIG. 1 as as explained more fully hereinafter. The negative going signal at the trailing edge of the positive signal on the line 163 from the variable delay generator 155 in FIG. 4 conditions the upper input of an And circuit 176 in FIG. 5. When the And circuit 176 receives a negative signal on its other input from the delayed triggering control switch 380 in FIG. 10, it is operated to supply a negative output signal to the set input of the latch 174, and this negative signal is effective to set the latch 174. It in turn supplies a positive output signal on the line 175 thereby ultimately to start the ring circuit 26 in FIG. 1. It is pointed out that the termination of the positive delay signal on the line 163 is effective to set the latch 174 and thereby ultimately initiate operation of the ring circuit 26 in FIG. 1. The latch 174 is reset by a negative signal from an Or circuit 177. The Or circuit 177 supplies a negative output signal in response to a negative signal on either of its inputs.

An image control switch 190 in FIG. 5 has a three position lever, and various ones of the contacts 1 through 20 are grounded by operating the lever. Contact 4 is grounded as shown. By a jumper arrangement grounded contact is connected to contacts 6, 7, 9, 10, 15, and 19. Table 2 below shows which ones of the contacts are grounded for the various positions of the switch lever.

TABLE 2

| Lever position | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Up |  |  |  | X | X | X | X | X | X | X |  |  |  |  | X |  |  |  | X | X |
| Center |  | X | X |  | X | X | X | X |  |  |  |  | X |  | X |  |  |  | X | X |
| Down | X |  |  | X |  | X | X |  | X | X |  |  |  | X |  | X |  |  | X | X |

Contact 1 of the switch 190 is connected to an And circuit 191, and contact 5 is connected to an Or circuit 192. The Or circuit 192 is connected to the And circuit 191. Output signals from the And circuit 191 on a line 193 are used to control the blanking and unblanking of the display device of 40 in FIG. 1. The image control switch 190 is a three position lever switch, and the three positions control the blanking, unblanking, and clearing of the display device 40 in FIG. 1. When the switch lever is up, the display 40 in FIG. 1 is unblanked. When the image control switch 190 in FIG. 5 is operated with its switch lever centered, it automatically clears the display device 40 in FIG. 1. When the image control switch 190 in FIG. 5 is operated with its switch lever down, it blanks the display device 40 in FIG. 1.

An Or circuit 194 in FIG. 5 is connected to an indicator lamp 195. A single shot 196 has its output connected to the Or circuits 192 and 194. Signals on the line 163 in FIG. 5 are supplied through an inverter 197 to the Or circuit 194. The signals on a line 200 are supplied to the Or circuit 192 and 194. The Or circuit 194 responds to a negative signal on any one of its input lines and provides a negative output signal, as indicated by the half arrowhead on the output line at the junction with this Or circuit, which is effective to illuminate the lamp 195. The lamp 195 is illuminated whenever the ring circuit 26 in FIG. 1 is operated. The Or circuit 192 responds to a negative signal on any one of its input lines, as indicated by the half arrowhead at the junctions of these lines with this Or circuit, and supplies a positive output signal to the upper input of the And circuit 191.

Figure 6:
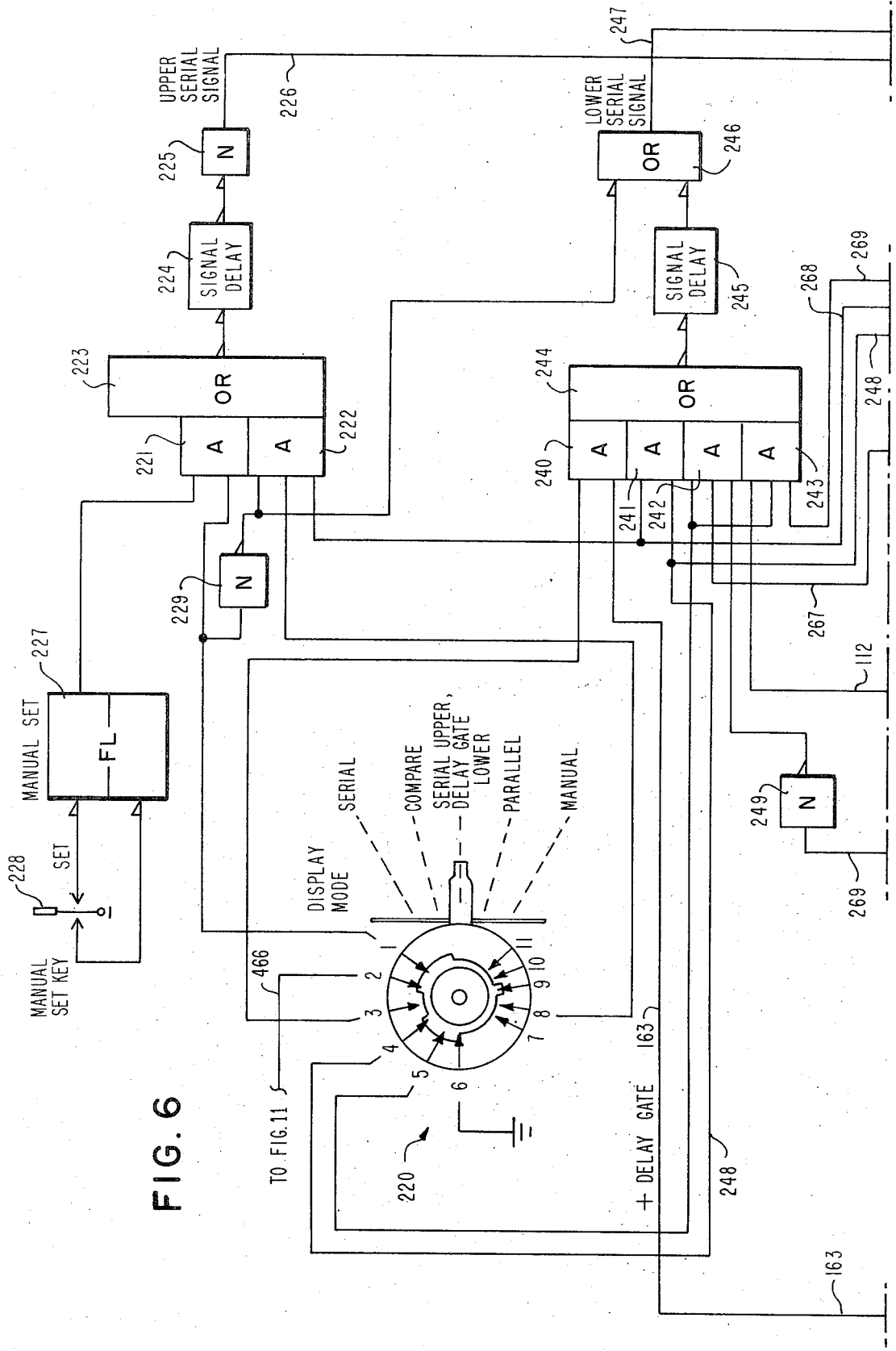

Reference is made next to FIG. 6. A display mode switch 220 is a five-position lever switch which employs a grounding technique for controlling the associated logical circuits. Table 3 below shows which contacts are grounded for each of the five positions shown.

TABLE 3

| Lever position | 1 | 2 | 3 | 4 | 5 | 6 | 7 | 8 | 9 | 10 | 11 |
|---|---|---|---|---|---|---|---|---|---|---|---|
| Serial | X | X | X | X |  | X |  |  |  |  | X |
| Compare | X | X | X |  | X | X |  |  |  |  | X |
| Serial upper delay gate lower | X | X |  | X | X | X |  |  | X |  |  |
| Parallel | X |  | X | X | X | X |  | X |  |  |  |
| Manual | X | X | X | X | X | X |  |  |  |  |  |

And circuits 221 and 222 in FIG. 6 are connected to an Or circuit 223. The Or circuit 223 is connected to a signal delay circuit 224, and the output of the signal delay circuit 224 is supplied through an inverter 225 to a line 226. The set output of a flip flop 227 is connected to the And circuit 221. A manual set key 228 is moved to the right in order to set the flip flop 227, and it is moved to the left in order to reset the flip flop 227. And circuits 240 through 243 are connected to an Or circuit 244 which in turn is connected to a signal delay circuit 245. The output of the signal delay circuit 245 is connected through an Or circuit 246 to a line 247.

The contacts of the display mode switch 220 are connected to various ones of the And circuits 221, 222, and 240 through 243. Contact 1 of the display mode switch 220 is connected to the And circuit 221, and it is connected to an inverter 229 which in turn is connected to the And circuit 222. Contact 2 relates to FIG. 11 and will be discussed later. Contact 3 of the display mode switch 220 is connected to the And circuit 240, and contact 4 is connected by a line 248 to the And circuit 241. Contact 5 of the display mode switch 220 is connected to the And circuits 242 and 243. Contact 8 is connected to the And circuit 222. The remaining contacts except grounded contact 6 of the display mode switch 220 are not used.

Figure 7:
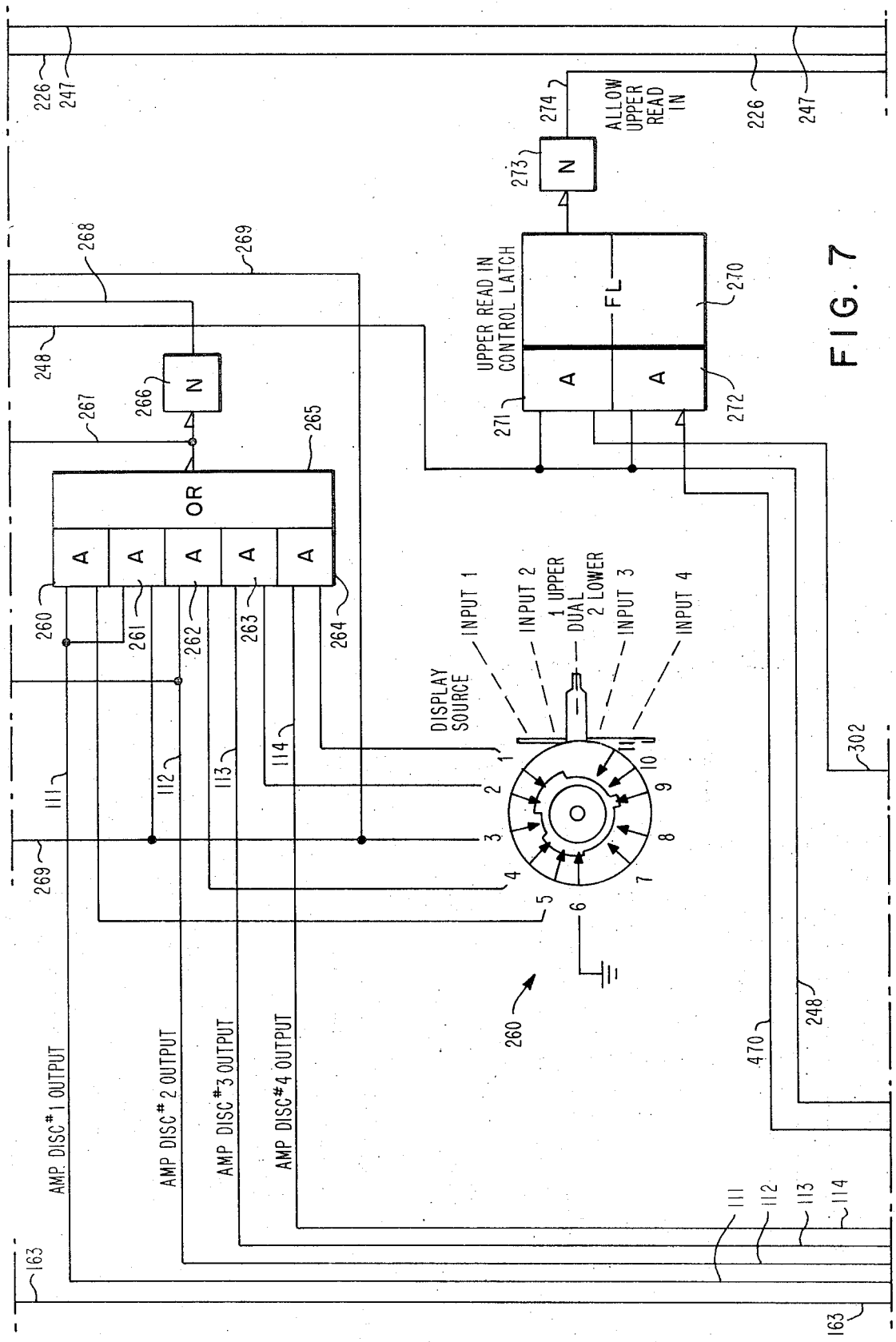

Reference is made next to FIG. 7. A display source switch 260 is a five-position switch which is identical in construction to the display mode switch 220 in FIG. 6. Table 3 above shows which contacts of the display source switch 260 are grounded when the switch lever is operated to the five positions. And circuits 260 through 264 are connected to an Or circuit 265. The Or circuit 265 in FIG. 7 is connected via a line 267 to the And circuit 242 in FIG. 6. The Or circuit 265 in FIG. 7 is connected through an inverter 266 and via a line 268 to the And circuits 222 and 241 in FIG. 6.

Next the connections of the display source switch 260 in FIG. 7 are described. Contact 1 is connected to the And circuit 264, and contact 2 is connected to the And circuit 263. Contact 3 is connected via a line 269 to the And circuit 261 in FIG. 7 and to the And circuit 243 in FIG. 6. Contact 3 in FIG. 7 is connected also through an inverter 249 in FIG. 6 to the And circuit 242. Contact 4 of the display source switch 260 in FIG. 7 is connected to the And circuit 262. Contact 5 is connected to the And circuit 260. The display source switch 260 serves to select one of the amplitude discriminators 12 through 15 in FIG. 3. An upper read in control latch 270 in FIG. 7 has an And circuit 271 connected to its set input and an And circuit 272 connected to its reset input. The set output of the latch 270 is supplied through an inverter 273 to a line 274.

Figure 8:
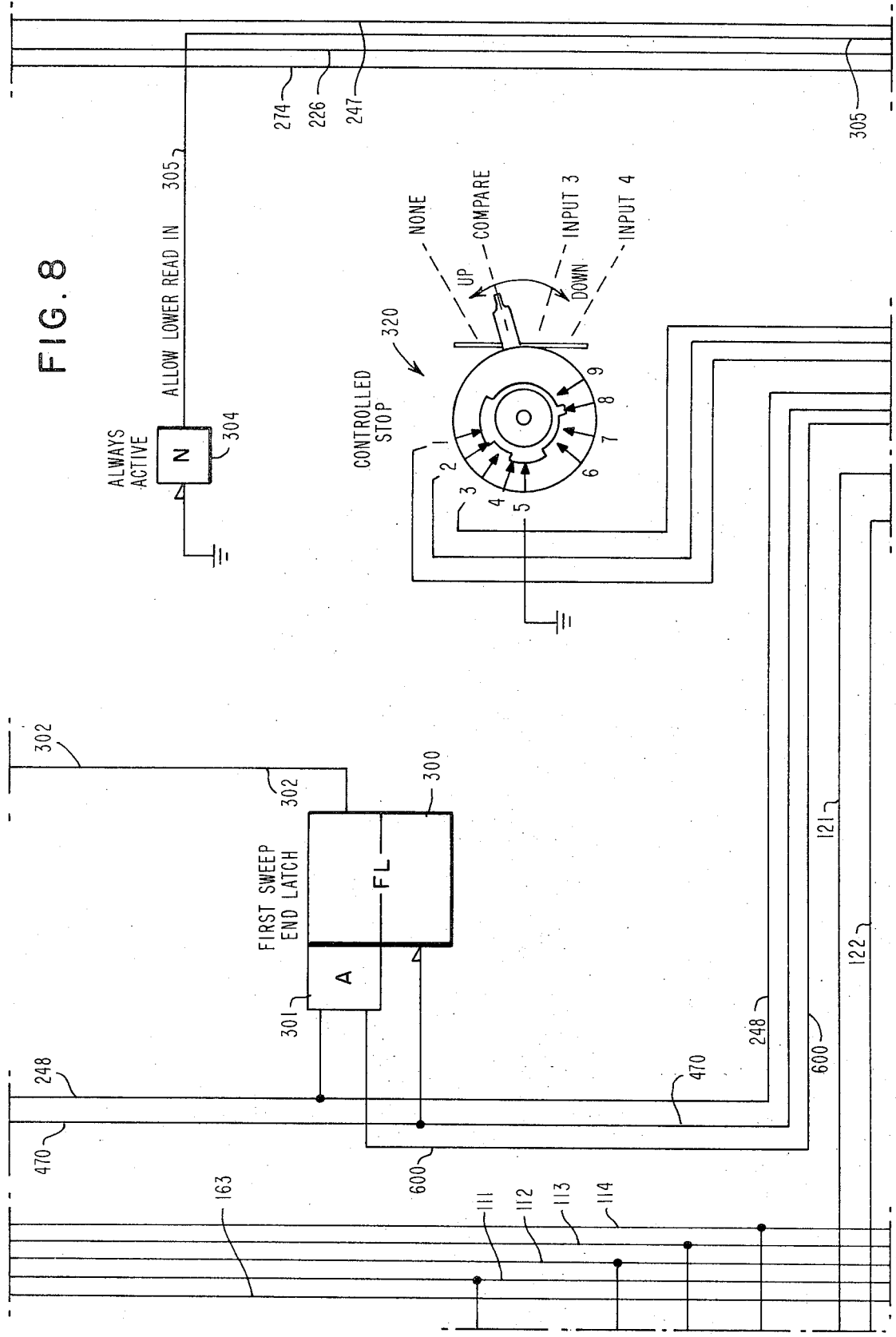

Reference is made next to FIG. 8. A first sweep end latch 300 has an And circuit 301 connected to its set input. The set output of the latch 300 is supplied on a line 302 to the And circuit 271 in FIG. 7. A controlled stop switch 320 in FIG. 8 is a four-position lever switch. Table 4 below shows which contacts are grounded for each of the four positions of the switch lever.

TABLE 4

| Lever positions | Contacts | | | | | | | | |
|---|---|---|---|---|---|---|---|---|---|
| | 1 | 2 | 3 | 4 | 5 | 6 | 7 | 8 | 9 |
| None | X | X | X |   | X |   |   |   | X |
| Compare | X | X |   | X | X |   |   | X |   |
| Input: | | | | | | | | | |
| 3 | X |   | X | X | X | X | X |   |   |
| 4 |   | X | X | X | X | X |   |   |   |

The connections of the contacts of the control stop switch 320 in FIG. 8 are described subsequently with respect to FIG. 13. An inverter 304 constantly supplies a positive control signal on a line 305 which allows the lower buffer 24 in FIG. 1 to store incoming data signals from any selected one of the amplitude disciminators 12 through 15 in FIG. 3 when the ring circuit 26 is operated.

Figure 9:
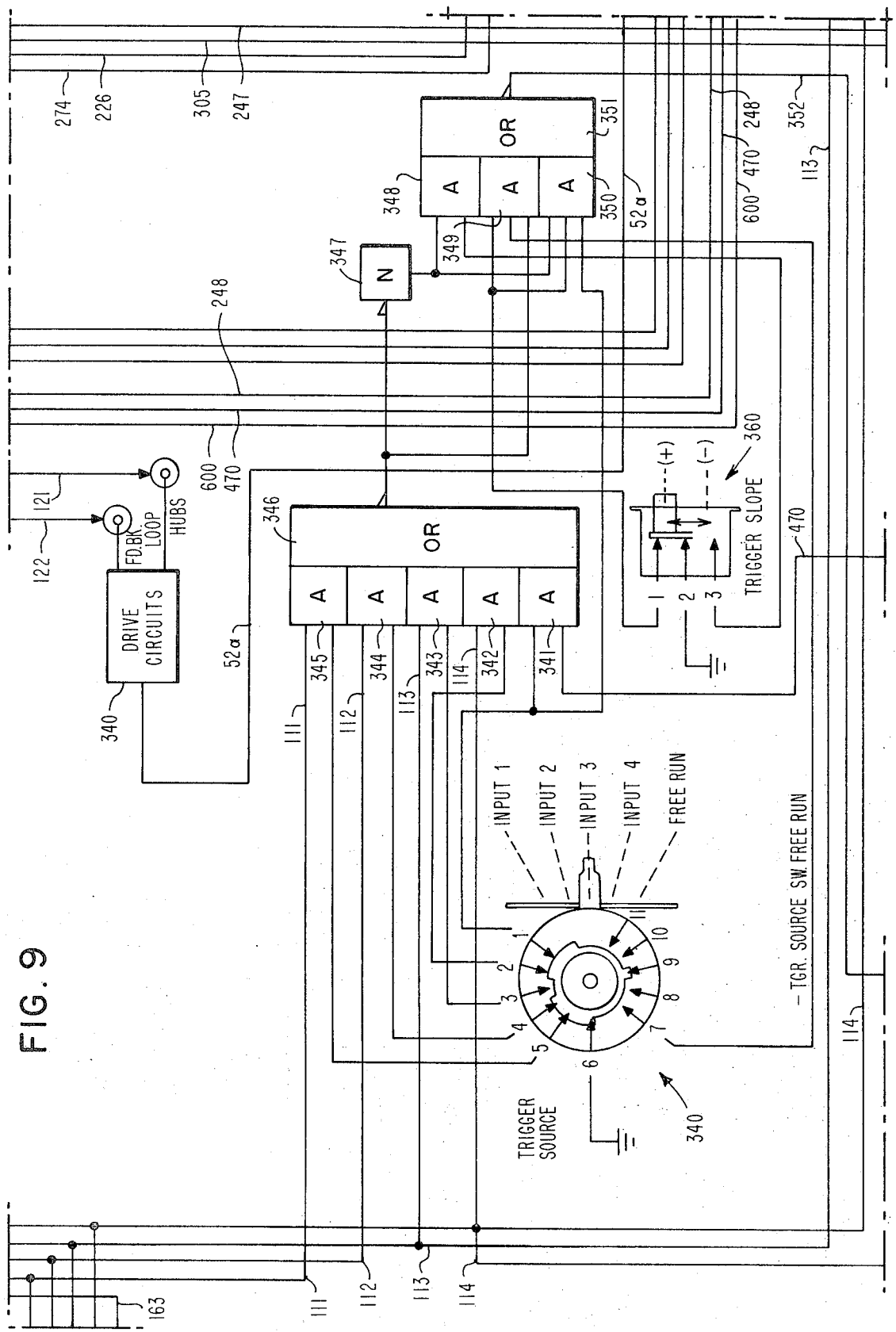

Reference is made next to FIG. 9. Drive circuits 340 respond to controlled stop signals on the line 52a, and they provide power on output lines 121 and 122. The signals on the line 121 and 122 are of opposite polarity, and they are utilized for control purposes in the system under test 10 in FIG. 3. A trigger source switch 340 is a five-position lever switch. Table 5 below shows with an X which contacts are grounded when the switch lever is operated in each of its five positions.

TABLE 5

| Lever position | Contacts | | | | | | | | | | |
|---|---|---|---|---|---|---|---|---|---|---|---|
| | 1 | 2 | 3 | 4 | 5 | 6 | 7 | 8 | 9 | 10 | 11 |
| Input: | | | | | | | | | | | |
| 1 | X | X | X | X |   | X |   |   |   |   | X |
| 2 | X | X | X |   | X | X |   |   |   | X |   |
| 3 | X | X |   | X | X | X |   |   | X |   |   |
| 4 | X |   | X | X | X | X |   | X |   |   |   |
| Free run |   | X | X | X | X | X | X |   |   |   |   |

Contacts 1 through 5 of the trigger source switch 340 are connected to respective And circuit 341 through 345, and these And circuits are connected to an Or circuit 346. The Or circuit 346 is connected through an inverter 347 to And circuits 348 and 350. The Or circuit 346 is connected also to the And circuit 349. The And circuits 348 through 350 are connected to an Or circuit 351. When operated, the Or circuit 351 provides a negative output signal on a line 352. Contact 7 of the trigger source switch 340 is connected to the And circuit 349. The remaining contacts of the trigger source switch 340 are not used except contact 6 is always grounded.

A trigger slope switch 360 is a slide-type switch which is identical in construction to the slide-type switch 171 in FIG. 4. Contact 1 of the trigger slope switch 360 is connected to the And circuits 349 and 350. Contact 3 of this switch is connected to the And circuit 348. Contact 2 of the trigger slope switch 360 is grounded. The trigger source switch 340 selects the source for a triggering operation, and the trigger slope switch 360 selects whether a positive going signal or a negative going signal is to be used for a triggering operation.

Figure 10:
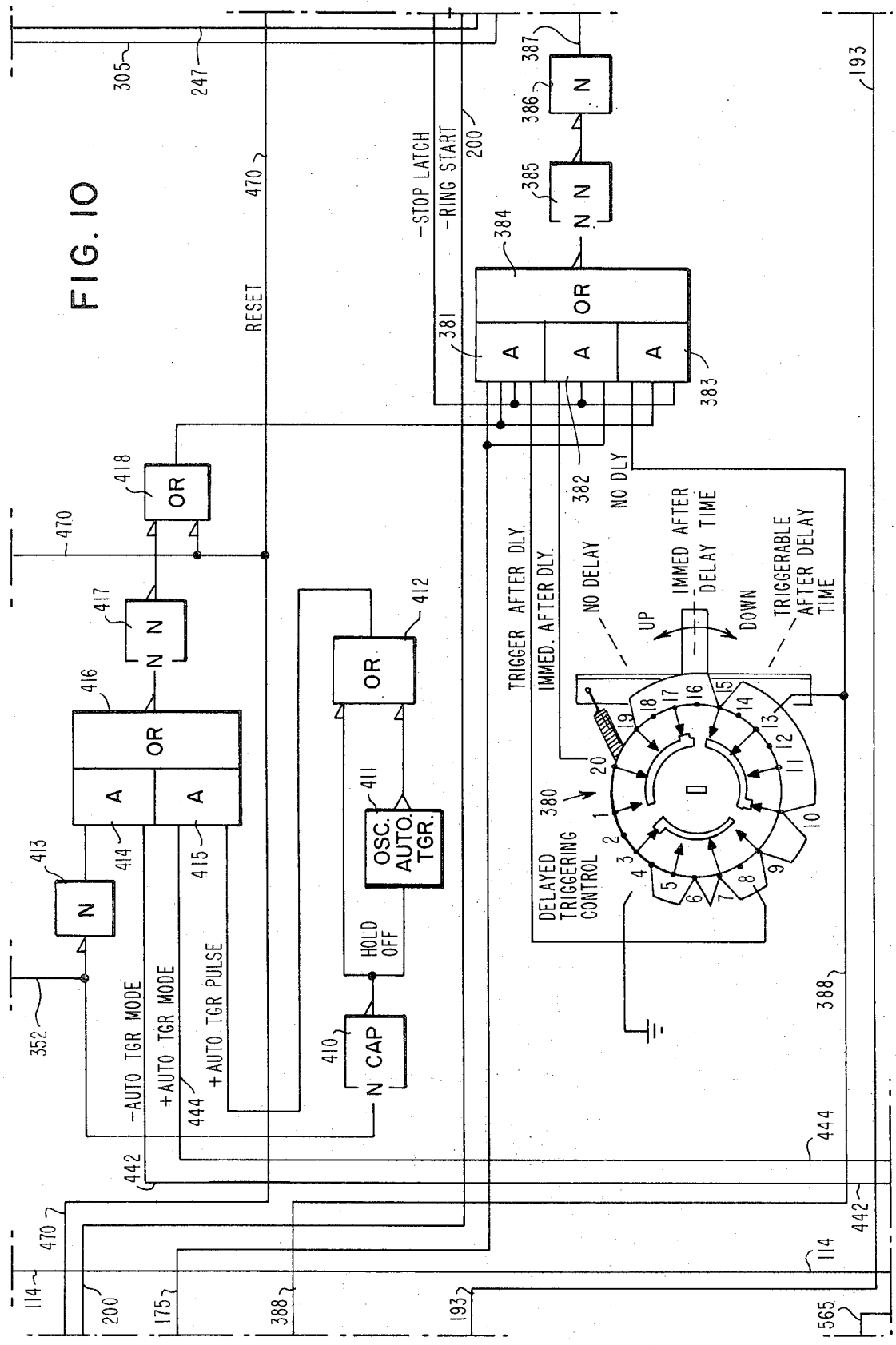

Reference is made next to FIG. 10. A delayed triggering control switch 380 is shown which is identical in construction and operation to the image control switch 190 in FIG. 5. And circuits 381 through 383 are connected to respective contacts 8, 20, and 13 of the delayed triggering control switch 380. These And circuits are connected to an Or circuit 384 which in turn is connected through inverters 385 and 386 to an output line 387. The contact 13 of the delayed triggering control switch 380 is connected by a line 388 to the And circuit 176 in FIG. 5.

A capacitor 410 in FIG. 10 is connected to an Or circuit 412 and to an oscillator automatic trigger 411 which in turn is connected to the Or circuit 412. The capacitor 410 responds to a negative going signal on line 352 to provide a negative output signal. An inverter 413 responds to negative signals on the line 352 and in turn supplies positive signals to an And circuit 414. And circuits 414 and 415 are connected to an Or circuit 416 which in turn is connected through an inverter 417 to an Or circuit 418. The Or circuit 418 is connected to the And circuits 381 and 383.

Figure 11:
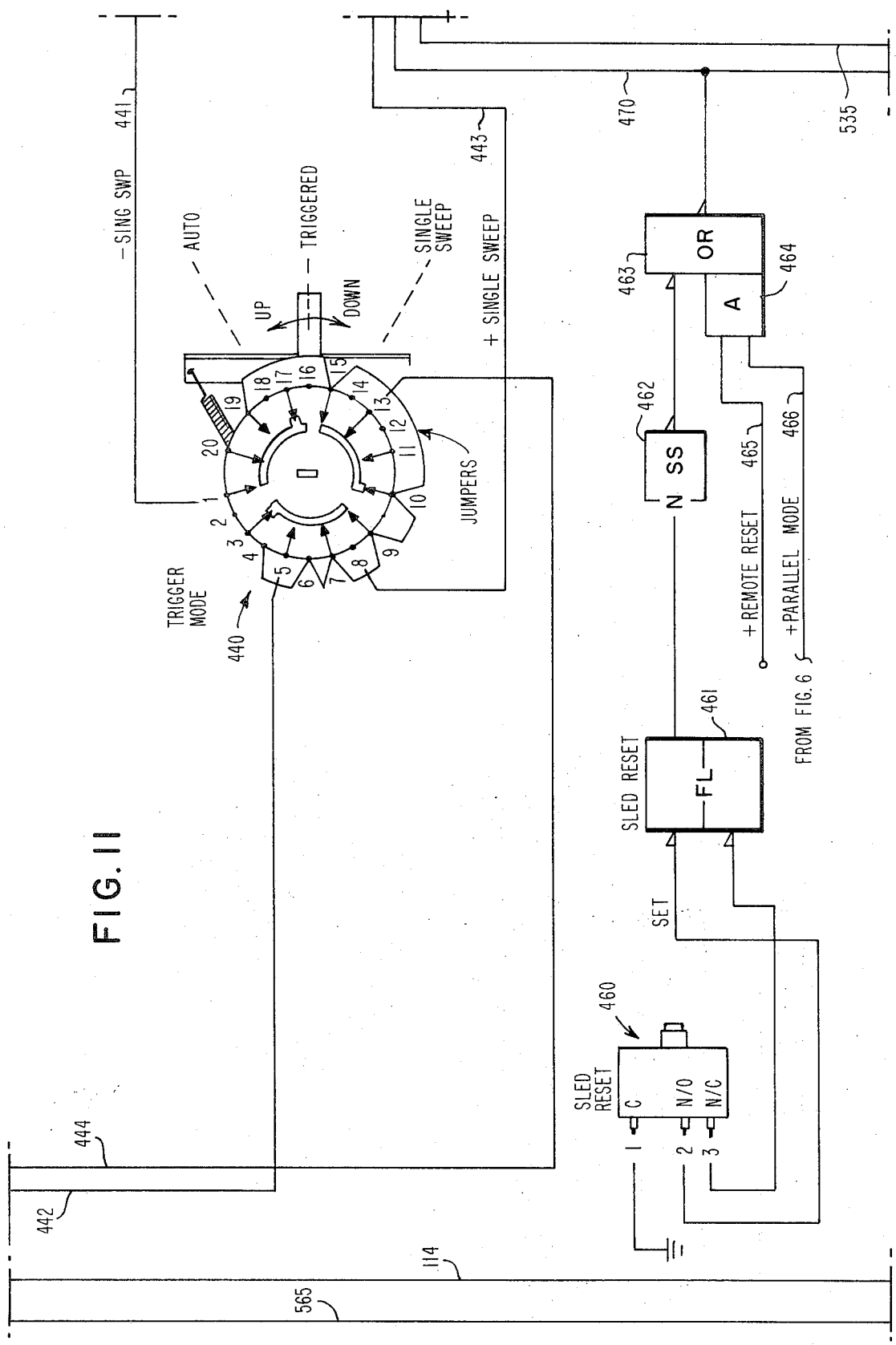

Reference is made next to FIG. 11. A trigger mode switch 440 is a three-position lever switch which is identical in construction and operation to the image control switch 190 in FIG. 5. Contacts 1, 5, 8, and 13 of the trigger mode switch 440 are connected to respective lines 441 through 444. The lines 442 and 444 are connected to respective And circuits 414 and 415 in FIG. 10.

The system of the test instrument in FIG. 1 is reset by a reset switch 460 in FIG. 11. This is a push-button switch with contacts 1 through 3, and it is identical in construction and operation to the switch 172 in FIG. 5. When the push-button switch 460 is depressed, contact 2 is grounded, and the reset latch 461 is set. This latch then provides a positive signal from the set output to a single shot 462. When the push-button switch 460 is released, the reset latch 461 is reset, and the signal from the set output is a negative going signal which operates the single shot 462 to supply a negative signal to the Or circuit 463 which in turn supplies a negative output signal on the line 470. An And circuit 464 responds to positive signals on input lines 465 and 466, and the And circuit 464 supplies a negative output signal to the Or circuit 463. A negative signal from the Or circuit 463 on the line 470 is utilized throughout the system in FIGS. 4 through 24 to perform a reset operation during parallel mode operations at which time a positive signal is applied to the line 466 when the display mode switch 220 in FIG. 6 is in the parallel mode position.

Figure 12:
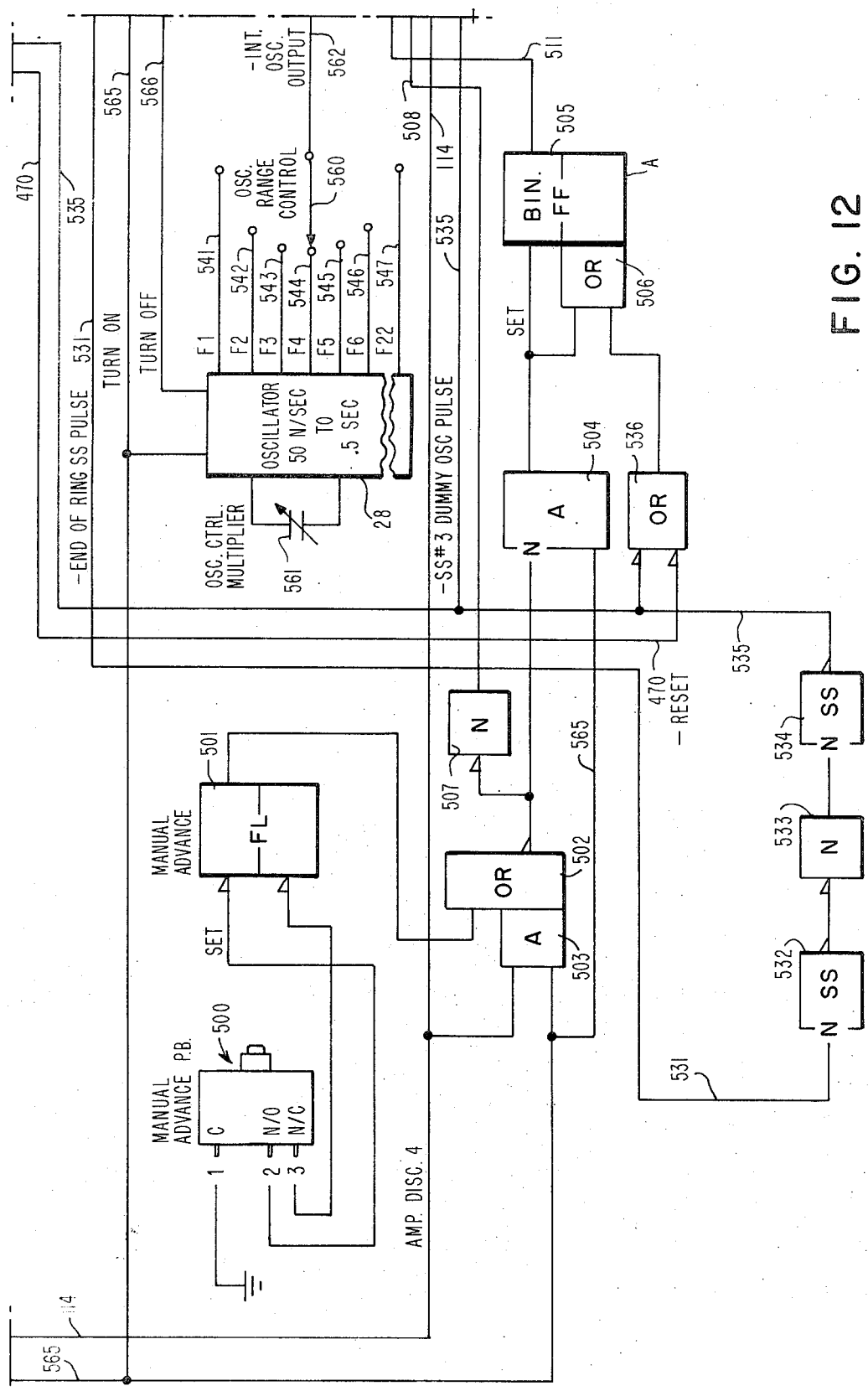

Reference is made next to FIG. 12. A manual advance push-button switch 500 has three contacts. This push-button switch is identical in construction and operation to the push-button switch 172 in FIG. 5. When this switch is depressed, contact 2 is grounded, and this sets the manual advance latch 501. When the manual advance push-button switch 500 is released, contact 3 is grounded, and this resets the manual advance latch 501. The set output of the manual advance latch 501 is connected to an Or circuit 502. An And circuit 503 is connected to the Or circuit 502. The Or circuit 502 is connected to an And circuit 504 which in turn is connected to the set input of a binary flip flop 505 and through an Or circuit 506 to the reset input of the binary flip flop 505. The Or circuit 502 also is connected to an inverter 507 which in turn is connected to a line 508.

Signals on a line 531 are supplied to a single shot 532. Signals from the single shot 532 are supplied through an inverter 533 to a single shot 534. Signals from the single shot 534 are supplied on a line 535 to an Or circuit 536, and signals from the Or circuit 536 are supplied to the Or circuit 506.

An oscillator 28 supplies frequencies F1 through F22 to the respective lines 541 through 547. Lines for frequencies F7 through F21 are omitted in the interest of simplicity. An oscillator range control switch 560 is used to select any one of the frequencies F1 through F22. A variable capacitor 561 is utilized as a vernier control to vary the frequency within a selected range. Thus the oscillator 28 may be adjusted to operate at any frequency having a time period from 0.5 seconds to 50 nanoseconds. The switch 560 is connected to an output line 562. The oscillator 28 is turned on by a positive signal on a line 565, and it is turned off by a positive signal on a line 566. The line 565 is connected also to the And circuit 503 in FIG. 12, and the And circuit 504 in FIG. 12, and the single shot 196 in FIG. 5. The And circuit 503 also receives signals on the line 114 from the amplitude discriminator 15.

Figure 13:
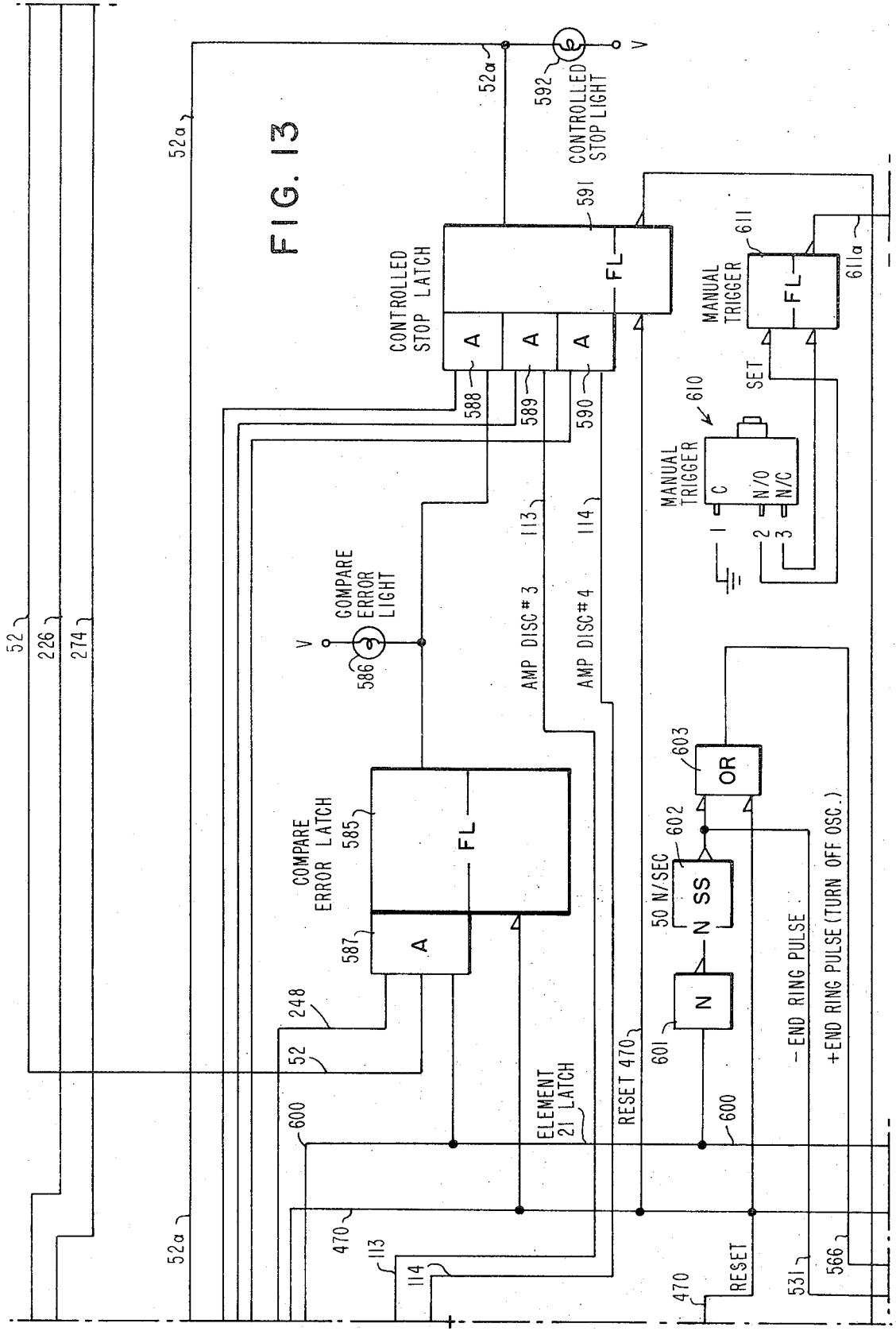

Reference is made next to FIG. 13. A compare error latch 585 has its set output connected to a compare error light 586. When this light is illuminated, it indicates the existence of a compare error. An And circuit 587 is connected to the set input of the latch 585. Signals on the lines 52, 248, and 600 are supplied to the And circuit 587, and when all of these lines have positive signals, the latch 585 is set. The latch 585 is reset by a negative signal on the reset line 470. The set output of the latch 585 also is supplied to an And circuit 588. And circuits 588 through 590 are connected to the set input of a latch 591. The set output of this latch is supplied on the line 52a to an indicator light 592. When this light is illuminated, it indicates that a controlled stop has occurred. Signals on the line 52a are supplied to the drive circuits 340 in FIG. 9.

Signals on a line 600 are supplied to an inverter 601, and its output is supplied to a single shot 602. The output of the single shot 602 is supplied on the line 531 to an Or circuit 603 in FIG. 13 and to the single shot 532 in FIG. 12. The output of the Or circuit 603 is supplied on the line 566 to the oscillator 28 in FIG. 12.

A manual trigger push-button switch 610 in FIG. 13 has three contacts. It is identical in construction and operation to the push-button switch 172 in FIG. 5. When the push-button switch 610 in FIG. 13 is depressed, contact 2 is grounded, and this sets a manual trigger 611. When the manual trigger push-button switch 610 is released, contact 3 is grounded, and this resets the manual trigger 611.

Figure 14:
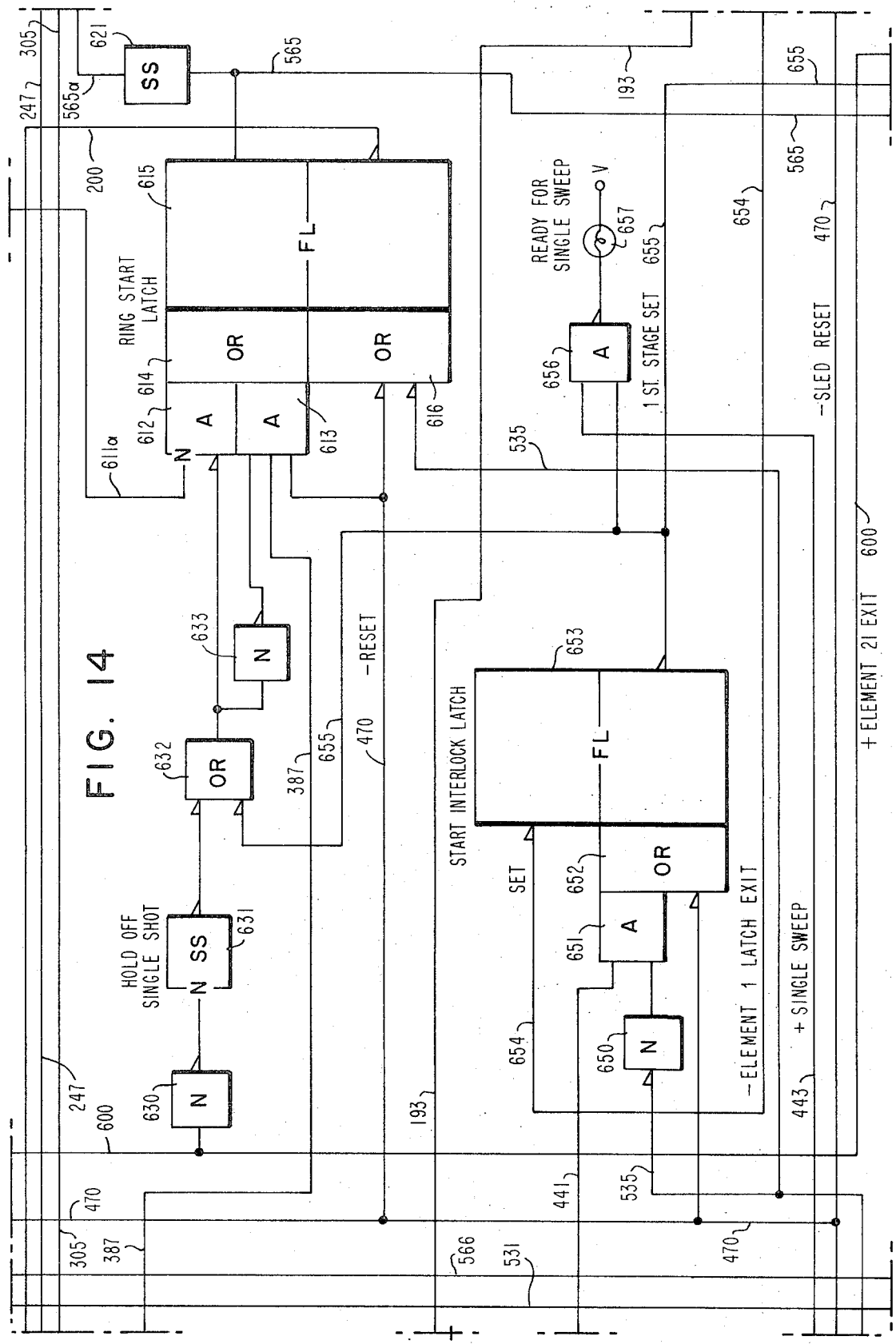

Reference is made next to FIG. 14. The manual trigger 611 in FIG. 13 is connected via a line 611a to an And circuit 612 in FIG. 14. And circuits 612 and 613 are connected to an Or circuit 614 which in turn is connected to the set input of a ring start latch 615. An Or circuit 616 is connected to the reset input of the ring start latch 615.

Signals on the line 600 are supplied through an inverter 630 to a hold-off single shot 631. The hold-off single shot 631 is connected to an Or circuit 632 which in turn is connected to the And circuit 612. The Or circuit 632 also is connected to an inverter 633 which in turn is connected to the And circuit 613. The And circuit 613 and the Or circuit 616 receive signals on the line 470. The And circuit 613 receives signals on the line 387 from the inverter 386 in FIG. 10.

An inverter 650 in FIG. 14 receives signals on the line 535 from the single shot 534 in FIG. 12. The inverter 650 in FIG. 14 is connected to an And circuit 651 which in turn is connected through an Or circuit 652 to the reset input of a start interlock latch 653. The latch 653 is set by a negative signal on a line 654. The latch 653 is reset by a negative signal on the line 470 to the Or circuit 652 or by a negative signal from the And circuit 651 to the Or circuit 652. The And circuit 651 is operated by a positive signal on the line 441 from contact 1 of the trigger mode switch 440 in FIG. 11 and a positive signal from the biverter 650 in FIG. 14. The reset output of the latch 653 is supplied on a line 655 to an And circuit 656, and this And circuit receives signals on the line 443 from contact 8 of the trigger mode switch 440 in FIG. 11. The And circuit 656 in FIG. 14 is connected to an indicator light 657. When this light is illuminated, it signifies that the system is ready for a single sweep. The output from the start interlock latch 653 on the line 655 is supplied also to the Or circuit 632.

The ring start latch 615 in FIG. 14 has its set output connected to the line 565. The reset output of the latch 565 is connected to the line 200. A positive signal from the set output of the ring start latch 615 on the line 565 turns on the oscillator 540 in FIG. 12, and a positive signal from the Or circuit 603 in FIG. 13 on the line 566 turns off the oscillator 540 in FIG. 12. The set output of the ring start latch 615 is connected to a single shot 621 the output of which is connected via a line 565a to the upper and lower buffers described hereinafter.

Figure 15:
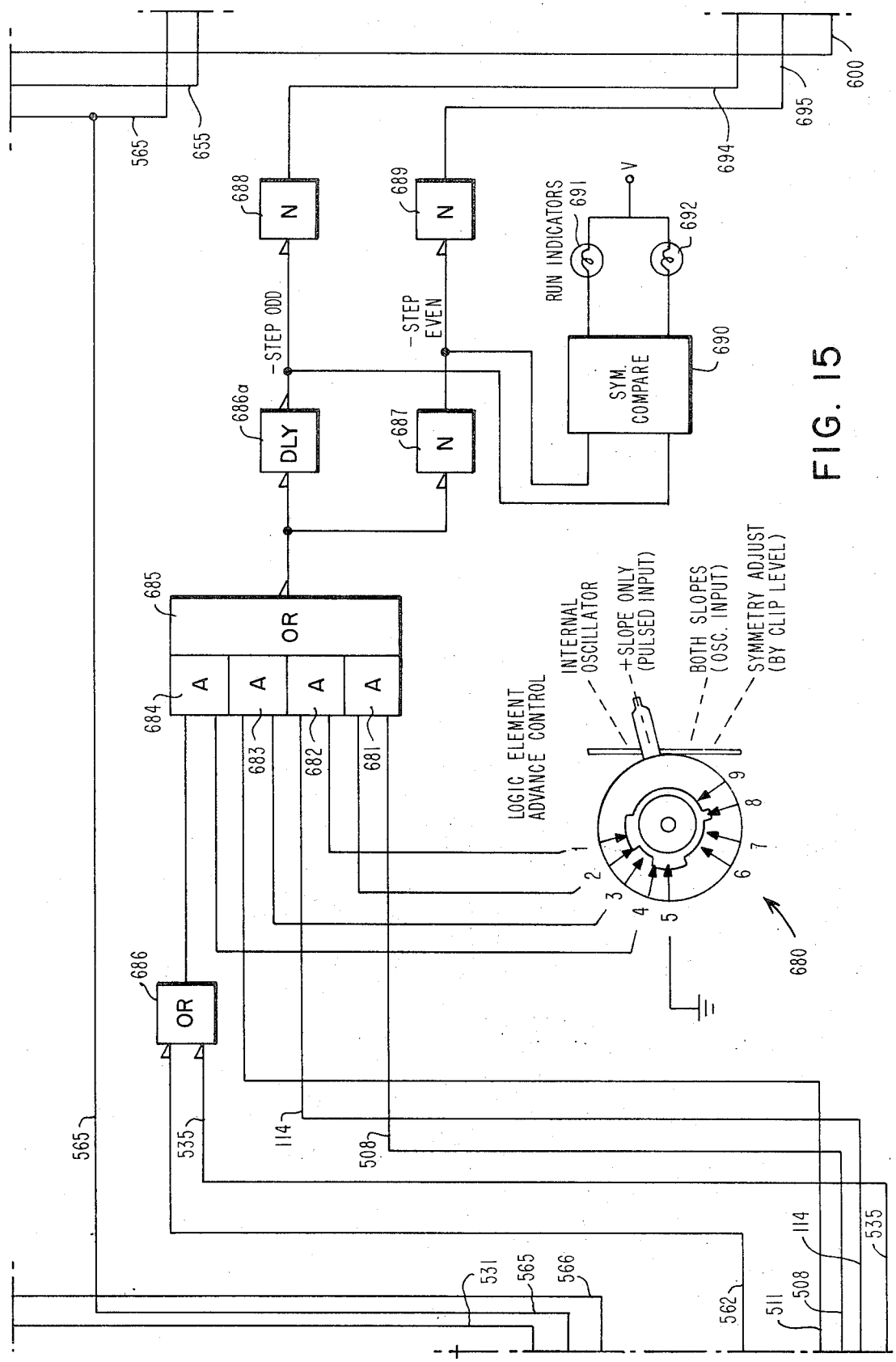

Reference is made next to FIG. 15. A logic element advance control switch 680 is a four-position lever switch which has contacts 1 through 9. Contact 5 is grounded, and contacts 6 through 9 are not used. Table 6 below shows with an X which contacts are grounded when the switch lever is operated in each of its four positions.

TABLE 6

| Lever position | Contacts | | | | | | | | |
|---|---|---|---|---|---|---|---|---|---|
|  | 1 | 2 | 3 | 4 | 5 | 6 | 7 | 8 | 9 |
| Internal oxcillator | X | X | X |  | X |  |  |  | X |
| + Slope only (pulsed input) | X | X |  | X | X |  |  | X |  |
| Both slopes (OSC input) | X |  | X | X | X |  | X |  |  |
| Symmetry adjust (by clip level) | X | X | X | X | X |  |  |  |  |

Contact 1 is connected to an And circuit 682, and contact 2 is connected to an And circuit 681. Contacts 3 and 4 are connected to respective And circuits 683 and 684. The And circuits 681 through 684 are connected to an Or circuit 685. The And circuit 681 receives signals on the line 508 from the inverter 507 in FIG. 12. The And circuit 682 in FIG. 15 receives signals on the line 114 from the amplitude discriminator 15 in FIG. 3. The And circuit 683 in FIG. 15 receives signals on the line 511 from the set output of the binary flip flop 505 in FIG. 12. The And circuit 684 in FIG. 15 receives signals from an Or circuit 686. The Or circuit 686 receives signals on the line 535 from the single shot 534 in FIG. 12. The Or circuit 686 receives signals on the line 562 from the oscillator 28 in FIG. 12.

The output of the Or circuit 685 in FIG. 15 is supplied through a delay circuit 686a to an inverter 688. The output of the Or circuit 685 also is supplied to an inverter 687 the output of which is supplied in turn to an inverter 689. The output of the delay circuit 686a is supplied also to the input of a symmetry compare circuit 690. The output of the inverter 687 is supplied also to the input of this compare circuit. The two outputs of the symmetry compare circuit 690 are connected to respective lights 691 and 692. When these lights are illuminated, they indicate respective step even and step odd pulses are being supplied to the ring circuit 26 in FIG. 1. Signals from the inverter 688 and 689 are supplied to respective output lines 694 and 695. Signals on these lines are employed to step the ring circuit 26 in FIG. 1.

Figure 16:
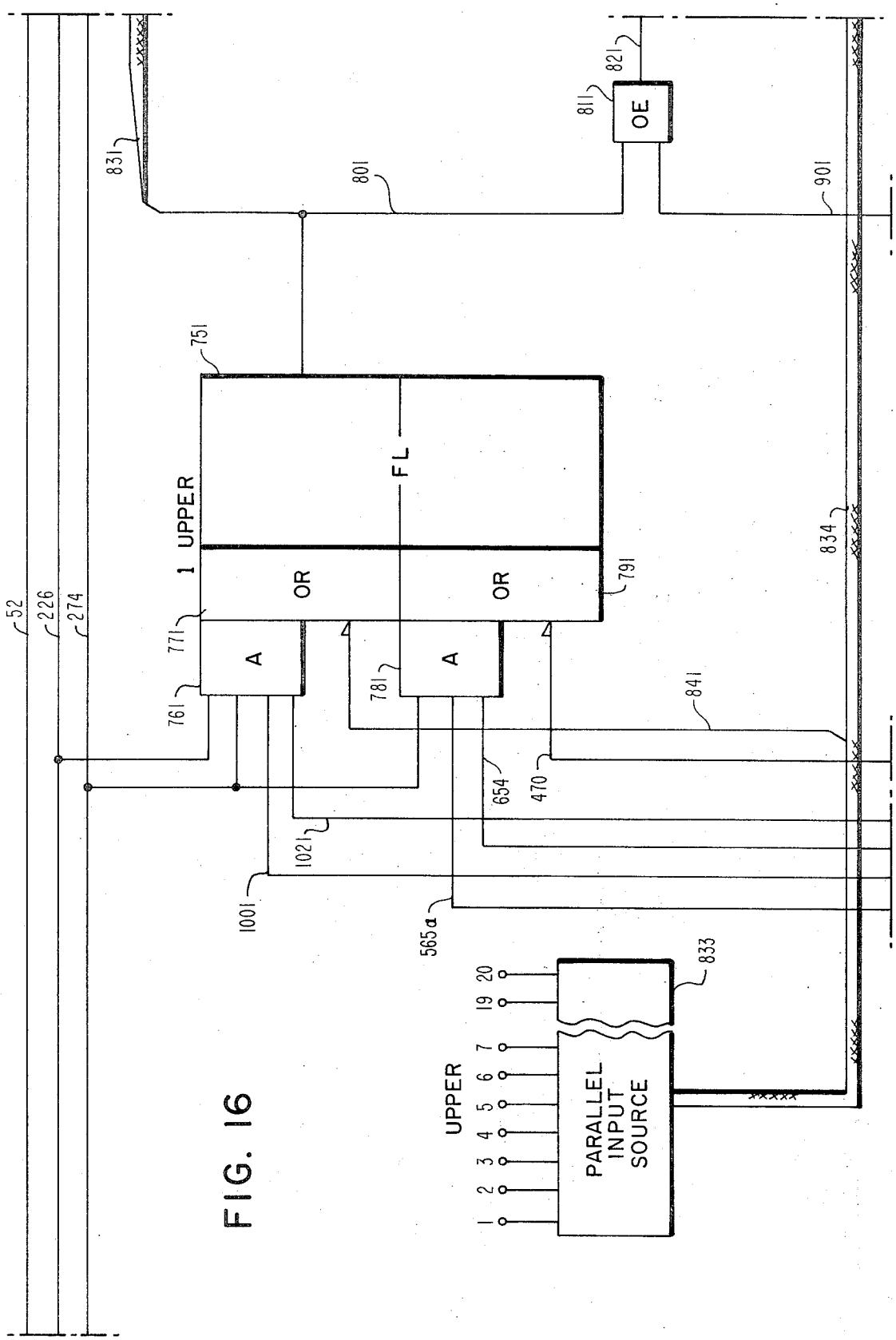
Figure 17:
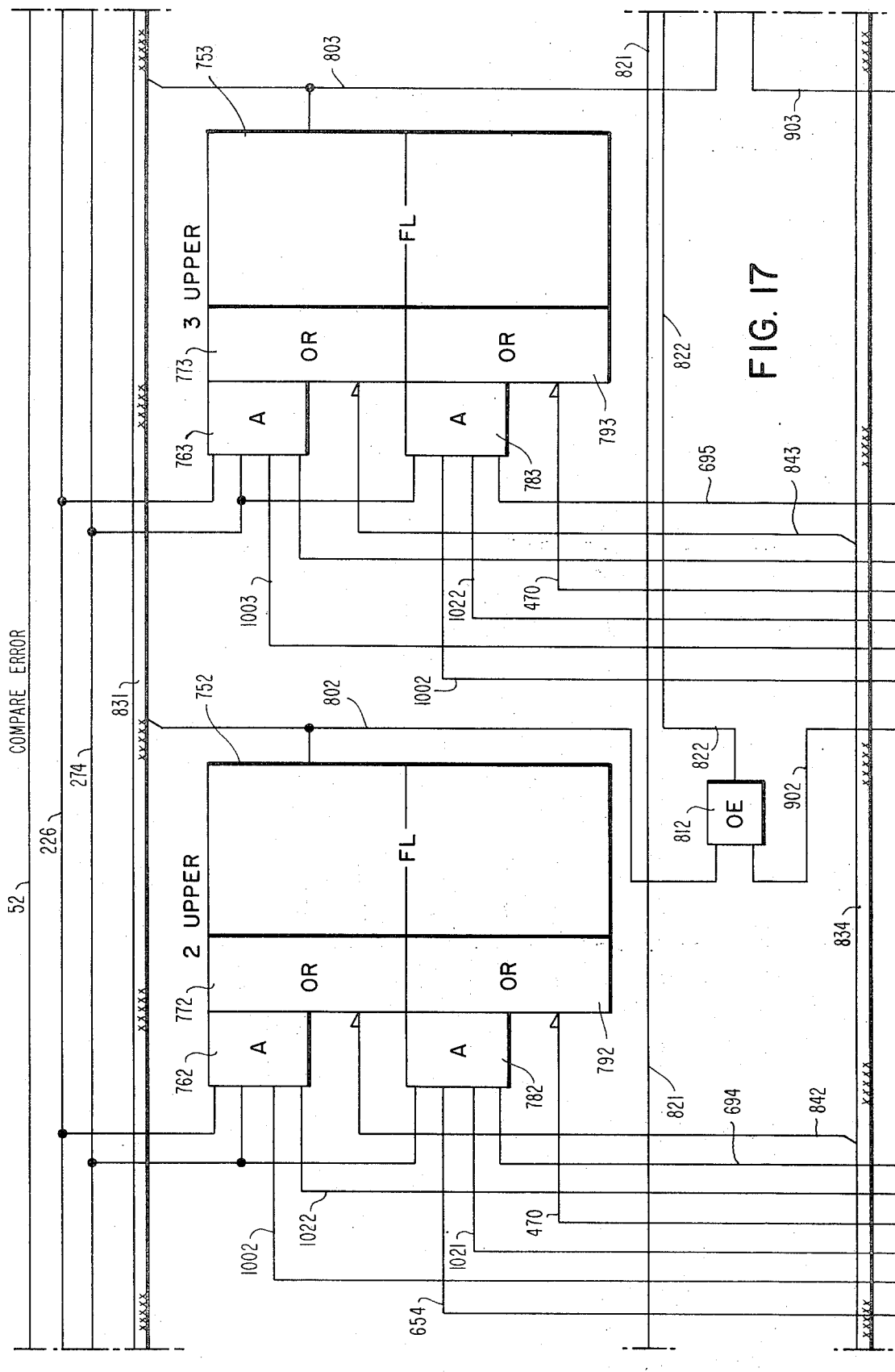
Figure 18:
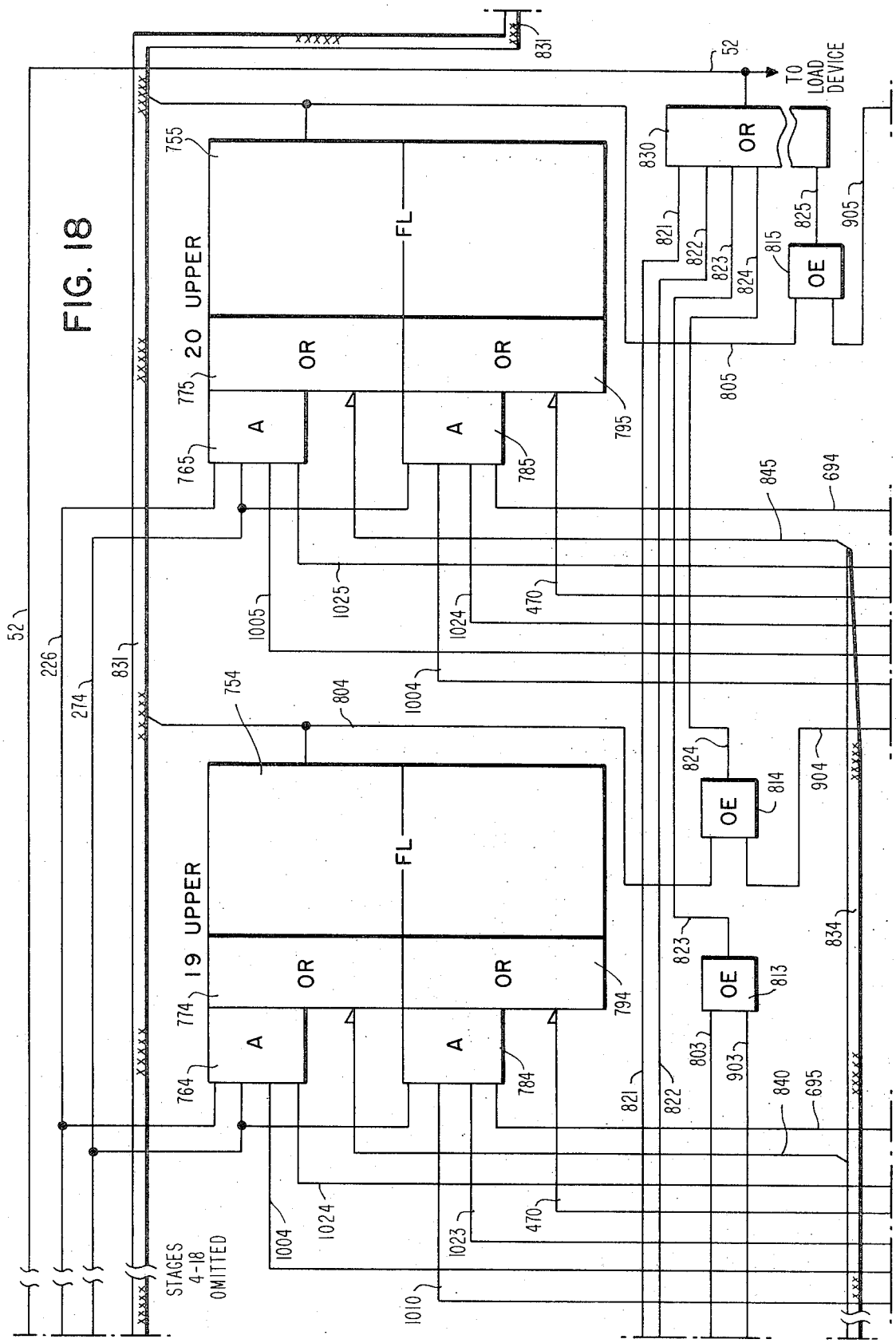

Reference is made next to FIGS. 16 through 18 which illustrate in detail the upper buffer 22 shown in block form in FIG. 1. The upper buffer includes latches 751 through 755. The upper buffer 22 is composed of 20 stages. However, only stages 1,2,3,19, and 20 are shown in the interest of simplicity. And circuits 761 through 765 are connected through associated Or circuits 771 through 775 to the set input of respective latches 751 through 755. And circuits 781 through 785 are connected through associated Or circuits 791 through 795 to the reset input of respective latches 751 through 755. The set outputs of the latches 751 through 755 are conveyed on respective lines 801 through 805 to corresponding exclusive Or circuits 811 through 815. Output signals from the exclusive Or circuits 811 through 815 are conveyed on respective lines 821 through 825 to an Or circuit 830 in FIG. 18. The exclusive Or circuits 811 through 815 serve to compare information stored in the stages of the upper buffer 22 with the information stored in the corresponding stages of the lower buffer 24. If the signals stored in both buffers are identical, negative signals are supplied by the exclusive Or circuits 811 through 815 on corresponding lines 821 through 825 to the Or circuit 830, and the Or circuit 830 in turn supplies a negative output signal on the line 52 which signifies there is no compare error. If, however, the signals stored in any pair of corresponding stages of the upper and lower buffers are unlike, then the associated one of the exclusive Or circuits 813 through 815 supplies a positive output signal to the Or circuit 830, and the Or circuit 830 in turn supplies a positive signal on the line 52 signifying a compare error. The positive signal on the line 52 is supplied to the And circuit 587 in FIG. 13 which in turn supplies a negative output signal to set the compare error latch 585 if the line 248 has a positive signal from contact 4 of the display mode switch 220 in FIG. 6. The positive signal from the set output of the compare error latch 585 is supplied to an And circuit 588 which in turn supplies a negative output signal to set the controlled stop latch 591 if contact 3 of the controlled stop switch 320 in FIG. 8 is open. The positive set output from this latch is supplied on the line 52a to the drive circuits 340 in FIG. 9 which in turn supply appropriate control signals on the lines 121 and 122 to the system under test 10 in FIG. 3. The signals on the lines 121 and 122 may be utilized by this system under 10 to modify its mode of operation.

Signals representing information from the set outputs of the latches 751 through 755 in FIGS. 16 through 18 of the upper buffer 22 are supplied on corresponding lines 801 through 805 via a cable 831 to the display device 40 in FIGS. 25 and 26 where the information may be visually displayed as explained more fully hereinafter. The signals on the lines 801 through 805 of the cable 831 are supplied also to a parallel output data register 832 in FIG. 26.

Information may be inserted in the upper buffer directly from a parallel input source 833 in FIG. 16. Signals representing information from the parallel input source 833 are conveyed on conductors of a cable 834. The cable 834 includes conductors 841 through 845 which are connected through respective Or circuits 771 through 775 to the set input of respective latches 751 through 755.

Figure 19:
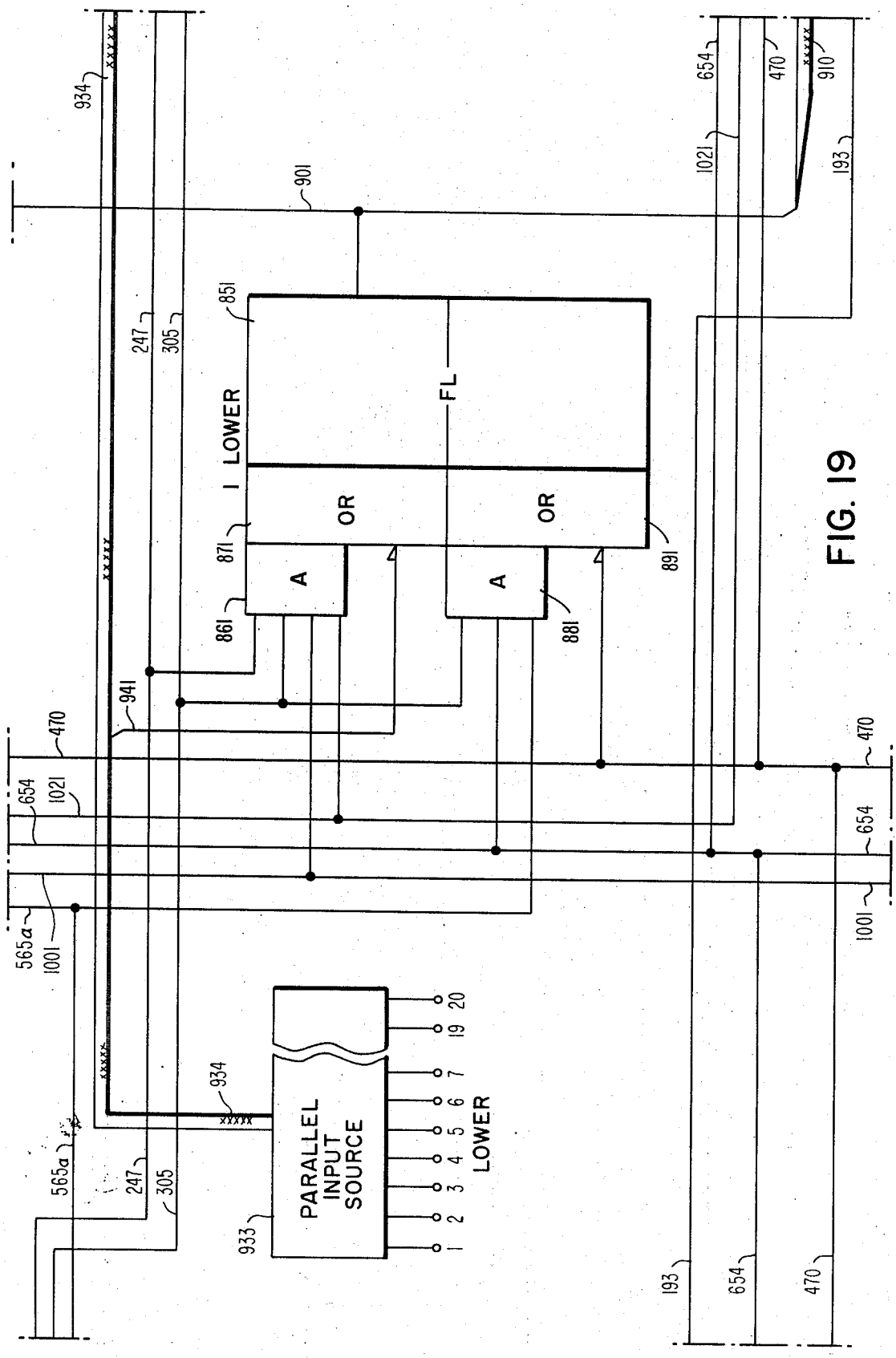
Figure 20:
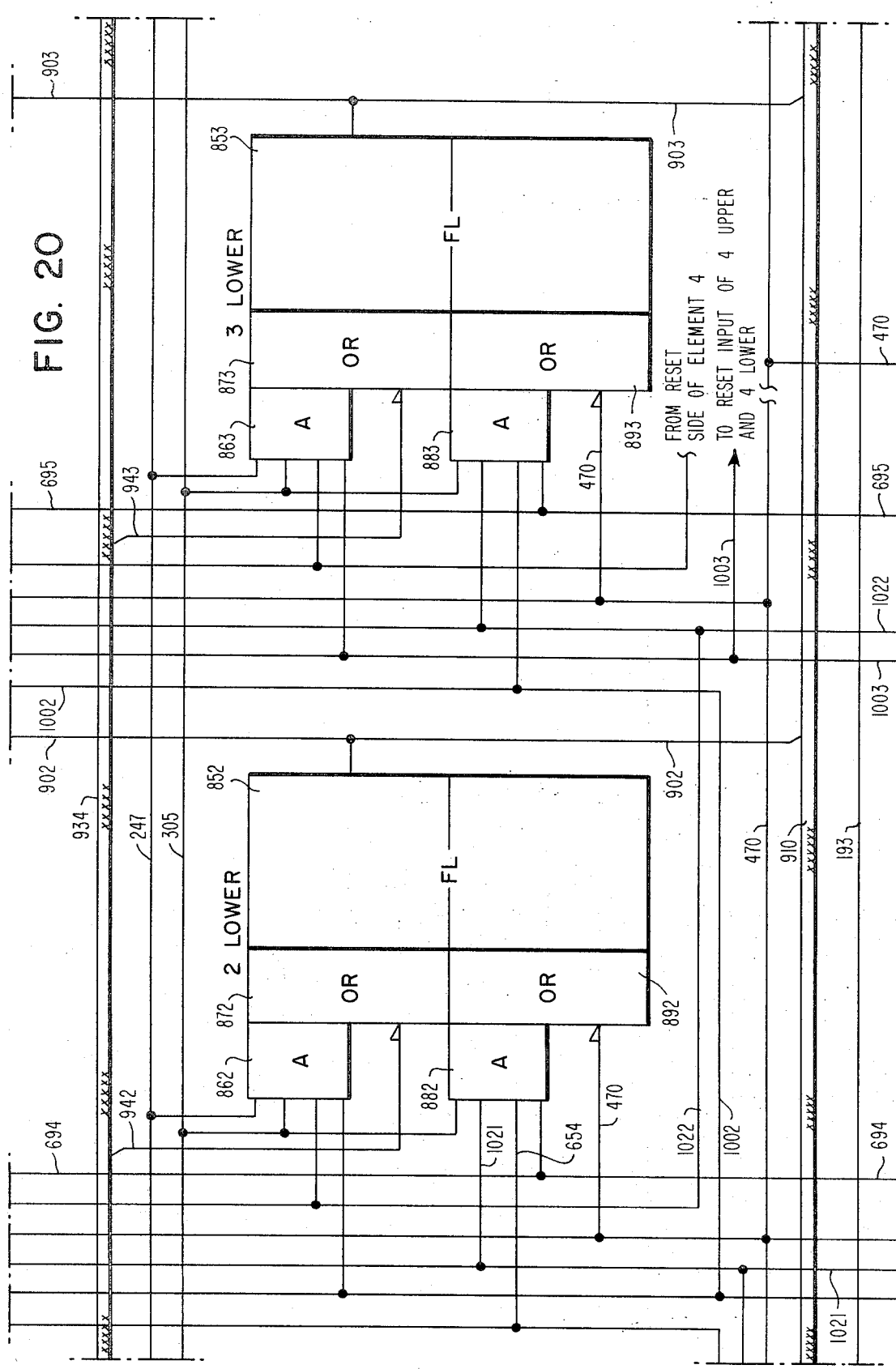
Figure 21:
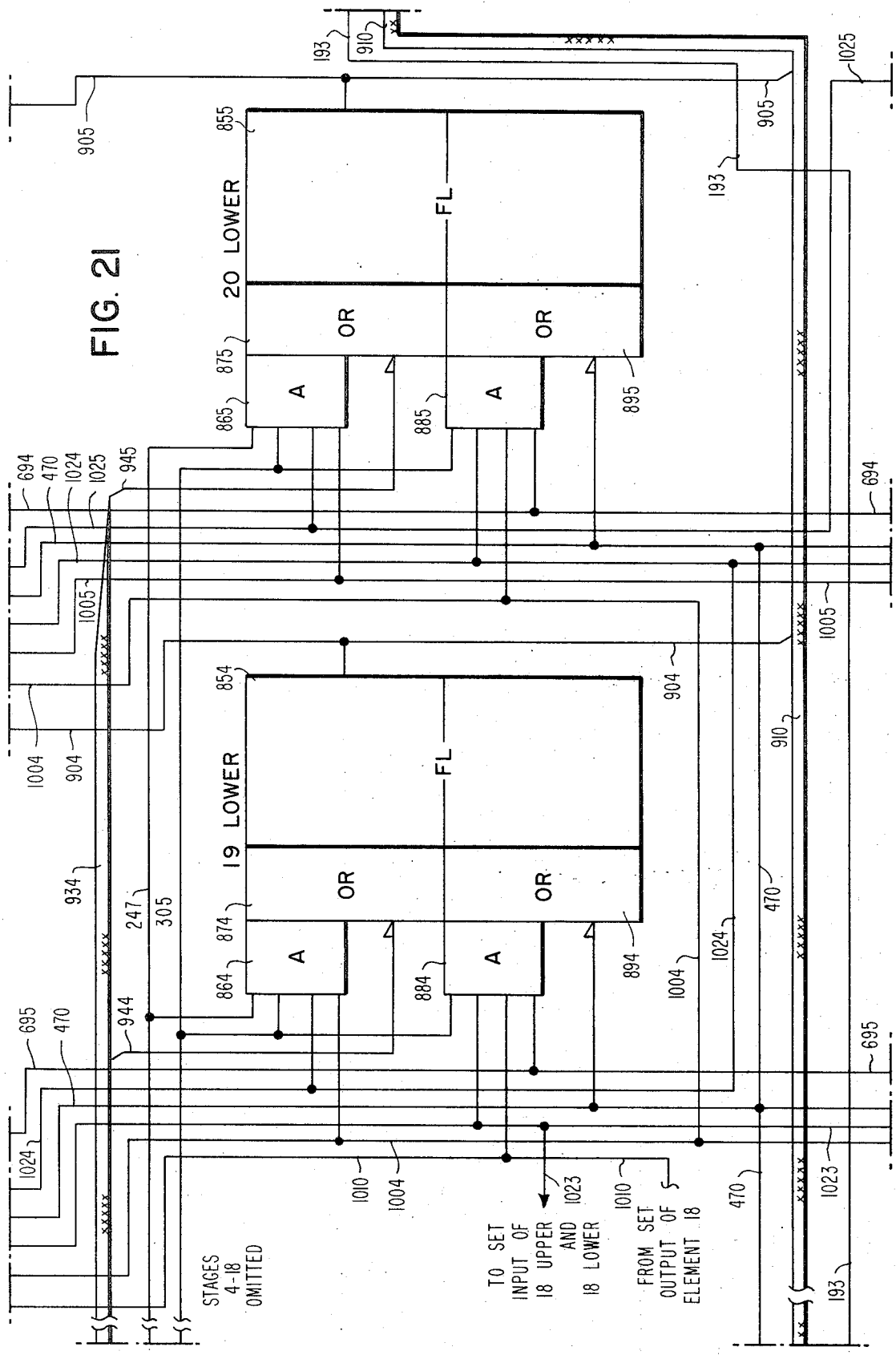

Reference is made next to FIGS. 19 through 21 which illustrate in detail the lower buffer 24 shown in block form in FIG. 1. The lower buffer includes latches 851 through 855. The lower buffer 24 is composed of 20 stages. However, only stages 1,2,3,19, and 20 are shown in the interest of simplicity. And circuits 861 through 865 are connected through associated Or circuits 871 through 875 to the set input of corresponding latches 851 through 855. And circuits 881 through 885 are connected through associated Or circuits 891 through 895 to the reset input of corresponding latches 851 through 855.

Signals from the set output of the latches 851 through 855 are conveyed on respective lines 901 through 905 to the corresponding exclusive Or circuits 811 through 815 in FIG. 16 through 18. Signals on the lines 901 through 905 in FIGS. 19 through 21 are compared in these exclusive with signals on associated lines 801 through 805 in FIGS. 16 through 18 as described above. Signals from the set output of the latches 851 through 855 are supplied also on respective lines 901 through 905 via a cable 910 to a parallel output data register 911 in FIG. 26 and to the display device 40 in FIGS. 25 and 26 where these signals may be displayed as described more fully hereinafter.

A parallel input source 933 supplies information signals on lines disposed in a cable 934. The cable 934 includes conductors 941 through 945 which are connected through corresponding Or circuits 871 through 875 to the set input of corresponding latches 851 through 855. Information from the parallel input source 933 in FIG. 19 may be stored in the latches 851 through 855 of the lower buffer 24 in FIGS. 19 through 21.

Figure 22:
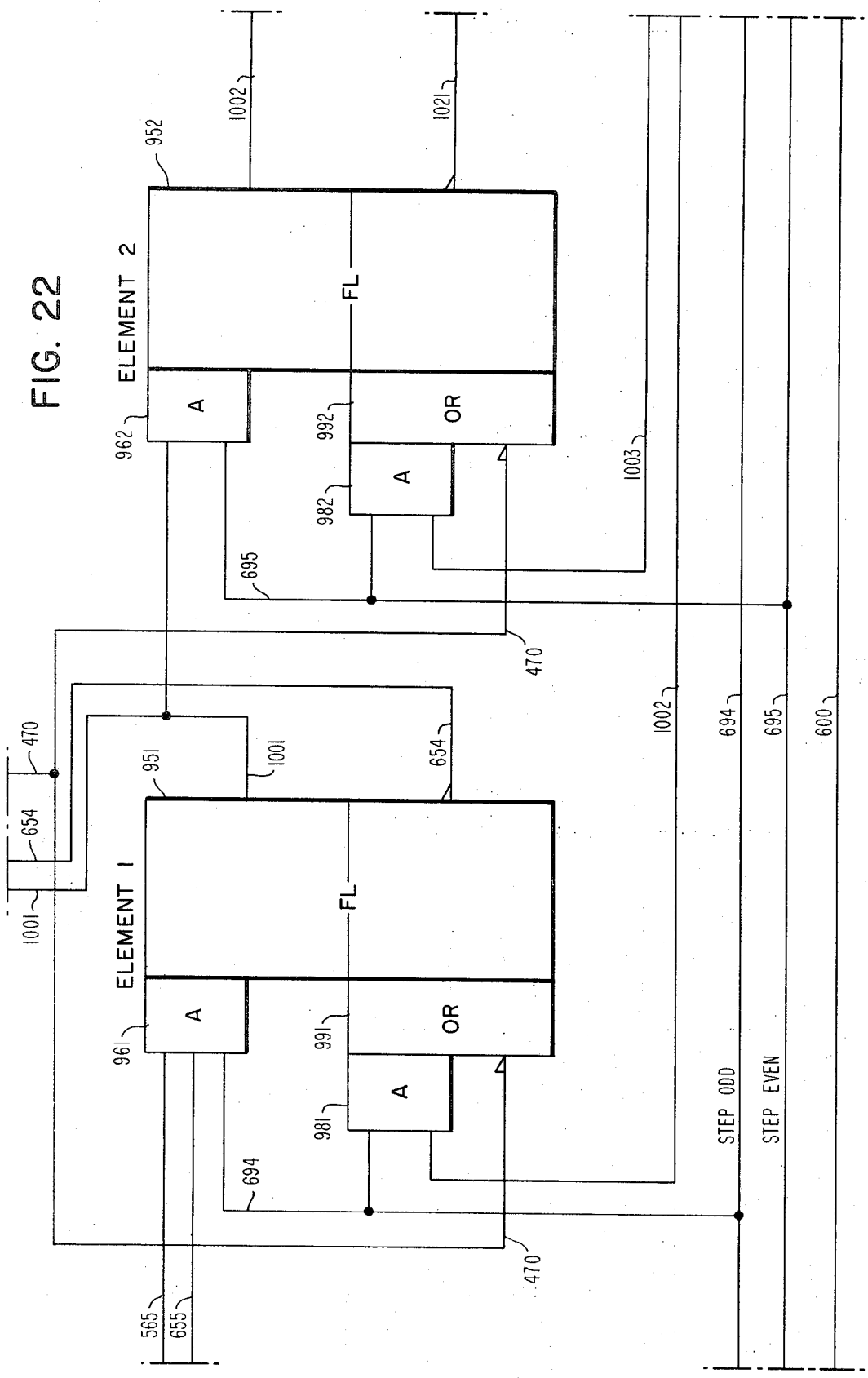
Figure 23:
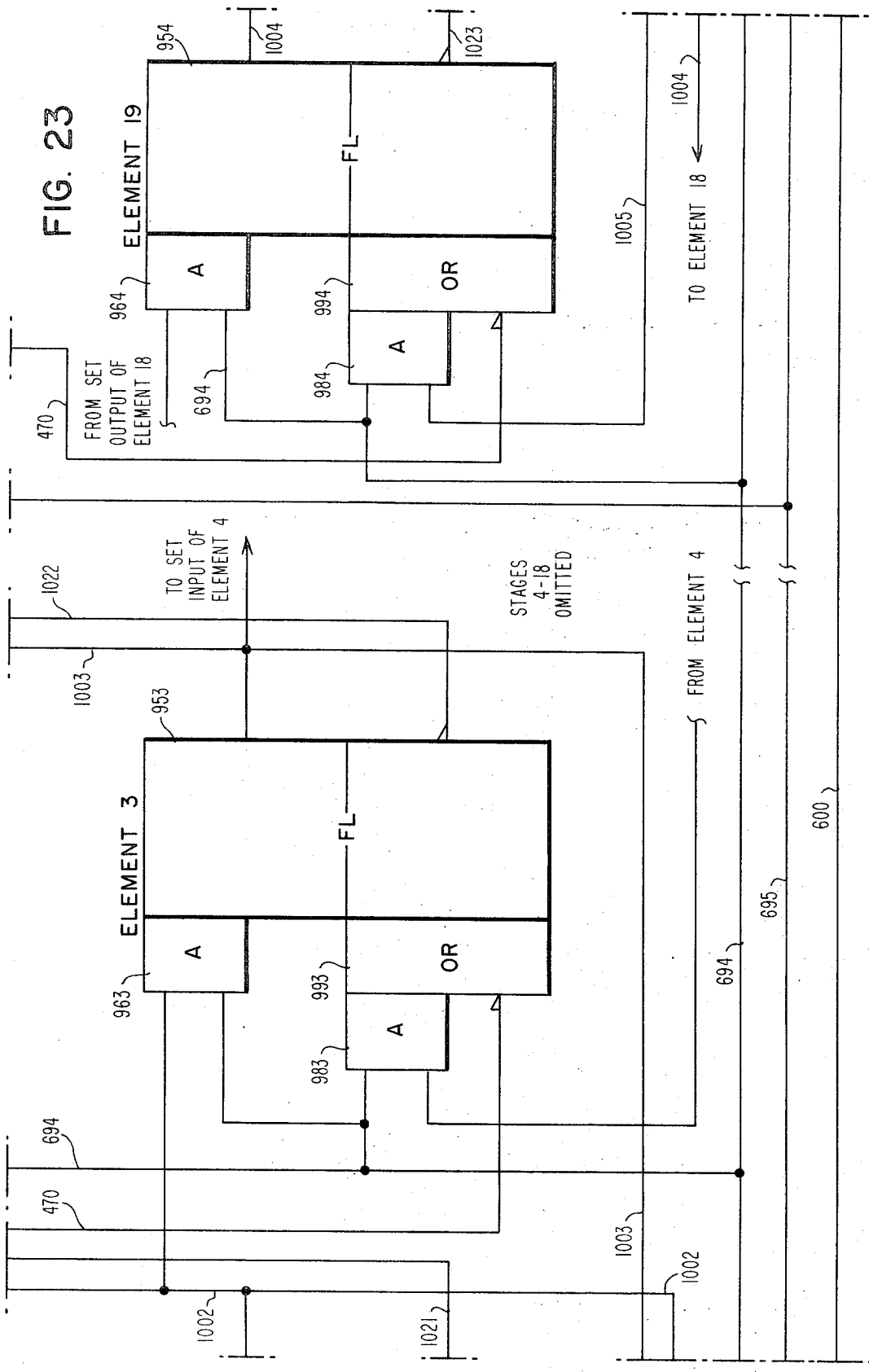
Figure 24:
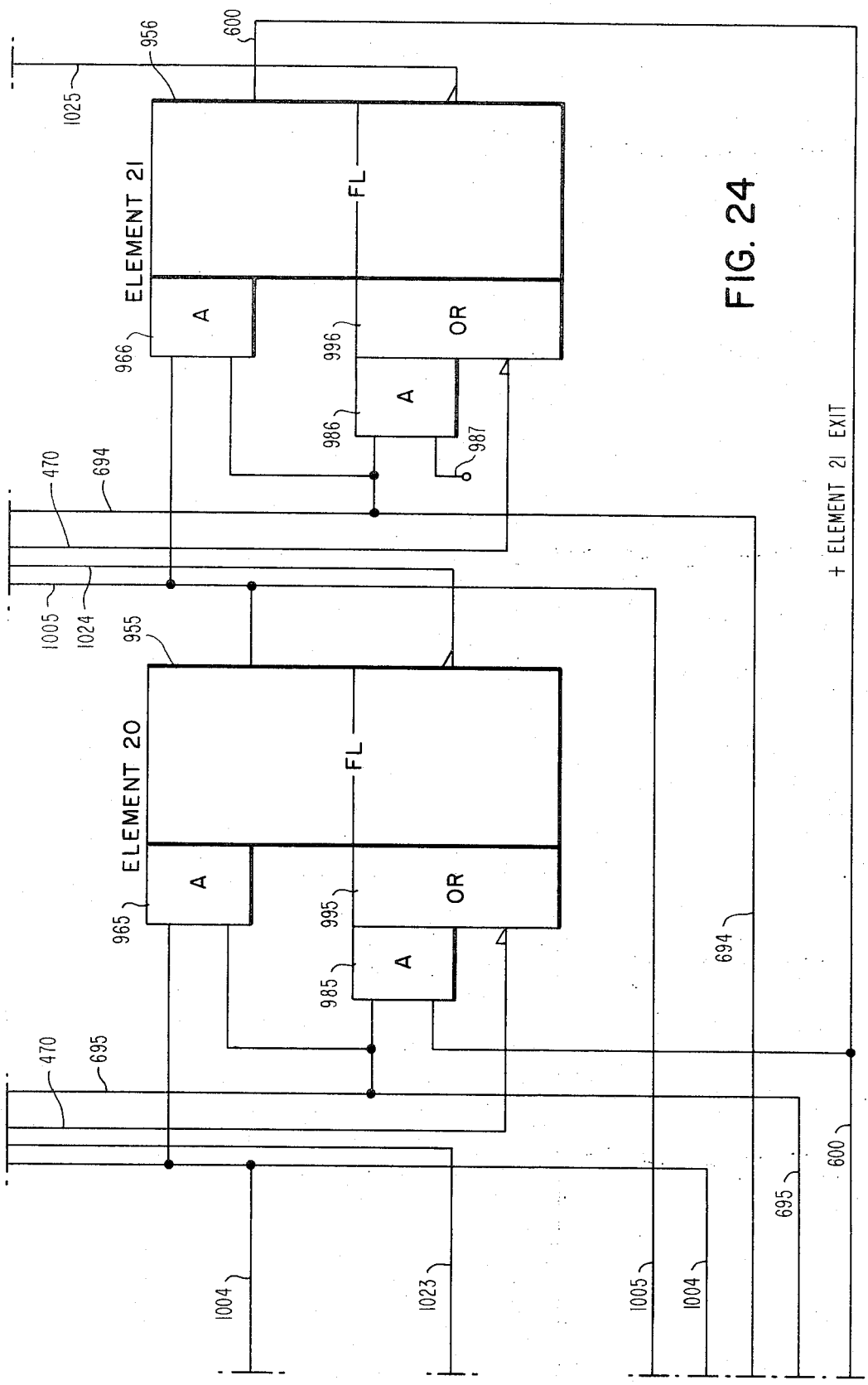

Reference is made next to FIGS. 22 through 24 which illustrate in detail the ring circuit 26 shown in block form in FIG. 1. The ring circuit 26 is composed of latches 951 through 956. The ring circuit has 21 stages, but only stages 1,2,3,19,20, and 21 are shown in the interest of simplicity. And circuits 961 through 966 are connected to the set input of respective latches 951 through 956. And circuits 981 through 986 are connected through respective Or circuits 991 through 996 to the reset input of corresponding latches 951 through 956.

Signals from the set output of the latches 951 through 955 of the ring circuit 26 are conveyed on corresponding lines 1001 through 1005 to corresponding And circuits 761 through 765 of associated latches 751 through 755 of the upper buffer and to corresponding And circuits 861 through 865 of associated latches 851 through 855 of the lower buffer. Signals from the set output of the latch 952 in FIG. 22 are conveyed on the line 1002 also to the And circuits 783 in FIG. 17 and 883 in FIG. 20 of corresponding latches 773 in FIG. 17 and 853 in FIG. 20. Signals from the set output of the latch 953 in FIG. 23 are supplied also on the line 1003 to the reset inputs of stage 4, not shown, of the upper and lower buffers. Signals from the set output of stage 18, not shown, of the ring circuit 26 are supplied on a line 1010 in FIG. 21 to the And circuits 784 in FIG. 18 and 884 in FIG. 20 of associated latches 754 and 854. Signals from the set output of the latch 954 in FIG. 23 on the line 1004 are supplied to the And circuits 785 in FIG. 18 and 885 in FIG. 21 of associated latches 755 and 855. The set output of the latch 956 is conveyed on the line 600 to the inverter 601 in FIG. 13, the inverter 630 in FIG. 14, the And circuit 587 in FIG. 13, and the And circuit 301 in FIG. 8 for control purposes described more fully hereinafter. Signals from the set outputs of latches 952 through 956 are supplied to the reset input of the respective preceding stages 951 through 955 through respective And circuits 981 through 985.

Signals from the reset output of the latches 951 through 955 in FIGS. 22 through 24 are supplied on corresponding lines 654, and 1021 through 1024 to corresponding And circuits 782 through 785 of associated latches 752 through 755 in FIGS. 17 and 18 of the upper buffer and to corresponding And circuits 882 through 885 in FIGS. 20 and 21 of associated latches 852 through 855 of the lower buffer. Signals from the reset output of the latches 952 through 956 on respective lines 654 and 1021 through 1025 are supplied to respective And circuits 761 through 765 in FIGS. 16 through 18 of corresponding latches 751 through 755 and to corresponding And circuits 861 through 865 in FIGS. 19 through 21 of corresponding latches 851 through 855 of the lower buffer.

Figure 25:
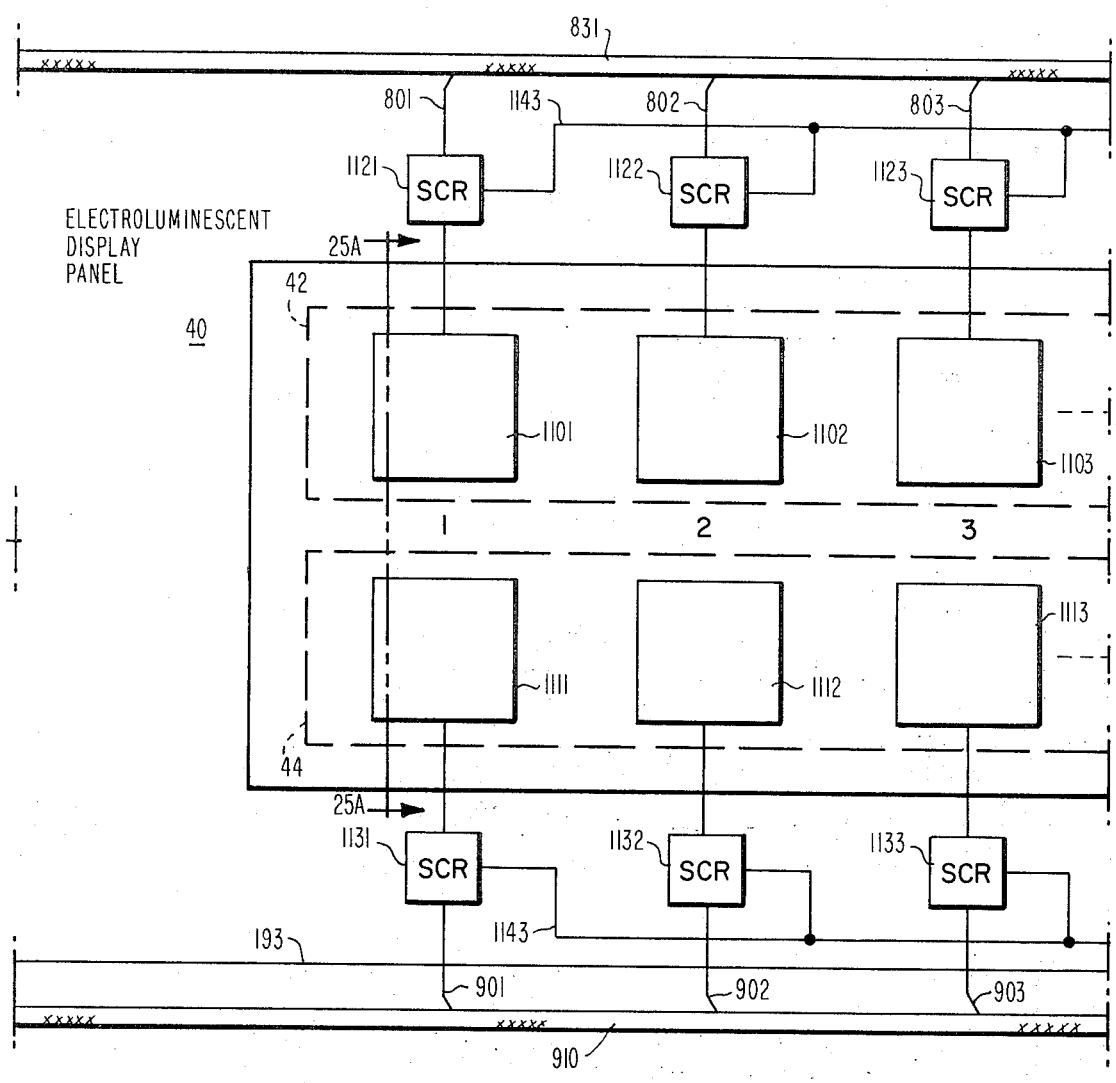
Figure 26:
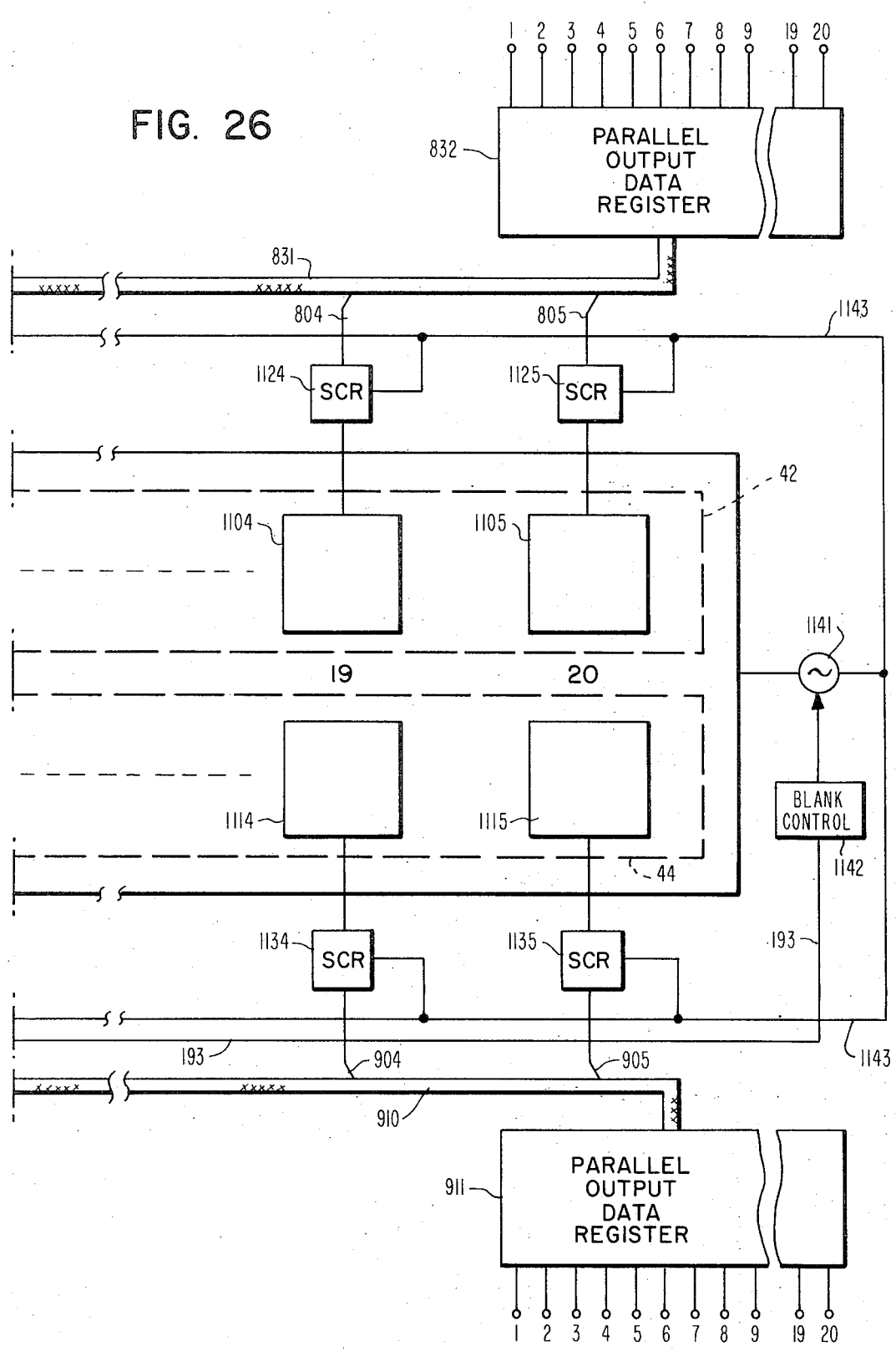

Reference is made next to FIGS. 25 and 26 for a detailed illustration of the display element 40. The display element 40 has an upper display register 42 and a lower display register 44. The upper display register 42 is composed of a plurality of phosphor segments 1101 through 1105. There are as many phosphor segments in each display register as there are stages in the upper and lower buffers. However, only five phosphor segments are shown, and they represent stages 1,2,3,19 and 20. Phosphor segments 1101 through 1105 display information in the respective stages 1,2,3,19, and 20 of the upper buffer. Phosphor elements for stages 4 through 18 of the upper buffer are not shown in the interest of simplicity. The lower register 44 of the display device 40 includes phosphor elements 1111 through 1115 which display information stored in respective stages 1 through 3,19, and 20 of the lower buffer 24. Phosphor elements for stages 4 through 18 of the lower buffer 24 are not shown in FIGS. 25 and 26 in the interest of simplicity.

Signals from the upper buffer 22 on the lines 801 through 805 are supplied to respective silicon controlled rectifiers 1121 through 1125. The silicon controlled rectifiers 1121 through 1125 are connected to respective phosphor elements 1101 through 1105. Signals from the lower buffer 24 on lines 901 through 905 are supplied to respective silicon controlled rectifiers 1131 through 1135 which in turn are connected to corresponding phosphor elements 1111 through 1115. A source of alternating current 1141 in FIG. 26 supplies an alternating potential on a line 1143 to the silicon controlled rectifiers 1121 through 1125 and 1131 through 1135. A blank control 1142 in FIG. 26 responds to signals on the line 193 to control the alternating current source 1141. A positive signal on the line 193 operates the blank control 1142 to reduce the amplitude of the source 1141 thereby to deactivate the silicon controlled rectifiers 1121 through 1125 and 1131 through 1135. A negative signal on the line 193 operates the blank control 1142 to increase the amplitude of the source 1141 thereby to condition the silicon controlled rectifiers 1121 through 1125 and 1131 through 1135, and the silicon controlled rectifiers may then respond to signals from the upper and lower buffers. When the source 1141 is applied to the line 1143, the silicon controlled rectifiers 1121 through 1125 respond to positive signals on corresponding lines 801 through 805 to illuminate associated phosphor elements 1101 through 1105. When the source 1141 is applied on the line 1143 to the silicon controlled rectifiers 1131 through 1135, they respond to positive signals on respective lines 901 through 905 to illuminate corresponding phosphor elements 1111 through 1115. When the source 1141 is removed or its amplitude is decreased sufficiently, the silicon controlled rectifiers 1121 through 1125 and 1131 through 1135 are deactivated, and the associated phosphor elements 1101 through 1105 and 1111 through 1115 are not illuminated by positive signals on the associated lines 801 through 805 or the lines 901 through 905.

Figure 25A:
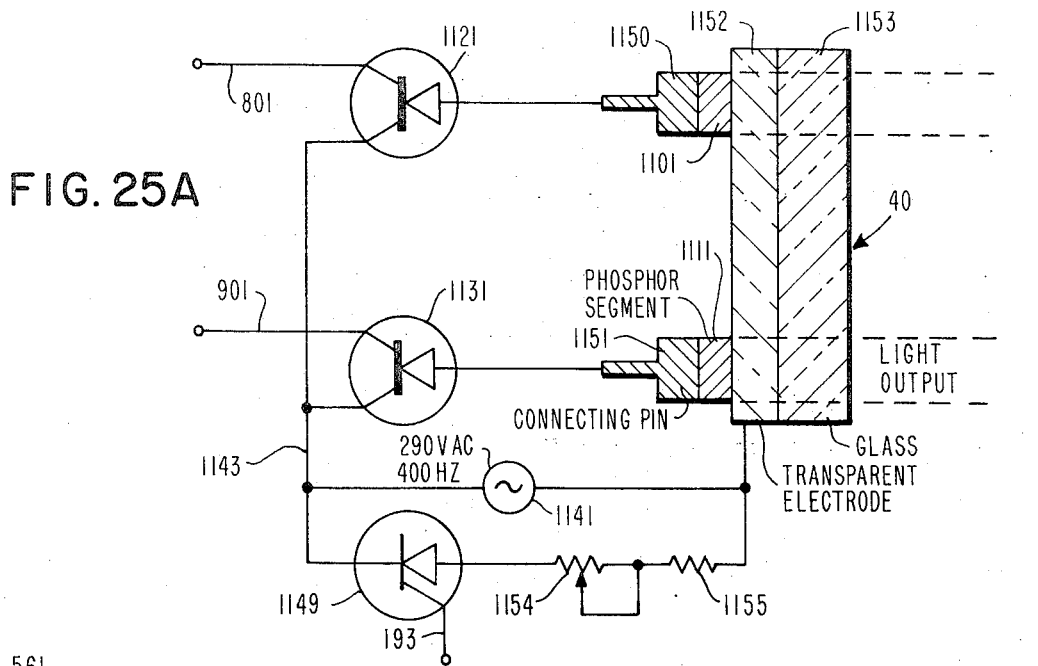
FIG. 25A is a view showing in more detail a display device utilized in this invention a portion of which is a cross-sectional view taken on the line 25A—25A in FIG. 25.

Reference is made next to FIG. 25A which is a view taken on the line 25A—25A in FIG. 25 showing phosphor elements 1101 and 1111 in cross section, and associated circuit components are shown connected therewith. The silicon controlled rectifiers 1121 and 1131 are connected through respective connecting pins 1150 and 1151 to associated phosphorous elements or segments 1101 and 1111. These phosphorous segments are attached to a transparent electrode 1152. The transparent electrode 1152 is protected by a glass plate 1153. The source of alternating current 1141 is connected between the transparent electrode 1152 and the silicon controlled rectifiers 1121 and 1131. The blank control 1142 in FIG. 26 is a silicon controlled rectifier 1149 and resistors 1154 and 1155 which form a series circuit. The resistor 1154 is variable. The alternating current source 1141 is shunted by the series circuit including the silicon controlled rectifier 1149 and the resistors 1154 and 1155. When a positive signal is supplied on the line 193 to the silicon controlled rectifier 1149, this rectifier is turned on, and most of the power from the source 1141 is dissipated in the resistors 1154 and 1155. This causes the silicon controlled rectifiers 1121 and 1131 to be deconditioned or turned off whereby the display 40 is blanked. When a negative signal is supplied on the line 193 to the silicon controlled rectifier 1149, this rectifier is deconditioned or turned off, and the power from the source 1141 is applied to condition the silicon controls rectifiers 1121 and 1131. If a positive signal is applied on the line 801 to the silicon controlled rectifier 1121, it then conducts, and the signal from the source 1141 is supplied through the pin 1150 to the phosphor segment 1101. The signal across this phosphor segment causes it to be illuminated, and light is projected outwardly from the face place 1153. If a positive signal is applied on the line 901, the silicon controlled rectifier 1131 is rendered conductive, and the signal from the source 1141 is applied across the phosphor segment 1111. This causes the phosphor segment 1111 to be illuminated and light is projected from the face plate 1153. Thus it is seen how the display device 40 in FIGS. 25 and 26 is operated in some instances where it is not essential for an operator to view the display device 40, a positive signal may be applied on the line 193 to blank the display. This increases the useful life of the phosphorous segments.

Figure 12A:
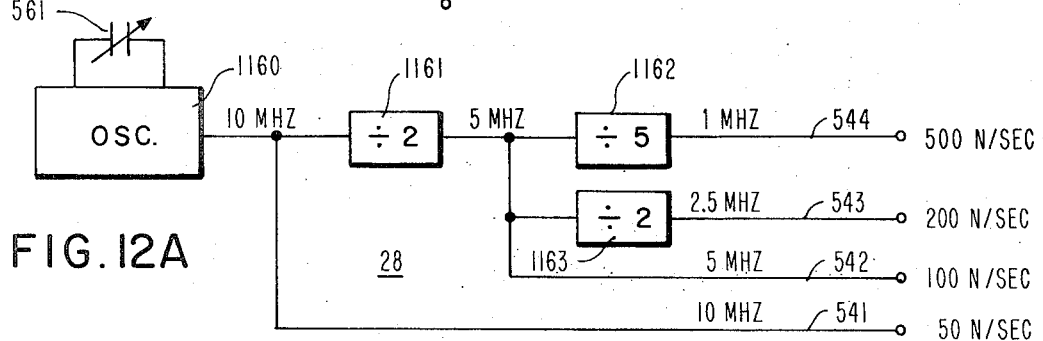
FIG. 12A illustrates in greater detail the construction of the oscillator in FIGS. 1 and 12.

Reference is made next to FIG. 12A which illustrates in greater detail the construction of the oscillator 28 shown in block form in FIG. 12. The oscillator 28 includes a base frequency oscillator 1160 having a frequency of 10 MHZ. This base frequency is reduced by frequency dividers 1161 through 1163. The lines 541 through 544 provide respective output frequencies of 10,5,2,5 and 1.0 MHZ. A variable capacitor 561 may be changed to vary the base frequency oscillator over a given range. Additional dividers may be employed to provide further divisions of the range of frequencies provided by the base frequency oscillator 1160.

Pulses from the oscillator 28 in FIG. 12 are supplied through a switch 560, the OR circuit 686 in FIG. 15, the And circuit 684, the OR circuit 685, the delay circuit 686a, the inverter 688 and on the line 694 to the shift register 26 in FIGS. 22 through 24. The pulses supplied on the line 694 are the odd pulses from the oscillator. Oscillator pulses from the Or circuit 685 in FIG. 15 are supplied through an inverter 687, and an inverter 689 on the line 695 to the shift register 26 in FIGS. 22 through 24. The oscillator pulses on the line 695 are even pulses. The odd pulses on the line 694 are shown in FIG. 12B, and the odd pulses are used to operate the odd numbered stages of the shift register 26 in FIGS. 22 through 24. The even pulses on the line 695 in FIG. 15 are shown in FIG. 12C, and they are used to operate the even numbered stages of the shift register 26 in FIGS. 22 through 24. The latches in the 21 stages of the ring circuit 26 in FIGS. 22 through 24 are labelled element 1 through element 21. More specifically, the latches 951 through 956 are labelled respectively as elements 1,2,3,19,20, and 21. The element 1 latch is set by the leading edge of oscillator odd pulse 1, and it is reset by the leading edge of odd pulse 3 as shown in FIG. 12D. The element 2 latch is set by the leading edge of even pulse 2, and it is reset by the leading edge of even pulse 4 as shown in FIG. 12E. The element 3 latch is set by the leading edge of odd pulse 3, and it is reset by the leading edge of odd pulse 5 as shown in FIG. 12F. The element 20 latch is set by the leading edge of even pulse 20, and it is reset by the leading edge of oscillator pulse 22 as shown in FIG. 12G. The element 21 latch is set by the leading edge of odd pulse 21, and this establishes a positive signal from the set output on the line 600 labelled element 21 exit. The positive signal on the line 600 passes through the inverter 601 in FIG. 13 and presents a negative pulse to the single shot 602. The negative going signal operates the single shot 602 which in turn provides a negative output signal on the line 531 to the single shot 532 in FIG. 12. The single shot 532 responds to the negative going input signal and provides a negative output signal which is inverted by the inverter 533 to a positive signal, and the trailing edge of this positive signal is a negative going signal which operates the single shot 534 to provide a negative output signal on the line 535, labelled dummy oscillator pulse, to the Or circuit 686 in FIG. 15. The Or circuit 686 responds to the negative input pulse to provide a positive output signal through the And circuit 684 to the Or circuit 685 when contact 4 of the logic element advance switch 680 is open. The Or circuit 685 responds to a positive input signal and supplies a negative output signal through the delay circuit 686a to the inverter 688, and the output of this inverter is a positive signal on the line 694 which is applied to the And circuits 966 and 986 in FIG. 24. The element 20 latch is reset by even pulse 22, and thereafter the set output supplies a negative signal level to the And circuit 966 which inhibits the operation of this And circuit. The And circuit 986 receives a conditioning level at all times on the line 987, and the positive dummy oscillator signal on the line 694 passes through to the Or circuit 996. The Or circuit 996 responds to a positive input signal and provides a negative output signal which resets the element 21 latch. Thus all of the latches in the ring circuit are reset at the end of a sweep. Before the element 21 latch is reset the negative signal from the single shot 602 in FIG. 13 is supplied to the Or circuit 603. The Or circuit 603 responds to the negative input signal and supplies a positive output signal on the line 566 which turns off the oscillator 28 in FIG. 12. The dummy oscillator pulse from the single shot 534 in FIG. 12 is a substitute pulse. Since the oscillator is turned off after the element 21 latch is set, odd pulse 23 is not generated. Hence the substitute pulse is termed a dummy oscillator pulse. Thus it is seen how the ring circuit operates through a complete cycle to set and reset each stage sequentially in response to the odd and even oscillator pulses shown in FIGS. 12B and 12C.

The positive signals successively provided by the element 1 through element 21 latches in FIGS. 22 through 24 are used to operate successively the corresponding stages of the upper buffer 22 in FIGS. 16 through 18 and the stages of the lower buffer 24 in FIGS. 19 through 21. One complete cycle of the ring circuit constitutes a sweep. The successive positive signals from the element 1 through element 21 latches in FIGS. 22 through 24 are shown in respective FIGS. 12D through 12H, and these positive signals define time windows during which the associated stages of the upper and lower buffers may be changed in response to one or more signals under investigation from one or more selected amplitude discriminators in FIG. 3. If an input signal exceeds its clipping level, the associated stage of the buffers are set, and if the incoming signal is less than the clipping level, the associated stages of the buffers remain reset. In some instances, however, the stages of the lower buffer may be set in response to a signal which is less than the clipping level. For example, where both display registers display the same signal, the upper display register 42 in FIGS. 25 and 26 may display signals which exceed the clipping level, and the lower register 44 may display signals which are less than the clipping level.

In order to illustrate how the ring circuit 22 through 24 permits samples of the input signal to be stored in the corresponding stages of the upper and lower buffers, let it be assumed that during a sweep the positive even pulse 2 in FIG. 12C is applied to the element 2 latch in FIG. 22. This causes the element 2 latch to be changed from the reset state to the set state, and a positive pulse from the set output on the line 1002 is initiated as shown in FIG. 12E. This positive signal is supplied to the And circuits 762 and 862 which are associated with the respective latches 752 and 852 in respective FIGS. 17 and 20. First the upper And circuit 762 is considered. The And circuit 762 receives a positive signal on the line 1022 from the reset output from the latch 953 in FIG. 23 because this latch is reset at this time. The And circuit 762 in FIG. 17 receives a positive signal on the line 274 from the upper read in control latch 270 in FIG. 7 which is reset whenever signals from the selected amplitude discriminator are to be stored in the upper buffer 22. A negative signal from the set output is changed to a positive signal by the inverter 273 and supplied as a positive signal on the line 274. The And circuit 762 in FIG. 17 receives a positive signal on the line 226 from the selected amplitude discriminator provided the output signal from this amplitude discriminator exceeds the clipping level. Consequently, if all of the inputs to the And circuit 762 receive positive signals, the And circuit 762 supplies a positive signal to the Or circuit 772 which in turn supplies a negative output signal to the set input of the latch 752, and this latch is changed from the reset state to the set state. This latch then supplies a positive signal from the set output on the line 802 to the exclusive Or circuit 812. If the input signal on the line 226 to the And circuit 762 is a negative signal, then the And circuit 762 is not conditioned, and the latch 752 remains in the reset condition. In this case the set output supplies a negative signal on the line 802 to the exclusive Or circuit 812.

Next the And circuit 862 is considered. The And circuit 862 receives a positive signal on the line 1022 from the reset output of the latch 953 in FIG. 23 because this latch is reset. The And circuit 862 in FIG. 20 receives a positive signal at all times on the line 305 from the inverter 304 in FIG. 8. The And circuit 862 in FIG. 20 receives positive and negative signals from a selected amplitude discriminator on the line 247 from a selected amplitude discriminator. In some instances a positive signal on the line 247 signifies that the input signal exceeds the clipping level, and in other instances a positive signal on the line 247 indicates that the input signal is less than the clipping level. If the And circuit 862 in FIG. 20 receives positive signals on all of its inputs, it supplies a positive signal to the Or circuit 872 which in turn supplies a negative signal to the latch 852 thereby to set this latch and provide a positive signal on the line 902 to the exclusive Or circuit 812 in FIG. 17. If the And circuit 862 does not receive positive signals on all of its inputs, the latch 852 remains in the reset state in which case it supplies a negative signal from the set output on the line 902 to the exclusive Or circuit 812 in FIG. 17. When the element 3 latch in FIG. 23 is set by the leading edge of odd pulse 3 in FIG. 12B, a negative signal is supplied from the reset output on the line 1022 to the And circuit 762 and 862, and they are deconditioned. The negative signal on the line 1022 serves to terminate the time window for the latches 752 and 852. The effective time window for the latches 752 and 852 is defined by the crosshatch area of the positive signal in FIG. 12E.

It is pointed out that the time window defined by the crosshatched area of the positive pulse in FIG. 12E provides the latches 752 and 852 an opportunity to change state in response to the condition of the input signal. If a positive input signal of short duration is applied to either of these latches during this time window, such latch is set. The positive input signal may be of relatively short duration compared to the duration of the crosshatched area of the positive pulse shown in FIG. 12E. It is possible, therefore, for the latch 752 in FIG. 17 to be set by a short positive pulse during one portion of the time window defined by the positive pulse in FIG. 12E, and the latch 852 in FIG. 20 may be set by a positive pulse of relatively short duration which may occur at a different time within the time window defined by the positive pulse in FIG. 12E. Thus, it is seen that either, neither, or both of the latches 752 and 852 may be set during the time window defined by the crosshatched area of the positive pulse in FIG. 12E from the set output of the element 2 latch in FIG. 22.

When the odd pulse 3 in FIG. 12B appears on the line 694 in FIG. 23, it sets the element 3 latch, and a positive signal from the set output, shown in FIG. 12F, is supplied on the line 1003 to the And circuits 763 and 863 which are associated with the set inputs of the respective latches 763 and 853 in FIG. 17 and 20. Their time window commences at this point, and they may be changed according to the incoming data signals in the manner explained above with reference to latches 752 and 852 in FIGS. 17 and 20.

As subsequent odd and even pulses are received, the stages of the ring circuit 26 in FIGS. 22 through 24 are operated in like manner to provide time windows for corresponding stages of the upper and lower buffers in FIGS. 16 through 21, and these windows are defined by the crosshatched areas of the positive pulses shown in FIGS. 12D through 12G. It is pointed out that the crosshatched areas defining time windows control when the set inputs may be operated to set the various stages of the upper and lower buffers. The latches in the upper and lower buffers are reset prior to the time windows shown by the crosshatched areas in FIGS. 12D through 12H. Next the reset operation is discussed.

Stage one of the upper and lower buffers is a special case. The latches 751 and 851 in FIGS. 16 and 19 are reset by positive signals on the lines 654 and 565a to respective And circuits 781 and 881. The reset output of the latch 951 in FIG. 22 provides a positive signal on the line 654 to the And circuits 781 and 881 at all times except when the element 1 latch is set. Thus, the line 654 has a positive signal level most of the time. The line 565a likewise has a negative signal level most of the time. Whenever a sweep is to be initiated, the ring start latch 615 in FIG. 14 is set, and the positive signal from the set output on the line 565 operates the single shot 621 to supply a positive signal on the line 565a to the And circuits 781 and 881. This positive signal is of short duration, and it is sufficient to operate the And circuits 781 and 881 to reset the associated latches 751 and 851 in FIGS. 16 and 19. This reset operation takes place before the commencement of the oscillator odd and even pulses. The remaining latches in the upper and lower buffers are reset by the odd and even oscillator pulses. The odd 1 pulse on the line 692 is used to set the element 1 latch in FIG. 22, and the odd 1 pulse on the line 694 is supplied to the And circuits 782 and 882 to reset the second stage latches 752 and 852 in FIGS. 17 and 20. The And circuits 782 and 882 in FIGS. 17 and 20 receive positive signals on all of their input line when the odd 1 pulse arrives. The element 2 latch remains reset at this time, and it supplies a positive signal from its reset output on the line 1021 to the And circuits 782 and 882. At the time the oscillator odd 1 pulse arrives the element 1 latch in FIG. 22 is reset, and it supplies a positive signal on its output line 654 to the And circuits 782 and 882. The line 305 supplies a positive signal at all times to the And circuit 882 in FIG. 20. Therefore, when the positive oscillator odd 1 pulse arrives on the line 694, the And circuit 882 receives positive signals on all of its inputs, and it supplies a positive signal to the Or circuit 892 which is effective to reset the latch 852 in FIG. 20. The And circuit 782, however, in FIG. 17 receives a positive signal on the line 274 if, and only if, the input signal is to be sampled and stored in the upper buffer. Otherwise, a negative signal is supplied on the line 274 to inhibit the latch 752 in FIG. 17 from being changed. Thus information stored in the upper buffer is protected by a negative signal on the line 274. If, on the other hand, the incoming signal is to be sampled and stored in the upper buffer, a positive signal is supplied on the line 274. A positive signal is established on the line 274 by the upper read in control latch 270 in FIG. 7 whenever this latch is reset. The set output of this latch then provides a negative signal which is inverted by the inverter 273, and the positive signal is supplied on the line 274 to all of the latches 751 through 755 of the upper buffer in FIGS. 16 through 18. In this event the And circuit 782 responds to the positive odd 1 pulse, and it provides a positive signal to the Or circuit 792 which is effective to reset the latch 752. The latches 752 and 852 in FIGS. 17 and 18 are reset by the leading edge of the oscillator 1 pulse in FIG. 12B, and it is seen that this reset operation in the second stages of the upper and lower buffers takes place simultaneously as the element 1 latch in FIG. 22 is set. In essence the latches 752 and 852 in the second stages of the upper and lower buffers remain in the reset state for the duration of the time window of the first stage latches 751 and 851 in FIG. 16. In like fashion the remaining latches of the upper and lower buffers are reset for the duration of the time window preceding their respective effective time windows shown by the cross hatched areas in FIGS. 12D through 12H. The element 21 latch in FIG. 24 is used for control purposes. A positive signal from the reset output on the line 1025 is used to control the And circuits 765 and 865 in FIGS. 18 and 21 thereby to define the effective time window for the latches 755 and 855. The set output from the element 21 latch in FIG. 24 is used to terminate a sweep by stopping the oscillator in the manner previously explained. Thus it is seen how the ring circuit 26 in FIGS. 22 through 24 is operated to manipulate the stages of the upper buffer 22 in FIGS. 16 through 18 and the stages of the lower buffer in 24 in FIGS. 19 through 21(1) to reset the corresponding stages of these buffers successively, (2) define successive time windows for corresponding stages of the upper and lower buffers during which input signals may be sampled and stored, and (3) provide control signals to the stages of the upper and lower buffers which inhibit changing these stages until a subsequent sweep is performed thereby to protect the last data stored in the latches of the upper and lower buffers.

Next the gating and control circuits 20 are discussed in more detail. The gating and control circuits 20 shown in block form in FIG. 1 include numerous controls which are illustrated in detail in FIGS. 4 through 15. The gating and control circuits serve as a link between the amplitude discriminators 12 through 15 in FIG. 3 and the upper and lower buffers 22 and 24 in FIGS. 16 through 21. The gating and control circuits 20 have various switches which are set to determine the mode of operation of the test instrument in FIG. 1. The four amplitude discriminator perform two basic function. The first function is to receive input signals from the device under test 10 in FIG. 3 and compare such signals to a clipping level which is adjustable by the operator. The second function is to provide a binary output which shows the relationship of the input signal to the clipping level during each selected increment of time. The output of an amplitude discriminator is either on or off, depending upon whether the input signal is less than the clipping level or greater than the clipping level. The outputs of the amplitude discriminators are supplied to various parts of the gating and control circuits 20. Each one of the amplitude discriminators may be used to receive signals from the device under test 10 and present them for sampling, storage, and display. All four amplitude discriminators may be used for trigger control by receiving synchronizing pulses from external sources. Furthermore, all four amplitude discriminators may be used for delay control purposes to start a controlled delay which is used to provide a delayed sweep. Amplitude discriminator 15 may be used to receive oscillator pulses from an external source, and amplitude discriminators 14 and 15 may receive pulses from an external source to effect a controlled stop of the test instrument in FIG. 1. Each amplitude discriminator includes a clipping level range switch 1207 in FIG. 3, a clipping level potentiometer 1201 with a variable tap 1202 for adjusting the polarity and the magnitude of the clipping level, and an output switch 1211 which may be operated to select a normal or inverted output. These controls perform in the manner previously explained.

Display controls permit an operator to determine which amplitude discriminator output is displayed and the mode in which it is displayed. The display controls include a compare error light and a run-stop status control device. Next the display controls are discussed.

The display controls include the display source switch 260 in FIG. 7, the display mode switch 220 in FIG. 6, the manual set push-button switch 228 in FIG. 6, the compare error indicator lamp 586 in FIG. 13, the run indicators 691 and 692 in FIG. 15, and the image control switch 190 in FIG. 5. The outputs of all amplitude discriminators 12 through 15 in FIG. 3 are supplied to the display source switch 260 in FIG. 7 for selection. The selected signal is supplied through the associated one of the And circuits 260 through 264 in FIG. 7 to the Or circuit 265. The output of the Or circuit may be supplied through the And circuit 242 in FIG. 6 through the signal delay circuit 245, the Or circuit 246 and along the line 247 to the stages of the lower buffer in FIGS. 19 through 21. The output of the Or circuit 265 in FIG. 7 is inverted by the inverter 266 and supplied to the And circuits 222 and 241 in FIG. 6. The output of the And circuit 241 is supplied through the Or circuit 244, the signal delay circuit 245, the Or circuit 246 and on the line 247 to the stages of the lower buffer 24 in FIGS. 19 through 21. The output of the And circuit 222 in FIG. 6 is supplied through the Or circuit 223, the signal delay circuit 224, the inverter 225 and along the line 226 to the stages of the upper buffer 22 in FIGS. 16 through 18. The inverter 266 in FIG. 7 serves the function of inverting the normal output of the Or circuit 265, and this is useful for display purposes in permitting signal levels which exceed the clipping level to be stored as positive signals in the stages of the upper buffer 22 and in permitting signals which do not exceed the clipping level to be stored as positive signals in the lowr buffer 24. This is a useful technique in permitting a visual display of the digital type to simulate the waveform of the input signal as discussed more fully hereinafter.

The display source switch 260 in FIG. 7 is set to the center position, termed the dual position, when it is desired to display simultaneously the outputs of both the discriminator 12 and the discriminator 13 in FIG. 3. The signals from the discriminator 12 are sampled, stored in the stages of the upper buffer 22 in FIGS. 16 through 18, and displayed in the upper display elements 1101 through 1105 in FIGS. 25 and 26. Simultaneously signals from the amplitude discriminator 13 are sampled, stored in the stages of the lower buffer 24 in FIGS. 19 through 21, and displayed in the lower display elements 1111 through 1115 in FIGS. 25 and 26.

The display mode switch 220 in FIG. 6 controls the manner in which incoming signals are displayed. In the serial mode a signal may be displayed using both the upper display elements 42 and the lower display elements 44 in FIGS. 25 and 26. In this case samples of the input signals which equal or exceed the clipping level illuminate associated phosphor segments in the upper row of display elements 42, and samples of the input signals which do not exceed the clipping level illuminate associated phosphor segments in the lower row of display elements 44 in FIGS. 25 and 26. If the input signal varies above and below the clipping level within any given sample or time segment, both the upper and lower display elements for that window time segment are illuminated. Alternatively, two signals may be displayed simultaneously in the serial mode with one signal being displayed in the upper row of display elements 42 and the other signal being displayed in the lower row of display elements 44 in FIGS. 25 and 26. In both instances the upper row of display elements 42 indicate when the input signal exceeds the clipping level. The clipping level is the changeover point. An operator may invert the input signal in which event the upper row of display elements 42 are illuminated when the input signal exceeds the clipping level in the negative direction. An operator may change the clipping level or the time base in order to cause a previously illuminated display segment to be extinguished thereby to determine pulse width of the input signal as well as the amplitude of the input signal. Thus it is seen that the display mode switch 220 in FIG. 6 provides flexibility in operation.

When the display mode switch 220 in FIG. 6 is placed in the compare mode, both the upper row of display elements 42 and the lower row of display elements 44 in FIGS. 25 and 26 are used to display two versions of the same signal. During the first sweep the samples of the input signal are stored in the upper and lower buffers, and the samples are displayed in both rows of display elements. Signals stored in the upper buffer remain undisturbed thereafter. During subsequent sweeps the input signal is repetively sampled, stored in the lower buffer, and displayed in the lower row of display elements 44. A comparison is made after each sweep between the signals stored in the stages of the upper buffer 22 in FIGS. 16 through 18 and the signal stored in the lower buffer 24 in FIGS. 19 through 21. This comparison is made using the exclusive Or circuits 811 through 814 as previously explained. As long as the signals stored in the upper buffer 22 are like the signals stored in the lower buffer 24, the oscillator 28 and the ring circuit 26 are controlled to continue performing successive sweeps. However, should the signals in the upper and lower buffers differ at the end of a sweep, a positive signal is supplied by the Or circuit 830 in FIG. 18 through the And circuit 587 in FIG. 13 to set the compare error latch 585 and thereby illuminate the compare error light 586. The set output of the compare error latch 585 is supplied to the And circuit 588, and if this And circuit is selected by the control stop switch 320 in FIG. 8, the controlled stop latch 591 is set. The set output of this latch on the line 52a may be supplied through the drive circuits 340 in FIG. 9 and then on the lines 121 and 122 to the device under test 10. The signals on the line 121 and 122 may be employed to stop the system under test 10 or take any other appropriate control action, if desired. The reset output of the latch 591 in FIG. 13 is then a negative signal, and it is supplied to the And circuits 381 through 383 in FIG. 10 to inhibit further triggering of the oscillator. The oscillator 28 cannot be triggered again until the reset switch 460 in FIG. 11 is operated thereby to reset, among other devices, the controlled stop latch 591 in FIG. 13.

The compare mode of operation may be employed to monitor for an intermittent transient signal. When a transient signal occurs, the error is displayed, and the error light 592 comes on in response to the compare error signal. There is the possibility that a transient signal may occur within one time segment of the sampling operation, and it may not affect the display. The error lamp in this case does not light, and the signal appears to be correct. However, the output switch of the selected amplitude discriminator can be set to the invert position. For example, if the amplitude discriminator 1 is selected, the switch 1211 in FIG. 3 should be changed to contact the terminal 1210. This causes the transient signal to reverse polarity at the output of the amplitude discriminator where it is transmitted to the display. Transients shorter than the duration of a time window can thus be detected, as discussed more fully later.

The compare mode also may be used for monitoring a direct current signal for short transients. If the threshold of the selected amplitude discriminator is set above the direct current voltage, the display remains dark until the transient occurs. Then the display elements in the bottom row 44 in FIGS. 25 and 26 are lighted during the point where the transient signal appears. The error lamp 592 in FIG. 13 is lighted as previously explained, and further sweeps by the ring circuit 26 may be inhibited, if desired. Very weak transient signals and transient signals of very short duration thus may be detected.

When the display mode switch 220 in FIG. 6 is set to the center position, labelled serial upper delay gate lower, the signal under observation from the selected amplitude discriminator is stored in the upper buffer 22 in FIGS. 16 through 18 and displayed in the upper row of display elements 42 in FIGS. 25 and 26. The display in the bottom row of display elements in FIGS. 25 and 26 is a visual presentation of the delay which takes place in the variable delay generator 155 in FIG. 4. The variable delay generator 155 accepts whatever trigger signal is selected for a triggering operation, and it produces a delayed signal for use as a trigger at the end of a time interval the duration of which is selected by an operator. In this mode an operator may match the delay period or time-out, as seen in the bottom row of display elements 44 in FIGS. 25 and 26, to the desired part of the signal on display in the upper row of display elements 44. More specifically, the delay in triggering of a subsequent sweep may be adjusted to take place at a particular place in the signal selected by visual observation. This adjustment is performed by using the delay controls in FIGS. 4 and 5 which are described subsequently.

If the display mode switch 220 in FIG. 6 is set to the parallel mode, this permits the monitoring of a plurality of separate lines simultaneously directly into the buffers 22 and 24 permitting up to 40 signals to be sampled at one instant of time. When the display mode switch 220 in FIG. 6 is set to the manual position, the manual set key 228 may be operated to manipulate the latch 227 for the purpose of supplying signals through the And circuit 221, the Or circuit 223, the signal delay circuit 224, the inverter 225 and along the line 226 to the stages of the upper buffer 22 in FIGS. 16 through 18. This permits an operator manually to insert signals in the stages of the upper buffer 22. This may be done to check the operation of the latches in the upper buffer 22 and the operation of the upper display elements 44 in FIGS. 25 and 26.

The run indicators 691 and 692 in FIG. 15 are alternately lighted by the odd and even oscillator pulses whenever the ring circuit 26 is performing a sweep. This indicator arrangement is necessary to signify to an operator that the ring circuit 26 is operating. This permits an operator to determine at a glance whether the display is static or dynamic. If both run indicator lamps are lighted, the ring circuit 26 is operating. If either one of these lamps is not lighted, it indicates that the ring circuit 26 is not operating properly. These run indicator lights serve also as an indication of the symmetry of the odd and even oscillator pulses which may be supplied from an external device. Symmetry is essential if the odd and even time windows are to be equal in duration.

The image control switch 190 in FIG. 5 permits an operator to control the display 40 in FIGS. 25 and 26. When the image control switch 190 is set to the stored (normal) position, the signals being diplayed are retained until replaced by signals in the next sweep. If the ring circuit is not operating, the last display remains visible until the reset switch 460 in FIG. 11 is operated. With the image control switch 140 in FIG. 5 set to the auto cleared position, the display is retained long enough to be seen and then is cleared. This is useful during trouble analysis to prevent confusion as to whether a display is the result of one specific trial or is left over from a previous trial. When the image control switch 140 is set to the blanked position, no display is seen, but all other functions are carried out by the test instrument in FIG. 1.

The stop controls are discussed next. The test instrument in FIG. 1 can be stopped by a compare error, an input signal to the amplitude discriminator 14 in FIG. 3, or an input signal to the amplitude discriminator 15 in FIG. 3. When a controlled stop occurs, the controlled stop light 592 in FIG. 13 is illuminated. The stop control section includes the controlled stop switch 320 in FIG. 8, the controlled stop light 592 in FIG. 13, and the control lines 121 and 122 in FIGS. 3 and 9.

The controlled stop switch 320 in FIG. 8 has four positions. The upper position is used when no controlled stop is desired. When this switch is set in the compare position, the oscillator is stopped at the end of the sweep during which a compare error is detected. If a compare error occurs, a positive signal on the line 52 is applied to the And circuit 587 in FIG. 13. The display mode switch 220 in FIG. 6 must be set to the compare mode, and in this position contact 4 is ungrounded. Consequently, the signal level on the line 248 in FIG. 6 conditions the upper input of the And circuit 587 in FIG. 13. As soon as the sweep is completed, a positive signal on the line 600 turns off the oscillator 28 in the manner previously explained, and the positive signal on the line 600 conditions the lower input of the And circuit 587 in FIG. 13. Consequently, the And circuit 587 supplies a negative output signal which sets the compare error latch 585, and its set output then energizes the compare error light 586. The set output also conditions the lower input of the And circuit 588. If the controlled stop switch 320 is in the compare position, contact 3 is ungrounded, and this conditions the upper input of the And circuit 588 in FIG. 13. The And circuit 588, therefore, supplies a positive output signal which sets the controlled stop latch 591. The set output of the latch 591 supplies a positive signal on the line 52a which illuminates the controlled stop light 592, and the positive signal on the line 52a operates the drive circuits 340 in FIG. 9. Signal levels established on the lines 121 and 122 are supplied to the system under test 10 in FIG. 3 for control purposes.

When the controlled stop switch 320 in FIG. 8 is set to the input 3 position, contact 2 is ungrounded, and this conditions the upper input of the And circuit 589. If an input signal to amplitude discriminator 14 establishes a positive signal on the line 113, it conditions the lower input of the And circuit 589 in FIG. 13. Hence the And circuit 589 supplies a negative output signal which sets the controlled stop latch 591. A positive signal from the set output of the latch 591 on the line 52a illuminates the controlled stop light 592, and the positive signal on the line 52a operates the drive circuits 340 in FIG. 9 to supply control signals on the lines 121 and 122 to the system under test 10 in FIG. 3.

If the controlled stop switch 320 in FIG. 8 is set to the input 4 position, contact 1 is ungrounded, and this conditions the upper input to the And circuit 590 in FIG. 13. If the amplitude discriminator 15 in FIG. 3 supplies a positive signal on the line 114, it conditions the lower input of the And circuit 590 in FIG. 13. This And circuit in turn supplies a negative output signal which sets the controlled stop latch 591. The resultant positive signal on the line 52a illuminates the controlled stop light 592 and operates the drive circuits 340 in FIG. 9 to provide control signals on the lines 121 and 122 to the system under test 10 in FIG. 3.

If the controlled stop switch 320 in FIG. 8 is operated to the input 3 position or the input 4 position, a controlled stop may take place from an external source. The source is connected to the input of amplitude discriminators 14 or the input of amplitude discriminator 15 in FIG. 3. It is pointed out that if an input signal is to be effective, it must be equal to or greater than the clipping level of the associated amplitude discriminator. When an input signal causes a controlled stop, the oscillator 28 in FIG. 12 continues to run until the end of the sweep at which time it is turned off by the positive signal on the line 600 from the element 21 latch as previously explained. Thus it is seen how controlled stops may take place.

Next the trigger controls are discussed. The trigger controls permit the selection of the source of trigger pulses, the choice of a positive or negative slope of such signal to initiate a triggering operation, and the mode of triggering to be used. Also, the trigger controls include indicator lights which show whether a trigger pulse has been received or not for the case where a single sweep is desired. Triggering is the function of starting the operation of the ring circuit 26. The term sweep is retained for convenience for the test instrument in FIG. 1 although a more precise definition might be logic element advance. The stepping of the ring circuit 26 is started by a trigger pulse. The basic trigger controls include the delayed triggering control switch 380 in FIG. 10, the trigger source switch 340 in FIG. 9, the trigger slope switch 360 in FIG. 9, the trigger mode switch 440 in FIG. 11, the manual trigger push-button switch 610 in FIG. 13, the ready for single sweep indicator lamp 657 in FIG. 14, and the run indicator lamps 691 and 692 in FIG. 15. Next these controls are discussed.

The delayed triggering control switch 380 in FIG. 10 is set to the up position, labelled no delay, whenever no delay is desired. The remaining two positions of this switch allow selection of the type of delay desired. When this switch is set to the center position, labelled immediately after delay time, it initiates a sweep at the end of a definite time lapse determined by the delay control section in FIGS. 4 and 5. More specifically, when the switch 380 is set in the center position, contact 20 is opened, and it conditions the upper input of the And circuit 382 in FIG. 10. This And circuit receives a positive input signal on its center input from the reset output of the controlled stop latch 591 in FIG. 13 whenever a controlled stop does not exist. The And circuit 382 in FIG. 10 receives a positive signal at its lower input on the line 175 from the set output of the delay latch 174 in FIG. 5. The delay period between the triggering pulse and the setting of the delay latch 175 is determined by the variable delay generator 155 in FIG. 4. Consequently, the And circuit 382 in FIG. 10 responds to positive signals on all of its inputs and supplies a positive output signal to the Or circuit 384 which in turn supplies a negative output signal to the inverter 385. The inverter 385 supplies a negative output signal to the inverter 386 which in turn supplies a positive signal on the line 387 to the And circuit 613 in FIG. 14. The inverter 633 in FIG. 14 supplies a positive signal to the upper input of the And circuit 613 whenever the oscillator 28 in FIG. 12 is not running. A positive signal is applied on the line 470 to the lower input of the And circuit 613 in FIG. 14 at all times except when a reset operation is taking place. The And circuit 613 in FIG. 14 responds to positive signals on all of its inputs and supplies a positive signal to the Or circuit 614 which in turn provides a negative output signal which sets the ring start latch 615, and a positive signal from the set output on the line 565 is supplied to the oscillator 28 in FIG. 12 thereby to turn on the oscillator. Once the oscillator is turned on, it continues to run until a sweep is completed by the ring circuit 26. At the end of the sweep the element 21 latch in FIG. 24 turns off the oscillator. Thus, it is seen how a delayed triggering operation takes place.

When the delayed triggering control switch 380 in FIG. 10 is set to the down position, labelled triggerable after delay time, the contact 8 is ungrounded, and this conditions the lower input of the And circuit 381 in FIG. 10. The And circuit 381 receives a positive signal from the reset output of the controlled stop latch 591 in FIG. 13 at all times except when a controlled stop is in process. The And circuit 381 in FIG. 10 receives a positive signal from the Or circuit 418 in FIG. 10, and this positive signal level is controlled by the trigger mode switch 440 in FIG. 11 which is described subsequently. The And circuit 381 receives a positive signal on the line 175 from the delay latch 174 in FIG. 5 after a trigger pulse from an external source has been delayed by an amount of time determined by the variable delay generator 155 in FIG. 4. Consequently, the positive signal from the And circuit 381 is supplied to the Or circuit 384, and this Or circuit supplies an output signal which sets the ring start latch 615 in FIG. 14 as explained above.

The trigger source switch 340 in FIG. 9 selects the source from which trigger pulses may be received. There are five choices, and they include the four amplitude discriminators in FIG. 3 and a free run position. If triggering is to be done from an amplitude discriminator, the signals are received by the selected amplitude discriminator from some external source. The received signals are subject to the amplitude discriminator controls. The same signal used for a trigger may also be sampled and displayed. The manner in which the output signal from the selected discriminator is used for triggering is determined by the setting of other controls in the trigger control section.

The trigger slope switch 360 in FIG. 9 is employed to select which slope of the trigger pulse is to be used to initiate a triggering operation. A positive going slope or a negative going slope may be selected. The trigger slope switch 360 is operated to the up position to select a positive going slope, and it is operated to the down position to select a negative going slope. Triggering is performed either as the trigger pulse becomes more positive or as it becomes more negative than the clipping level as determined by the position of the trigger slope switch 360 in FIG. 9. If the trigger source switch 340 in FIG. 9 selects input 3 and the trigger slope 360 selects a plus slope, a sweep is triggered when an input pulse applied to amplitude discriminator 14 becomes equal to or greater than the clipping level of the discriminator 14. Conversely if the trigger slope switch 360 is set at minus, a sweep is triggered when the input signal to the discriminator 14 equals or exceeds the clipping level for an excursion decreasing in amplitude from above the clipping level. When the trigger slope switch 360 in FIG. 10 is operated to the plus position, contacts 1 and 2 are grounded, and the And circuit 349 and 350 are inhibited from operating. Consequently, a positive going signal on a selected one of the lines 111 through 114 pass through an associated one of the And circuits 342 through 345, depending upon the setting of the trigger source switch 340. The output signal from the selected one of these And circuits, and only the selected one, is effective to operate the Or circuit 346. The nonselected ones of these And circuits have no effect on the Or circuit 346. A positive signal from a selected one of these And circuits is supplied to the Or circuit 346 which in turn provides a negative output signal which is inverted by the inverter 347 to a positive signal which is supplied to the And circuit 348. Therefore, the And circuit 348 passes a positive signal to the Or circuit 351 which in turn supplies a negative output signal on the line 352 to the inverter 413 in FIG. 10. The inverter 413 inverts the negative input signal, and it supplies a positive output signal to the And circuit 414. If contact 5 of the trigger mode switch 440 in FIG. 11 is open, the And circuit 414 in FIG. 10 passes positive signal to the Or circuit 416 which in turn provides a negative output signal to the inverter 417. The inverter 417 responds only to a negative going signal, and it therefore responds to the leading edge of the negative signal and provides a negative output signal to the Or circuit 418 which responds to the negative input signal to provide a positive output signal to the And circuits 381 and 383 in FIG. 10. Either one of these And circuits may be operated, depending on the position of the delayed triggering control switch. For purposes of illustration let it be assumed that the delay triggering control switch 380 is set in the up position. In this case the contact 13 is ungrounded, and the And circuit 383 passes a positive signal to the Or circuit 384. The Or circuit 384 in turn provides a negative output signal to the inverter 385 which in turn provides a negative output signal to the inverter 386. The inverter 386 responds to the negative input signal and provides a positive output signal to the And circuit 613 in FIG. 14. The And circuit 613 responds in the manner previously described to set the ring start latch 615. The set output of this latch is a positive signal supplied on the line 565 to turn on the oscillator 28 in FIG. 12 thereby to commence a sweep.

If the trigger slope switch 360 in FIG. 10 is set to the down position, contacts 2 and 3 are grounded. Operation of the And circuit 348 is inhibited, but And circuits 349 and 350 are conditioned. In this event a positive signal from the Or circuit 346 is supplied to the And circuit 349. The manner in which this positive signal is obtained is explained next. Let it be assumed that the switch 1211 in FIG. 3 is set to the normal position. The objective is to trigger on a negative slope. If a positive input pulse is assumed, then triggering is to take place on the trailing edge of this pulse. If amplitude discriminator 12 is selected, the positive pulse is applied to the And circuit 345 in FIG. 9. If the trigger source switch 340 is set to the input 1 position, contact 5 is ungrounded, and this conditions the lower input of the And circuit 345. The positive signal on the line 111 conditions the other input of the And circuit 345. Consequently the And circuit supplies a positive signal to the Or circuit 346 which in turn supplies a negative output signal. The negative signal, however, deconditions the And circuit 349. When the positive input pulse terminates, the negative going trailing edge causes the And circuit 345 to provide a negative going output signal, and this negative going output signal causes the Or circuit 346 to supply a positive going output signal to the And circuit 349. It is this positive going signal which operates the And circuit 349. The upper input to the And circuit 349 is conditioned because contact 1 of the trigger slope switch 360 is open. The center input to the And circuit 349 is conditioned because the contact 7 of the trigger switch 340 is ungrounded when this switch is set to the input 1 position. Therefore, the And circuit 349 provides a positive output signal to the Or circuit 351. The Or circuit 351 responds to the positive going input signal and supplies a negative output signal to the inverter 413 in FIG. 10. This inverter responds to the negative going input signal and supplies a positive going output signal to the And circuit 414. The signal from this point on performs as previously explained, and it eventually sets the ring start latch 615 in FIG. 14 thereby to initiate a sweep. Thus it is seen how a triggering operation takes place on a negative going signal from a selected input source.

The trigger mode switch 440 in FIG. 11 is set in the automatic position to insure the triggering of a sweep. In this position the contact 13 is ungrounded, and this conditions the upper input of the And circuit 415 in FIG. 10. The lower input to the And circuit 415 is conditioned with a positive signal from the Or circuit 412 under either of two conditions. If a trigger pulse from an external source is used for a triggering operation, it causes, as explained above, a negative signal level to be supplied by the Or circuit 351 in FIG. 9 on the line 352. The negative going signal level on the line 352 is applied to the capacitor 410 in FIG. 10, and the output of this capacitor is a negative going signal which is supplied to the Or circuit 412. The Or circuit 412 responds to the negative going signal at its input and supplies a positive going signal at its output to the lower leg of the And circuit 415. If an external trigger pulse is not available, the signal level on the line 352 is a positive level. The capacitor 410 then provides a positive output signal which operates the oscillator automatic trigger 411, and it supplies a negative output signal to the Or circuit 412. The Or circuit 412 responds to the negative input signal and supplies a positive output signal to the lower leg of the And circuit 415. Consequently, the And circuit 415 supplies a positive output signal to the Or circuit 416 which in turn supplies a negative output signal to the inverter 417, and this pulse ultimately sets the ring start latch 615 in FIG. 14 to initiate a sweep as explained above. Thus it is seen that when the trigger mode switch is in the automatic position, the internal oscillator is automatically started by the action of the oscillator automatic trigger 411 in FIG. 10. If an external trigger pulse arrives, it overrides the action of the oscillator automatic trigger 411 in FIG. 10, and this pulse acts as the trigger pulse. This arrangement provides a readily available external trigger for use until a suitable external source is found. The automatic trigger pulse is generated whenever the capacitor 410 discharged or times out. This capacitor is recharged each time an external trigger pulse arrives, and this action prevents the oscillator automatic trigger 411 from operating whenever external trigger pulses arrive. Otherwise, the oscillator automatic trigger 411 operates at a 50HZ pulse repetition rate.

When the trigger mode switch 440 in FIG. 11 is set to the triggered position, contacts 1 and 5 of this switch are open. The triggered mode is used when a source of trigger pulses have a regular time relationship to an independent signal which is being sampled, stored, and displayed. A triggering pulse for each sweep is required in the triggered mode. When a trigger pulse arrives, it causes one sweep to take place, and when the element 21 latch is set, it provides a positive output signal on the line 600 to the inverter 601 in FIG. 13 which in turn supplies a negative going signal to the single shot 602. The single shot 602 responds to the negative going input signal and supplies a negative going output signal to the Or circuit 603 which in turn supplies a positive output signal on the line 566 to turn off the oscillator 28 in FIG. 12. The oscillator 28 remains off until another external trigger pulse is received. The negative output signal from the single shot 602 in FIG. 13 is supplied on the line 531 to the single shot 532 in FIG. 12. This single shot responds to the negative going input signal and supplies a negative going output signal to the inverter 533 which in turn supplies a positive signal to the single shot 534. When the single shot 532 reverses its state, the positive signal from the inverter 533 terminates, and the negative going trailing edge operates the single shot 534 to supply a negative output signal, labelled dummy oscillator pulse, to the inverter 650 in FIG. 14. The dummy oscillator pulse, as previously explained, resets the element 21 latch in FIG. 21. The dummy oscillator is changed by the inverter 650 to a positive signal and supplied to the lower input of the And circuit 651 to reset the start interlock 653 in FIG. 14. The upper input to the And circuit 651 is connected to contact 1 of the trigger mode switch 440, and this contact is open when the switch is set in the triggered mode. Therefore, the And circuit 651 supplies a positive signal to the Or circuit 652 which in turn supplies a negative signal which resets the latch 653. It is pointed out that the start interlock latch 653 is set by a negative signal on the line 654 from the reset output of the element 1 latch in FIG. 22. The element 1 latch is set, as previously explained, at the commencement of a sweep. Consequently, the start interlock latch 653 is set at the commencement of a sweep, and it is reset at the end of a sweep by the action of the positive signal from the set output of the element 21 latch as explained above. When the start interlock latch is set, the reset output supplies a negative signal on the line 655 to the Or circuit 632, and the Or circuit supplies a positive output signal to the And circuit 612. The positive signal from the Or circuit 632 is supplied to the inverter 633 which changes the positive input signal to a negative output signal which deconditions the And circuit 613. Therefore, the And circuit 613 cannot be operated by an external trigger pulse on the line 387 until the start interlock latch is reset at the end of a sweep. This insures that a sweep, once commenced, is not interrupted by a trigger pulse until it is completed.

Contact 5 of the trigger mode switch 440 is open when this switch is set in the triggered position. Consequently, the line 442 is ungrounded, and this conditions the lower input of the And circuit 414 in FIG. 10. Therefore, when an external trigger pulse establishes a negative going signal on the line 352, it is converted by the inverter 413 to a positive signal on the upper input of the And circuit 414. When this And circuit is conditioned, it ultimately causes the ring start latch 615 in FIG. 14 to be set as previously explained, and a new sweep is initiated.

When the trigger mode switch 440 in FIG. 11 is set to the single sweep position, contacts 5 and 8 are open. Consequently, the line 442 is ungrounded, and this conditions the And circuit 414 in FIG. 10 to pass an external trigger pulse to initiate a sweep in the manner previously explained. Since contact 1 is grounded, the line 441 deconditions the upper leg of the And circuit 651 in FIG. 14. When the sweep is terminated, the negative dummy pulse on the line 535 is inverted by the inverter 650 to a positive level on a lower input of the And circuit 651. However, the And circuit 651 does not supply a positive signal to the Or circuit 652, and the start interlock latch 653 is not reset at the end of the sweep. When the trigger mode switch 440 is set to the single sweep position and an external trigger signal is not available, an operator may initiate a single sweep by operating the manual trigger switch 610 in FIG. 14. This operates the manual trigger 611 which in turn supplies a negative going signal to the And circuit 612 in FIG. 14. Before a sweep commences the start interlock latch 653 is in the reset state, and it supplies a positive signal on the line 655 to the Or circuit 632. The hold off single shot 631 supplies a positive signal to the Or circuit 632 at all times except when it is operated by a negative input from the inverter 630 in response to a positive signal on the line 600. The Or circuit 632 responds to positive signals on both of its inputs to provide a negative output signal to the And circuit 612. The And circuit 612 responds to negative signals at both of its inputs to provide a positive output signal to the Or circuit 614 which in turn supplies an output signal which sets the ring start latch and thereby initiates a sweep. The manual trigger push-button switch 610 in FIG. 13 may be used to trigger a sweep regardless of the triggering mode selected. One use of this switch is to verify the presence or absence of a desired trigger pulse if sweeping fails to occur as planned. For example, if an external triggering source is used and a sweep fails to occur, a depression of the manual trigger push-button switch quickly indicates whether the trigger source is at fault or whether the test instrument in FIG. 1 fails to sweep for some other reason. The run indicators 691 and 692 in FIG. 15 are lighted alternately if a sweep takes place. At the completion of a sweep one of these lanps go out, and they both come on alternately again when the next sweep takes place. When sweeps occur at a rapid rate, the run indicator lamps appear to glow continuously. During single sweep operations, the lamps flash briefly and then both go out at the conclusion of the sweep. The ready for single sweep indicator lamp 657 in FIG. 14 glows prior to the arrival of a trigger pulse when the trigger mode switch 440 is set to the single sweep position. When the trigger pulse arrives and the element 1 latch in FIG. 22 causes the start interlock latch 653 in FIG. 14 to be set, then the single sweep indicator lamp 657 goes out.

The manner in which the manual trigger switch 610 in FIG. 13 is operated to set the ring start latch 615 in FIG. 14 is discussed next. The manual trigger switch 610 is a push-button switch which is normally up. Contact 1 of this switch is grounded at all times. When the manual trigger switch is up, contact 3 is connected to grounded contact 1, and contact 2 is open. Ground potential from contact 3 resets the manual trigger 611. The manual trigger 611 supplies a positive signal from the reset output on the line 611a to the upper input of the And circuit 612 in FIG. 14. The positive signal on the line 611a is ineffective to condition the upper input of the And circuit 612 in FIG. 14. When the manual trigger switch 610 in FIG. 13 is depressed, contact 3 is opened, and contact 2 is connected to grounded contact 1. Ground potential from contact 2 sets the manual trigger 611. Consequently, a negative going signal from the reset output on the line 611a conditions the upper input of the And circuit 612 in FIG. 14. If a negative signal level is received simultaneously on the lower input of the And circuit 612, this And circuit then supplies a positive output signal to the Or circuit 614. The Or circuit 614 in turn supplies a negative output signal which sets the ring start latch 615 thereby to initiate a sweep as previously explained.

The delay controls are discussed next. The delay controls include the delay source control switch 131 in FIG. 4, the delay slope control switch 171 in FIG. 4, the delay range control switch 160 in FIG. 4, the delay time potentiometer 161 in FIG. 4, and the manual delay start switch 172 in FIG. 5. The delay controls are employed to delay the triggering of a sweep with respect to a trigger pulse. Delayed triggering is useful when the detailed display of a specific area of a signal is important. The specific portion of a signal which is of special interest might occur long after the trigger pulse. By delaying the start of a sweep to a point just before the vital part of an incoming signal, the critical area of the signal may be displayed starting with the first display element in FIG. 25. The amount of the trigger delay necessary for any purpose may be readily calculated by visual observation of the signal on the display device 40 in FIGS. 25 and 26 as a result of a previous sweep. The total time duration of the display device 40 is determined by the setting of the oscillator 28 in FIG. 12. Since there are 20 display elements in the display device 40 in FIGS. 25 and 26, each element occupies 5 percent of the total time duration presented by this display. Consequently, the magnitude of the delay required to move a signal to the left toward the first display element can readily be determined by observation of the presentation on the display device 40 in FIGS. 25 and 26. Alternatively, the delay may be changed in increments by a trial and error approach to move the presentation to the left in the display device 40 in FIGS. 25 and 26, and such incremental adjustments may be made until the signal is displayed commencing with the first element in the display device 40.

The delay source control switch 131 in FIG. 4 is operated to select amplitude discriminators 12 through 15 in FIG. 3 as input sources for trigger inpulses. When this switch is set to the input 1 position, contact 4 is ungrounded, and this conditions the lower input of And circuit 145 to pass positive signals from the amplitude discriminator 12. When this switch is placed in the input 2 position, contact 3 is ungrounded, and this conditions the lower input of the And circuit 144 to pass positive signals from the amplitude discriminator 13 on the line 112. When the delay source control switch 131 is set to the input 3 position, contact 2 is ungrounded, and this conditions the lower input of the And circuit 143, and this And circuit then passes positive signals from the amplitude discriminator 14 on the line 113. When this switch is set to the input 4 position, contact 1 is ungrounded, and this conditions the lower input of the And circuit 142 whereby it passes positive signals from the amplitude discriminator 15 on the line 114. Positive signals from anyone of the And circuits 145 through 142 are supplied to the Or circuit 146 which in turn supplies a negative signal at its output to the And circuit 151. This negative output signal is supplied also to the inverter 152 which in turn provides a positive output signal to the upper input of the And circuit 153. If the delay slope control switch 171 in FIG. 4 is set to the up position for triggering on the positive slope on the input signal, contacts 1 and 2 are grounded, and contact 3 is open. The signal level from contact 3, being ungrounded, conditions the lower input of the And circuit 153. Consequently, the And circuit 153 provides a positive output signal to the Or circuit 154 which in turn supplies a positive signal to the start input of the variable delay generator 155. The variable delay generator 155 responds to the positive signal on its start input, and it provides a positive output signal on the line 163 during the delay period. The positive signal on the line 163 is supplied to the upper input of the And circuit 176 in FIG. 5. However, the positive signal is ineffective to condition the upper input of the And circuit 163. When the positive signal on the line 163 terminates, the trailing edge is a negative going signal, and this signal conditions the upper input of the And circuit 176. The lower input of the And circuit 176 is a ground signal level obtained from contact 13 of the delayed triggering control switch 380 in FIG. 10 whenever this switch is in the center or down position. The center position and the down position of the switch are used for delay triggering operations. Consequently, the And circuit 176 responds to the negative input signals and provides a negative output signal which sets the delay latch 174. This latch in turn supplies a positive signal from its set output on the line 175 to the And circuits 381 and 382. The lower input of the And circuit 381 is conditioned when the delayed triggering control switch 380 is in the down position because contact 8 is open. The upper input of the And circuit 382 is conditioned whenever the delayed triggering and control switch 380 is in the center position because contact 20 is open. The Or circuit 418 in FIG. 10 supplies a positive signal to the And circuits 381 and 383 in response to a triggering signal from the selected source as earlier explained. The reset output of the controlled stop latch 591 in FIG. 13 is a positive signal whenever a controlled stop is not in effect, and this positive signal is supplied to the And circuit 381 and 382 in FIG. 10. Consequently, the selected one of the And circuits 381 or 382 supplies a positive signal to the Or circuit 384. The Or circuit 384 in turn supplies a negative going output signal to the inverter 385, and the inverter 385 supplies a negative output signal to the inverter 386. The inverter 386 responds to a negative input signal and supplies a positive output signal on the line 387 to the And circuit 613 in FIG. 14. The And circuit 613 responds to positive signals at its inputs, which are described hereinbefore, and supplies a positive signal to the Or circuit 614 which in turn supplies a negative output signal which sets the ring start latch 615 to commence a sweep. Thus it is seen how a delayed sweep is initiated using a positive going input signal from the selected source.

If it is desired to use a negative going input signal from a selected source to initiate a delayed triggering operation, the delay slope control switch 171 in FIG. 4 is set to the down position. When this switch is in the down position, contacts 2 and 3 are grounded, and contact 1 is open. The ground level from contact 3 inhibits operation of the And circuit 153. Contact 1 then supplies a signal level which conditions the lower input of the And circuit 151. Let it be assumed that the input signal is a positive pulse and delay triggering is to be initiated from this signal on the negative going slope. In this case the positive pulse applied to the selected one of the And circuits 142 through 145 ultimately changes from a positive level to a negative level, and the selected And circuit responds to the negative going transition to provide a negative going signal to the Or circuit 146 which in turn supplies a positive going output signal during this transition. The positive going signal from the Or circuit 146 conditions the upper input of the And circuit 151. Consequently the And circuit 151 supplies a positive pulse to the Or circuit 154 which in turn supplies a positive signal to the start input of the variable delay generator 155. The delay generator 155 responds to the positive signal on its start input and provides a positive signal on the output line 163 for a specified time delay. This output signal ultimately sets the ring start latch 615 in FIG. 14 as explained above.

The positive signal on the line 163 is supplied also to the inverter 197 in FIG. 5, and this inverter in turn supplies a negative output signal to the Or circuit 194 which in turn illuminates the triggered indicator 195. This indicator remains lighted until the positive signal on the line 163 terminates. The positive signal on the line 163 from the variable delay generator 155 in FIG. 4 is supplied also to condition the lower input of the And circuit 240 in FIG. 6. When the display mode switch 220 in FIG. 6 is set to the serial upper, delay gate lower position, contact 3 is open, and this conditions the upper input of the And circuit 240. Consequently, the And circuit 240 supplies a positive output signal to the Or circuit 244 which in turn supplies a negative output signal through the signal delay circuit 245 to the Or circuit 246. This Or circuit responds to a negative input signal and supplies a positive output signal on the line 247 to the And circuits 861 through 865 of the latches in stages 1 through 20 of the lower buffer in FIGS. 19 through 21. Thus it is seen that the positive signal from the variable delay generator 155 in FIG. 4 may be sampled and stored in the stages of the lower buffer 24. This permits the gate signals to be displayed in the lower display elements 44 in FIGS. 25 and 26 as explained earlier. The lower display elements are illuminated during the sweep for the time period that the variable delay generator 155 supplies a positive signal on the output line 163. When this positive signal terminates during a sweep, the remaining display elements in FIGS. 25 and 26 are not illuminated. This permits an operator to compare visually the gating signal displayed in the lower row of the display elements 44 with the signal under investigation which is displayed in the upper row of display elements 42.

The delay range control switch 160 in FIG. 4 selects increments of time delay. It selects different resistor-capacitor combinations each of which has a different discharge rate. The delay time control potentiometer 161 in FIG. 4 is varied for the purpose of adjusting the time delay between ranges selected by the switch 160. Essentially the potentiometer 161 is a vernier type adjustment. The manual delay start switch 172 in FIG. 5 is employed to operate the manual delay start latch 173. The set output of this latch is a positive signal which is supplied through the Or circuit 154 to the start input of the variable delay generator 155. This permits an operator to check the operation of the variable delay generator, and this is useful for test purposes. The variable delay generator 155 may be any suitable one of various types of delay circuits, and it preferably is a single shot the time period of which can be adjusted by the switches 160 and 161. Thus it is seen how the delay controls operate.

Next the time base controls are discussed. The time base may be internally or externally controlled. More specifically, an internal oscillator or an external oscillator may be used. The frequency of the internal oscillator discussed above, may be varied over a wide range. If external oscillations are used, one or both slopes of the signals may be used, and adjustment for symmetry is possible. Symmetry refers to the oscillator pulses having the positive excursions equal in duration to the negative excursions. This is essential to insure that the time window for each of the twenty sample periods of a sweep have the same time duration. The internal oscillator supplies the times pulses to step the ring circuit for a sweep, and this can be compared to the oscilloscope sweep where the rate of sweep of the electron gun is controlled by an oscillator. The sweep is accomplished, as pointed out above, by gating each window of a sweep at a controllable rate. If an external oscillator is used, it is supplied to amplitude discriminator 15. In this case the logic element advance control switch 680 in FIG. 15 is set to any position except the internal oscillator position. The time base controls include the oscillator range control switch 560 in FIG. 12, the variable capacitor 561 in FIG. 12 which serves to change the basic oscillator frequency, the logic element advance control switch 680 in FIG. 15, and the manual advance push-button switch 500 in FIG. 12. The oscillator control capacitor 561 in FIG. 12 varies the frequency of the internal oscillator, and the oscillator range control switch 560 is used to select this frequency or a given sub multiple of it. The oscillator range control switch 560 in FIG. 12 permits the selection of frequencies in three ranges which are (1) milliseconds, (2) microseconds, or (3) nanoseconds. Numbers are provided at the various switch positions which represents values in these units in terms of time per sample window. If this switch is set to 20 in the microsecond range, the oscillator causes the ring circuit 26 to step at such a rate that each of the 20 display elements in the upper row 42 and the lower row 44 in FIGS. 25 and 26 is gated for 20 microseconds. That is, each window is 20 microseconds in duration. The sweep at this rate requires 20 × 20 or 400 microseconds to gate from element 1 through element 20. This assumes that the oscillator multiplier control capacitor 561 in FIG. 12 is set at 1.0. If this variable capacitor is changed, the actual time per element of the sweep, when using the internal oscillator, is the setting of the oscillator range control switch 560 multiplied by the setting of the oscillator multiplier capacitor 561 setting. If it is assumed that in the preceding example that the oscillator multiplier control capacitor 561 is set at 1.5, the time duration of each sample window becomes 1.5 × 20 or 30 microseconds per sample window. Thus it is seen this system permits very close incremental control of the oscillator frequency.

The logic element advance control switch 680 in FIG. 15 is set to the internal oscillator position when the internal oscillator 28 is to be used as a time base. The remaining three positions of this switch are used to select an external oscillator the signals of which are supplied to the amplitude discriminator 15 in FIG. 3. Oscillator signals on the line 114 are supplied to the And circuit 682 in FIG. 15. The lower input to the And circuit 682 is conditioned to pass these oscillator signals when contact 1 of the logic element advance switch 680 is open. Contact 1 is open when the switch lever is placed in the symmetry adjust (by clip level) position. In this case the clipping level of the amplitude discriminator 15 may be adjusted to insure that the output signals therefrom have positive excursions equal in time duration to the negative excursions. This may be accomplished with the aid of the run indicators 691 and 692 in FIG. 15. Whenever a sweep is in process, the odd and even oscillator pulses operate these indicators. If the time base oscillations are symmetrical, each indicator lamp is on for the same length of time. Therefore, both of these indicators appear to glow with the same brightness or intensity. If the oscillations are not symmetrical, one lamp is lighted for a longer period than the lamp, and this makes one lamp appear brighter than the other. It may appear to be a rather inaccurate method of determining symmetry, but actual tests show this method to be accurate within 1 to 3 percent. If the run indicator lamps are unequally bright, the bias of the amplitude discriminator 15 is adjusted until they appear equally bright. Once this adjustment is made, the logic element advance control switch 680 in FIG. 15 may be set to the + slope only position or both slopes (oscillator input) position. When the logic element advance control switch 680 in FIG. 15 is set in the + slope only position, the + slope of the external oscillator signals are used to step the ring 26. Each time the external oscillator signal exceeds the clipping level of the amplitude discriminator 15 while increasing in the positive direction, the ring 26 is stepped, and the input signal from a selected one of the amplitude discriminators 12 through 14 is sampled and stored in the corresponding stages of the upper and lower buffers. The logic element advance control switch 80 is used in this position, for example, to obtain a symmetrical time base where the external oscillator pulses are of short duration and widely spaced.

If the logic element advance control switch 680 in FIG. 18 is set to the positioned labelled both slopes (oscillator input), pulses from an external oscillator supplied through the amplitude discriminator 4 are used to step the ring 26. If the external oscillator pulses are symmetrical, either the rising slope or the falling slope of the input signals may be used to step the ring. The use of both slopes effectively doubles the rate or the frequency at which the ring circuit 26 is advanced when compared with the rate at which the ring circuit is advanced when the logic element advance control switch 680 is set in the +slope only.

When the logic element advance control switch is set to the + slope only position, contact 3 is open, and this conditions the lower input to the And circuit 683. Pulses from the external oscillator received on the line 114 are supplied to the And circuit 503 in FIG. 12. The And circuit 503 receives a positive signal on the line 565 from the set output of the ring start latch 615 in FIG. 14 whenever a sweep is to be initiated. Consequently, the And circuit 503 responds to positive signals on the line 114 and supplies a positive output signal to the Or circuit 502. The Or circuit 502 responds to a positive input signal and supplies a negative output signal. The negative output signal is supplied to the And circuit 504. The negative going slope of this signal conditions the upper input of the And circuit 504. The positive signal on the line 565 conditions the lower input of the And circuit 504. The And circuit 504 in turn supplies a positive output signal to the set and reset inputs of the binary flip flop 505. This causes the binary flip flop 505 to change its state in response to each positive input pulse. The set output of the binary flip flop 505 is alternately up and down. The up or positive signal levels are passed by the And circuit 683 whenever the logic element advance control switch 680 is set to the +slope only position. In this position the contact 3 is open, and this conditions the lower input of the And circuit 683. Positive output signals from the And circuit 683 are used to provide odd and even step pulses as previously explained. Negative output signals from the Or circuit 502 in FIG. 12 are supplied also to an inverter 507. The inverter 507 responds to negative input signals and provides positive output signals to the lower input of the And circuit 681 in FIG. 15. When the logic element advance control switch 680 is set to the both slopes position, contact 2 is open, and this conditions the upper input of the And circuit 681. The And circuit 681 in turn supplies positive output pulses which are used to provide odd and even step pulses. It is readily seen that the frequency of the pulses supplied to the And circuit 681 are double the frequency of the pulses supplied to the And circuit 683 because the binary flip flop 506 serves as a frequency divider which divides the frequency by one-half.

When the logic element advance control switch 680 in FIG. 15 is set to the internal oscillator position, contact 4 is open, this conditions the And circuit 684 to pass signals from the oscillator 28 in FIG. 12 which are supplied through the Or circuit 686 in FIG. 15 to the And circuit 684. Negative oscillator signals supplied to the OR circuit 686 are passed as positive signals to the And circuit 684. The Or circuit 686 receives a negative dummy oscillator pulse on the line 535 at the end of each sweep, and the Or circuit 686 responds to this negative input pulse and supplies a positive output pulse to the And circuit 684. This additional pulse generates a step odd pulse which resets the element 21 latch in FIG. 24 as previously explained. A dummy oscillator pulse also is needed when an external oscillator is used. At the end of each sweep the single shot 534 in FIG. 12 supplies a negative output signal as earlier explained, and this negative output signal is supplied to the Or circuit 536. The Or circuit 536 responds to this negative input signal and supplies a positive output signal to the Or circuit 506 which in turn supplies a positive signal to the reset input of the binary flip flop 505. This causes the binary flip flop 505 to be reset prior to each sweep whether the external or the internal oscillator is used. In all sweep operations the positive signal from the element 21 latch in FIG. 24 on the line 600 is inverted by the inverter 601 in FIG. 13. The inverter 601 supplies a negative going output signal to the single shot 602. The negative going transition of this signal operates the single shot 602, and this single shot provides a negative output signal on the line 531 to the single shot 532 in FIG. 12. The single shot 532 responds to the negative transition of this signal, and it supplies a negative output signal to the inverter 533. The inverter 533 responds to a negative input signal and supplies a negative output signal to the single shot 534. Single shot 534 responds to the negative going transition of this signal and supplies a negative output signal on the line 535 to the Or circuit 616 in FIG. 14. The Or circuit 616 responds to the negative input signal and supplies a negative signal to the reset input of the ring start latch 615 which resets this latch. Consequently, the set output of the ring start latch changes from a positive level to a negative level on the line 565, and this negative level is supplied to the lower input of the And circuit 503 in FIG. 12. The negative signal level on the lower input of the And circuit 503 inhibits the passage of further positive signals on the line 114 from the external oscillator. The And circuit 503 is deconditioned after 22 oscillator pulses have been supplied to the ring circuit 26. If the binary flip flop 505 in FIG. 12 is reset prior to each sweep, it is manipulated on and off 22 times to provide 22 stepping pulses for the ring circuit 26. Consequently, when the And circuit 503 is operated to inhibit the passage of further external oscillator pulses, the binary flip flop 505 is left in the reset state. If the ring circuit 26 has an odd number of stages the binary flip flop 505 is left in the set state. This is undesirable since the And circuit 683 then continues to supply a positive output signal to the Or circuit 685. Consequently, the dummy oscillator pulse on the line 535 is supplied through the OR circuit 536 and through the Or circuit 506 thereby to reset the binary flip flop 505 whereby the set output then supplies a negative signal continuously to the And circuit 683. This prevents spurious signals from being established on the lines 694 and 695 to the ring circuit 26 in FIGS. 22 and 24. It is pointed out that the binary flip flop 506 is initially reset by a negative signal on the reset line 470 to the Or circuit 536.

The manual advance push-button switch 500 in FIG. 12 is employed to provide an operator with the capability of advancing the ring circuit manually. Contact 1 of this switch is grounded continuously. Contact 2 is grounded when this switch is depressed, and contact 3 is grounded when this switch is in the up position. When the switch 500 is operated, the manual advance latch 501 is operated. The manual advance latch 501 is reset when the push-button switch 500 is in the normal up position. If the logic element advance control switch 680 in FIG. 15 is in the + slope only position, the ring circuit 26 is stepped one position each time the manual advance push-button switch 500 is depressed. When the logic element advance control switch 680 in FIG. 15 is in the both slopes (oscillator input) position, the ring circuit 26 is advanced one step when the manual advance push-button switch is depressed and one step when this pushbutton switch is released. A positive pulse from the set output of the manual advance latch 501 is supplied to the Or circuit 502 each time the manual advance push-button switch 500 is depressed and released. The output from the Or circuit 502 is a negative signal which is supplied either (1) through the And circuit 504, the binary flip flop 505, and to the And circuit 683 in FIG. 15 or (2) through the inverter 507 and to the And circuit 681 in FIG. 15. The logic element advance control switch 680 is set to select one of these And circuits for a manual operation. Thus it is seen how stepping pulses for the ring circuit 26 may be provided manually.

The system in FIGS. 3 through 26 is reset by depressing the reset push-button switch 460 in FIG. 11 and releasing it. When the reset push-button switch 460 is depressed, grounded contact 2 supplies a ground level potential to the set input of the reset latch 461 thereby resetting this latch. The set output changes from a negative to a positive potential. When the reset push-button switch 460 is released, ground potential from contact 3 is supplied to the reset input thereby to reset this latch. Consequently, the positive signal level from the set output changes to a negative signal level. This negative going signal operates the single shot 462 which in turn supplies a negative output signal on the line 470 which resets the control latches of the gating and control circuits 20 in FIGS. 4 through 15, the latches in the upper buffer 22 in FIGS. 16 through 18, the latches in the lower buffer 24 in FIGS. 19 through 21, and the latches in the ring circuit 26 in FIGS. 22 through 24. The test instrument is then ready to commence operating in the manner determined by the setting of the control switches in the gating and control circuits 20 in FIGS. 4 through 15. A reset operation is performed as the first step in commencing any new operation.

The synchronous logic element display device according to this invention is an instrument for measuring signals in terms of time and amplitude. The instrument visually presents the results of these measurements on a display panel which consists of 40 electroilluminescent phosphorous segments disposed in two rows on a glass plate. The sampled input signals cause certain of the phosphorous segments to glow and others to remain dark. The digital display differs from an analogue display which presents the results of the signal measurements in the form of waveshapes. This type of display is termed a digital display, and the state of the segments indicates either the presence or absence of some specified pre-set voltage for each time increment of the sampled input signal. The amplitude of the sampled signals is determined by comparing each increment of the input signal against a pre-set voltage level. This comparison is performed as the signals coming into the instrument pass through the amplitude discriminators 12 through 15 in FIG. 3. The comparison voltage is termed the clipping level, and it is completely adjustable. Next, the amplitude discriminators 12 through 15 in FIG. 3 are discussed in more detail.

Referring to FIG. 3, the amplitude discriminators 12 through 15 are identical in construction. Amplitude discriminator 12 is illustrated in detail. It includes a resistor 1201 across which a voltage is applied. A movable tap 1202 is connected to an amplifier 1203. The top 1202 is adjustable to change the bias level of the amplifier 1203. Input signals from the system under test 10 are supplied on the line 101 to one end of resistors 1204 through 1206. A switch 1207 may be selectively connected to anyone of the resistors 1204 through 1206. The amplitude of the input signal is varied by changing the switch 1207. The output of the amplifier 1203 is supplied to a terminal 1208, and the output is supplied through an inverter 1209 to a terminal 1210. A switch 1211 is operated to select either the terminal 1208 or the terminal 1210. If the normal output is desired, the switch 1211 is connected to the terminal 1208. If it is desired to invert the output signal, the switch 1211 is connected to the terminal 1210.

The movable tap 1202 is adjusted to establish the clipping level for the amplifier 1203. When a positive input signal on the line 101 exceeds the clipping level, the amplifier 1203 provides a positive output signal of a given amplitude for the duration of the time period that the positive input signal exceeds the clipping level. At all other times the output signal of the amplifier 1203 is zero potential.

Figure 27:
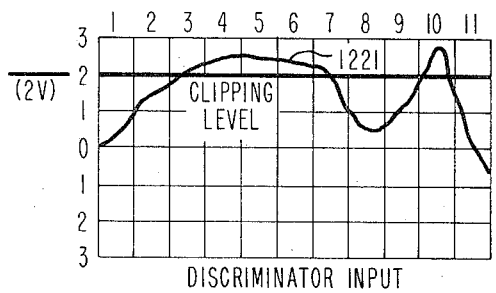
FIG. 27 illustrates an input signal to an amplitude discriminator used in this invention.
Figure 28:
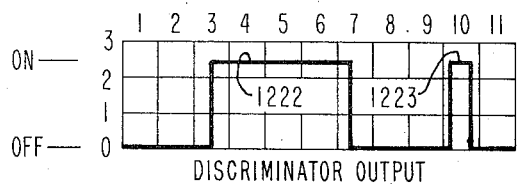
FIG. 28 illustrates the resulting output signal from the amplitude discriminator.
Figure 29:
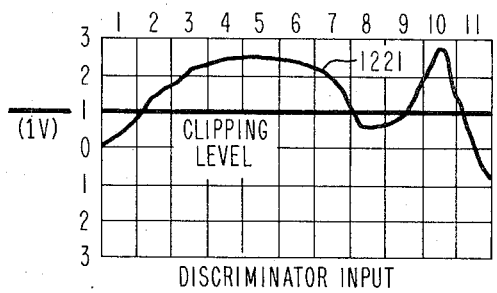
FIG. 29 illustrates the same input signal to an amplitude discriminator with a different clipping level.
Figure 30:
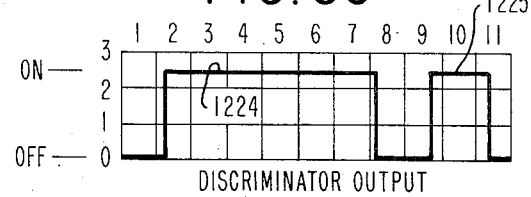
FIG. 30 illustrates the resulting output signal of the amplitude discriminator.

Reference is made to FIGS. 27 through 30 for an illustration of the operation of the amplitude discriminator 12 in FIG. 3. Referring first to FIG. 27, a clipping level of 2 volts is shown, and an input signal on the line 101 in FIG. 3 is represented by the curve 1221. Only 11 time windows or sample periods are illustrated in the interest of simplicity. The output of the amplifier 1203 in FIG. 3 is shown in FIG. 28, and it includes positive pulses 1222 and 1223 which represent the time when the input signal 1221 exceeds the clipping level. If the tap 1202 in FIG. 3 is adjusted to a 1 volt potential level and the same potential is supplied to the line 101, then the output of the amplifier 1203 is changed. FIG. 29 illustrates a 1 volt clipping level with the input waveform 1221 repeated. The output of the amplifier 1203 in FIG. 3 is illustrated in FIG. 30 as positive pulses 1224 and 1225. It is readily seen by inspection that the positive output pulse 1224 in FIG. 30 is much wider than the positive pulse 1222 in FIG. 28, and the positive output pulse 1225 in FIG. 30 is much wider than the positive output pulse 1223 in FIG. 28. Thus it is seen that the discriminator output signals vary in width as a function of the amplitude of the clipping level. The amplitude discriminator 12 in FIG. 3 has an output signal which depends upon whether the input signal is equal to or more positive than the clipping level, and hence the output signal is a series of positive pulses occurring during the life span of the input signal on the line 101. The result of the amplitude discriminator action is to convert the analogue input signal into a digital or binary discriminator output for the gating and control circuits 20 in FIG. 1. The clipping level of the amplitude discriminator 12 is manually adjustable from 0 to 100 volts, either plus or minus, in very small increments.

Input signals to the gating and control circuits 20 in FIG.1 from the amplitude discriminators 12 through 15 are divided into 20 increments or time intervals by the ring circuit 26, and signals from each time increment are stored in either or both the upper buffer 22 and the lower buffer 24. The ring circuit 26 in FIG. 1 is operated to distribute the incremented input signals in the upper buffer 22 and the lower buffer 24. The time duration or width of each increment of the input signal is determined by the frequency of the oscillator 28 in FIG. 21. As the frequency of the oscillator 28 is increased, the width of each increment of the input signal is reduced. As pointed out earlier the ring circuit 26 may be operated by the oscillator 28, or it may be operated by an external source supplied through the logic element advance control switch 680 in FIG. 15.

Since the phosphorous segments in the display 40 of FIG. 1 are controlled by the latches in the upper buffer 22 and the lower buffer 24, any signal once sampled and stored in these buffers may be displayed indefinitely by stopping the oscillator 28 after completing one sweep. This ability to store data indefinitely makes this test instrument useful in detecting intermittent events and pulses which occur at a low repetition rate.

The system in FIG. 1 operates in several modes including the serial mode, the parallel mode, and compare mode. The mode of operation is determined by the setting of the display mode switch 220 in FIG. 6 as discussed above. In the serial mode the device in FIG. 1 measures a signal against time or detects the presence of a pulse. It either continues sampling or immediately stops sweeping in order to store the signal. An operator may analyze a repetitive signal by adjusting the clipping levels for different sweeps. This mode provides pulse sampling capabilities with the additional ability to freeze or store a non-repetitive signal. The compare mode allows a signal to be stored during its first sweep and be compared to subsequent sweeps of the same signal where such input signal recurrs. A detected difference can be made to stop the sweep as well as to stop the system under test 10. The parallel mode enables the system in FIG. 1 to sample a plurality of input signal sources simultaneously, and for this purpose parallel input sources 833 and 933 in FIGS. 16 and 19 are provided.

Since an oscilloscope and the test instrument in FIG. 1 display signals for analysis, a comparison of the two types of devices is appropriate. The oscilloscope creates a visible display with an electron gun which directs a stream of electrons against the inner face of a cathode ray tube. This inner face is coated with a material which glows under such bombardment and persists in glowing for a short time after the bombardment ceases. The point where the electrons strike the face of the cathode ray tube may be shifted in both the horizontal and vertical planes by impressing voltages on the horizontal and vertical deflection plates and between which the electrons flow. The horizontal plates are generally connected to a variable oscillator which causes the electron stream to sweep across the face of the cathode ray tube at a known rate and then quickly fly back to begin another such sweep. The vertical deflection plates generally are connected to a signal source which causes the stream of electrons to shift vertically in proportion to the input signal voltage as the horizontal sweep takes place. This results in a displayed line the shape of which represents the signal during a known period of time. The device according to this invention does not utilize a cathode ray tube, electron gun, or deflection plates. It does, however, have a display face containing an upper and lower row of segments or phosphor elements as shown in FIG. 1. There are 20 such elements in each row, and each element represents a distinct time interval of the input signal. These elements are able to glow because of electroluminescence which is a property of emitting light when an alternating current signal is applied. Very little heat is emitted by electroluminescense. The light produced is roughly proportional to the voltage and frequency of the excitation current. The excitation source may be one which provides an alternating signal of 290 volts with a frequency of 400 cycles per second.

The device in FIG. 1 displays information in digital or binary form using the two rows of phosphor elements in contrast to the analogue display presented by an oscilloscope. The device of FIG. 1 takes successive samples of an input signal over a given time period, and the signal during each time imcrement is sampled to determine whether or not it exceeds the clipping level of the associated amplitude discriminator. If the input signal during a given time increment exceeds the clipping level, the associated phosphor element is illuminated. Otherwise, the associated phosphor element remains dark. This sampling action is different from the horizontal sweep of an oscilloscope even though both devices generate a display. The device in FIG. 1 has a variable sweep range, and the sweep may vary from 1.25 seconds per time increment to 50 nanoseconds per time increment.

The voltmeter and oscilloscope are analogue devices. It is appropriate at this point to discuss why the test instrument of FIG. 1 is needed to perform functions not provided by such analogue devices as the voltmeter and the oscilloscope. A test light is a binary digital instrument. When lighted, it indicates the presence of a signal, and when not lighted, it indicates the absence of a signal. Such a device can provide neither quanitative information nor much intelligence concerning quality of the input signal. Perhaps it can distinguish between a steady voltage and a very slow pulsating voltage. It cannot count the pulsations or discriminate between slowly pulsating direct current signals and very low frequency alternating current signals.

The voltmeter, on the other hand, can do everything that the test light can do, and it can do more. The voltmeter can measure the voltage that is present with a high degree of accuracy, and it can measure the RMS value of an alternating current signal. It may, with limitations, detect the presence of pulsations. But the voltmeter cannot determine if an input signal consists of one signal, several superimposed signals, or some complex set of irregular pulsations. An alternating current voltmeter cannot give information concerning frequencies or direct information concerning peak voltage. It cannot discern variations of frequency in an alternating current signal.

The oscilloscope can be used to perform all of the functions performed by a test lamp and a voltmeter, and it can do more. It can be employed by an operator to measure voltage, display waveshapes, determine frequencies, and discriminate between varying frequencies with no difficulty. The oscilloscope cannot measure a direct current voltage with the accuracy of a high quality voltmeter. While an oscilloscope may be employed to display waveshapes, it really presents such shapes only approximately because the circuitry of the instrument introduces definite degrees of distortion. Furthermore, as the repetitive rate of the transient electrical events increases, an increasingly smaller percentage of the total number of such changes is displayed by the oscilloscope because of the time limit required for flyback. In certain instances the oscilloscope is inadequate because of its inability to retain the display. In this connection it is pointed out that a signal must be repeated many times in order to be seen on an oscilloscope. Thus a signal which occurs once, and once only, it is seen fleetingly, if at all, by an alert operator. As sophisticated computer systems utilize circuit components with faster speeds of operation, an oscilloscope capable of operating at these high speeds becomes much more expensive, and its capabilities are inadequate for many test purposes.

The electrical test instrument in FIG. 1 can be used for many of the same purposes of the oscilloscope, but it was specifically conceived to handle the more complex measurement problems of today's high speed computer systems. This capability is accomplished by the unique method of discriminating, sampling, storing, and displaying an input signal in digital form. The device in FIG. 1 does not utilize a cathode ray tube with an electron gun, instead it utilizes high speed digital latches to operate electroluminescent segments or elements which reduces the inherent delays and flyback found in the oscilloscope. The logical circuits employed in the device in FIG. 1 are the same as those used in the high speed computers, and this enables this test instrument to react at speeds comparable to those of the equipment being serviced. If future electrical devices employ new technologies to create faster circuit components, such circuit components can be incorporated in the construction of the device in FIG. 1 to provide it with the same high speed of operation as the device under test. Thus the test instrument in FIG. 1 does not become outmoded as the device under test is improved to operate at higher speeds.

The test instrument in FIG. 1 has the ability to capture electrical events of extremely short duration by sampling such events, storing the result, and displaying the stored result. This capability is not provided by an oscilloscope. Specific skills for operating the device and interpreting the resulting displays must be cultivated. The skills differ from those required to operate and interpret an oscilloscope. For example, a waveform is easy to see on the oscilloscope, but it is only indirectly discernible on the face of the display device 40 in FIG. 1. Waveshape must be estimated, deduced, or calculated. Such information, however, is not necessary in many cases, The knowledge of the actual waveshape of a given signal often is not vital. Nevertheless, the technician who uses an oscilloscope tends to think in terms of waveforms. A skill an operator must acquire to become competent with the device in FIG. 1 is that of working and interpreting a digital type display. Some aspects of signal analysis wherein the device in FIG. 1 supercedes the oscilloscope include (1) detecting intermittent pulses or signal changes, (2) analyzing extremely weak extraneous signals, sometimes referred to as noise, and (3) monitoring for and capturing signals which occur only once or which may recur at an extremely low repetition rate. Operation of the ring circuit 26 through a complete cycle is referred to as a sweep, and during one sweep each stage of the upper and lower buffers receives a positive gating signal for one window or sample period. The time duration of each window is determined by the frequency of the oscillator 28. The ring circuit 26 is started by a trigger pulse which may originate within the gating and control circuits 20 in FIG. 1, or the trigger pulse may be initiated from a specific source external to the device in FIG. 1 as previously explained. Once a trigger signal is initiated, it causes the ring to progress through a complete cycle. If a time base of 5 milliseconds per display window or time element is employed, then the total time per each sweep is 100 milliseconds in increments of 5 milliseconds for each of the 20 display elements in FIGS. 25 and 26.

Figure 31A:
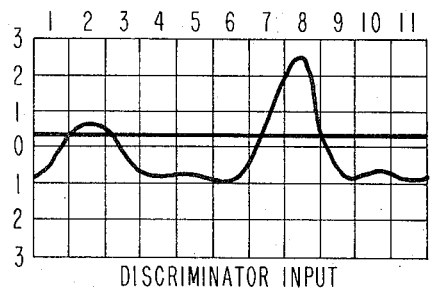
FIGS. 31A through 31C illustrate respectively an input signal to an amplitude discriminator, the output signal from the amplitude discriminator, and the resulting digital display.
Figure 31B:
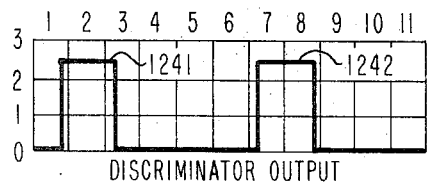
Figure 31C:
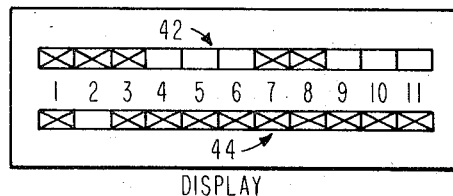
Figure 32A:
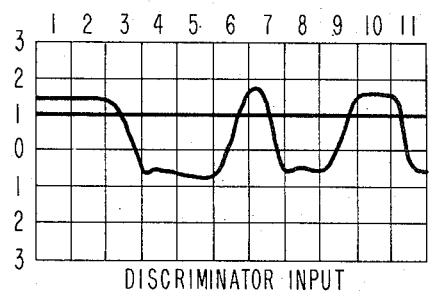
FIGS. 32A through 32C illustrate an input signal to an amplitude discriminator, the output signal of the amplitude discriminator, and the resulting digital display.
Figure 32B:
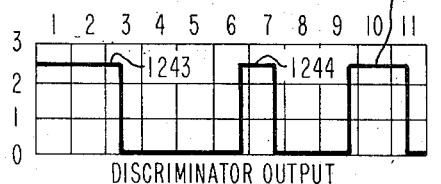
Figure 32C:
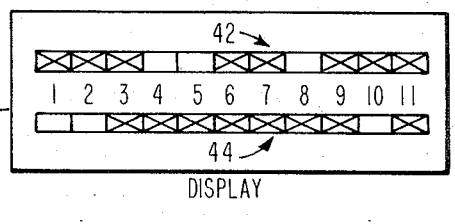

In using the test instrument in FIG. 1 to analyze signals, an operator may select any one of several modes as pointed out above. However, the serial mode is the most useful mode for such uses as signal display for analysis of shape, length, amplitude etc. as well as for probing and sampling which normally takes place as part of trouble analysis. In the serial mode one input signal may be displayed using both rows of display elements 42 and 44 in FIG. 1, or two input signals may be displayed simultaneously with one signal displayed in the upper row 42 and the other signal being displayed in the lower row 44. In displaying one signal in both rows of display elements, it is generally true that the portions of the input signal which are equal to or more positive than the clipping level cause display elements in the upper row to light; whereas, portions of the input signal less positive than the clipping level cause elements in the lower row to light. This is illustrated in FIG. 31 and 32. If the signal shown in FIG. 31A is supplied to a selected amplitude discriminator, the output signal from the amplitude discriminator is as shown in FIG. 31B for a clipping level of 0.5 volts, and it includes positive pulses 1241 and 1242. If the signal output of the selected discriminator is displayed in both rows of display element 42 and 44 in FIG. 1 the display appears as shown in FIG. 31C. Whenever the discriminator output as shown in FIG. 31B is more positive than the clipping level shown in FIG. 31A, the upper display elements are lighted, as indicated by the x in these blocks. A sweep of 11 sample periods or time elements are illustrated in the interest of simplicity. Whenever the input signal in FIG. 31A is less than the clipping level, the lower row of display elements 44 in FIG. 31C are lighted, as indicated by the X in lower display elements 1, 3 through 7, and 9 through 11. FIG. 32 illustrates the same technique with a different signal. For example, a different discriminator may be selected. FIG. 3A illustrates the input signal to the selected discriminator, and FIG. 32B illustrates the output of the selected discriminator for a clipping level of 1.0 volts. The positive pulses 1243, 1244, and 1245 from the discriminator output in FIG. 32B cause upper display elements 1 through 3, 6, 7, and 9 through 11 to be lighted. Lower display elements 3 through 9 and 11 are lighted because the discriminator output in FIG. 32B is less than the clipping level during a portion of each sample period or time element embraced by these respective lower display elements. If the output of the amplitude discriminator in FIG. 31B is to be displayed in the upper row of display elements 42 and the output of the amplitude discriminator in FIG. 32B is to be displayed in the lower row of display elements 44, then the display device 40 makes the presentation shown in FIG. 33. This is obtained by making one sweep and sample both signals simultaneously. This assumes two different amplitude discriminators are used. Thus one application in the serial mode is demonstrated.

Figure 34A:
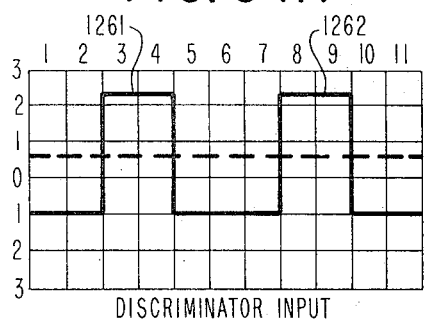
FIGS. 34A and 34B illustrate respectively an output signal from an amplitude discriminator and the resulting display.
Figure 34B:
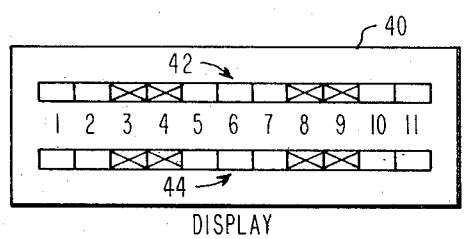
Figure 35A:
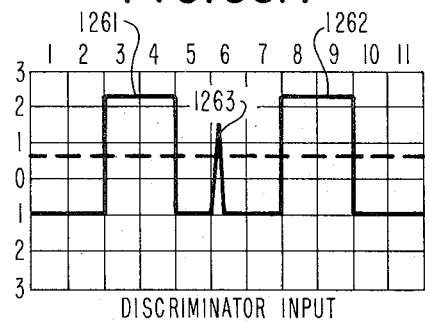
FIGS. 35A and 35B illustrate respectively an output signal from an amplitude discriminator and the resulting display.
Figure 35B:
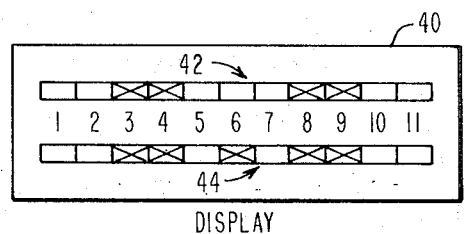

The compare mode is useful in monitoring a repetitive signal for changes which occur only rarely or for detecting in repetitive signals electrical events in locations where their presence represents a departure from a given normal pattern. In the compare mode two versions of the same signal are displayed, one version in the top row of display elements 42 and the other in the bottom row of display elements 44. This is accomplished with two sweeps. The first sweep causes the repetitive signal under invetigation to be displayed in both the upper and the lower rows of display elements. During the second and subsequent sweeps of the repetitive signal the top row of phosphor elements display the original Or first sweep, and the repetitive signal is continuously sampled, stored in the lower buffer, and displayed in the bottom row of display elements. The operation continues repetitively as long as the signal stored in the two rows of display elements are identical at the end of each sweep. When the signal stored in the bottom row of display elements at the end of a sweep is unlike the signal stored in the top row of display elements, a compare error is indicated since the two signals no longer are alike. The compare error signal may be employed to light a compare error lamp, stop the system under test, stop the oscillator 28 in FIG. 1 at the end of the sweep, or initiate any other appropriate action desired. The compare mode of operation is illustrated in FIGS. 34 and 35. FIG. 34A illustrated the output signal from a selected discriminator, and it is displayed in the upper row of display elements 42 and the lower row of display elements 44 during the first sweep. For the second and subsequent sweeps the output signal in FIG. 34A of the selected discriminator repeats itself continuously, and it is displayed in the lower row of display elements 44 in FIG. 34B. During each sweep the signals displayed in the upper row of display elements 42 are compared with the signals displayed in the lower row of display elements 44. Since both signals are alike, a comparison is reached. FIG. 35A depicts a spurious pulse 1263 which occurs during sample period 6. The spurious signal causes the lower display element 6 to be lighted, and this is illustrated in FIG. 35B. Since the signals displayed in the upper row of display elements 42 it is now unlike the signals displayed in the lower display elements 44, a compare error signal is generated. This comparison is performed by comparing the signals in the upper buffer 22 in FIG. 1 with the signals stored in the lower buffer 24 in the comparator 50. The comparator 50 generates a positive signal on the line 52 whenever a compare error is detected and this compare error signal may be used to take one or more of the actions noted above. Thus one application in the compare mode is demonstrated.

The parallel mode is an optional arrangement whereby the system in FIG. 1 permits a plurality of input signals to be directly inserted into the latches of the upper and lower buffer simultaneously. This is accomplished by using the parallel input sources 833 and 933 in FIGS. 16 and 19 with the display mode switch in the parallel mode position. In the manual mode of operation an operator manually may insert a given pattern of signals into the upper buffer 22 in FIG. 1 whereby they are displayed in the upper row of display elements 42. This is useful to set up standards for use in either the serial mode or the parallel mode. Subsequent input signals stored in the lower buffer 24 are compared with the pattern of signals in the upper buffer. An alternative use of the manual mode is to test the latches in the upper buffer 22 and the lower buffer 24 in FIG. 1 which control the display elements in the respective upper row 42 and the lower row 44 in FIG. 1. This technique is useful to check the operation of the latches in the upper and lower buffers and the latches in the ring circuit 26 for malfunctions.

Certain types of monitoring operations can be performed for trouble shooting purposes. There are two broad categories of monitoring. The first category consists of looking at a normally dead source for the occurrence of a signal which should not be present. Such signal represents an error. This is termed "babysitting" in trouble analysis parlance. The second type of monitoring consists of watching a repetitive signal for an intermittent change or variation. The second category may include instances when this change does not alter the display pattern unless the display is inverted. Next these trouble shooting operations are discussed.

Figure 36A:
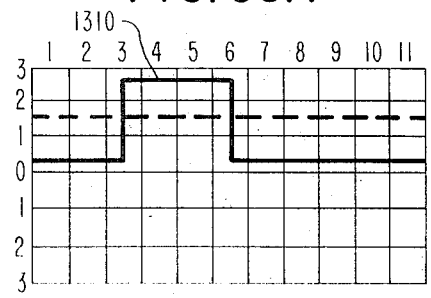
FIGS. 36A and 36B illustrate respectively an output signal from an amplitude discriminator and the resulting display.

First, the presence of an unwanted signal is considered. Let it be assumed that the signal illustrated in FIG. 36A is repetitively supplied to the input of a selected amplitude discriminator, and the compare mode is used. The clipping level in FIG. 36A is 1.5 volts. The input signals in FIG. 36A includes a positive pulse 1310 which exceeds the clipping level in the manner shown. This signal is displayed in the upper row 42 and the lower row 44 of the display device 40 during the first sweep as previously explained. During the second and subsequent sweeps, this signal is displayed dynamically in the lower row 44, and it is compared with the static display in the upper row 42. Let it be assumed that in some subsequent sweep an extra pulse 1310 appears in the position indicated in FIG. 37A. The static upper display 42 remains the same, but the dynamic lower display 44 signifies by lighted elements 8 and 9 that an extra pulse occurred. It can be seen by observation that the extra pulse had a leading edge which occurred during time window 8 and a trailing edge which occurred during time window 9. Thus it is seen how an extra pulse is detected.

Figure 36B:
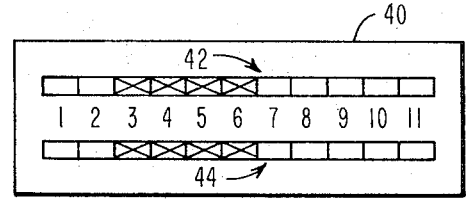
Figure 38A:
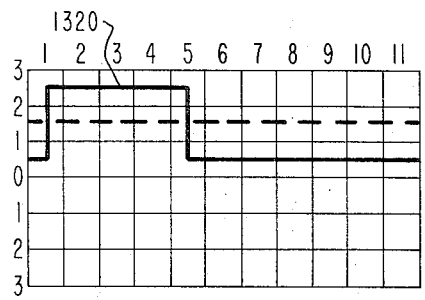
FIGS. 38A and 38B illustrate respectively an output signal from an amplitude discriminator and the resulting display.
Figure 38B:
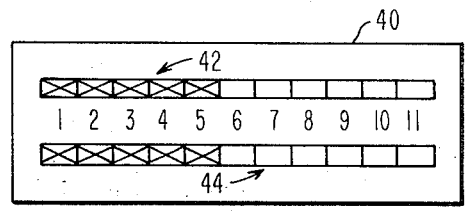
Figure 39A:
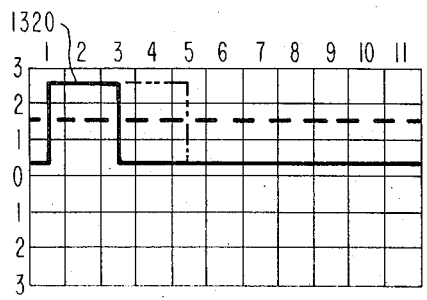
FIGS. 39A and 39B illustrate respectively an output signal from an amplitude discriminator and the resulting display.
Figure 39B:
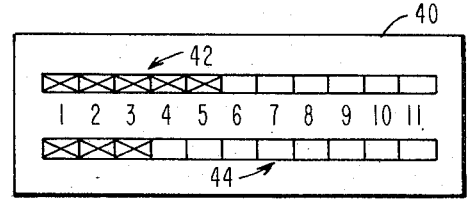

The test instrument in FIG. 1 may be used to detect a missing pulse or a pulse which has a missing portion. Let it be assumed for purposes of illustration that the signal shown in FIG. 38A is repetitively supplied to a selected amplitude discriminator, and its clipping level is set at 1.5 volts. The compare mode is assumed. The input signal includes a positive pulse 1320 which exceeds the clipping level for the time period illustrated. During the first sweep this signal is displayed in the upper row 42 and the lower row 44 of the display device 40 as depicted in FIG. 36B. Let it be assumed further that during a subsequent sweep the positive pulse 1320 has a missing portion as indicated by the dotted lines in FIG. 39A. The static upper display 42 in FIG. 39B remains the same as the upper display 42 in FIG. 38B. However, the dynamic display in FIG. 39B is changed. Note that lower display elements 4 and 5 are not lighted in FIG. 39B. Consequently, a compare error signal is generated in the manner previously explained which sets the compare error latch 585 in FIG. 13 and illuminates the compare error light 586 in FIG. 13. If a controlled stop is to take place, the controlled stop latch 591 in FIG. 13 is set, and control signals are supplied on the lines 121 and 122 to the system under test 10 as earlier described. If a controlled stop takes place, the display in FIG. 39B becomes a static display which is preserved until an operator depresses and releases the reset push-button switch 460 in FIG. 11. In case the pulse 1320 in FIG. 39A is entirely absent during a subsequent sweep in the compare mode, all lower display elements remain dark, and a compare error signal is generated.

Figure 40A:
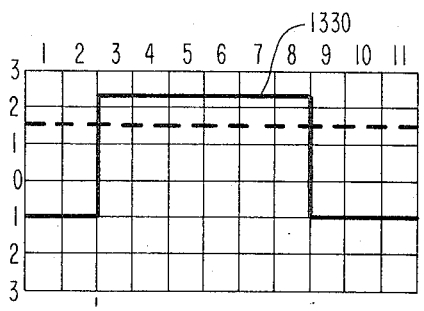
FIGS. 40A through 40C illustrate respectively an input signal to an amplitude discriminator, an output signal from the amplitude discriminator, and the resulting display.
Figure 40B:
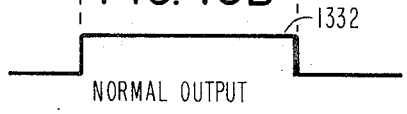
Figure 40D:
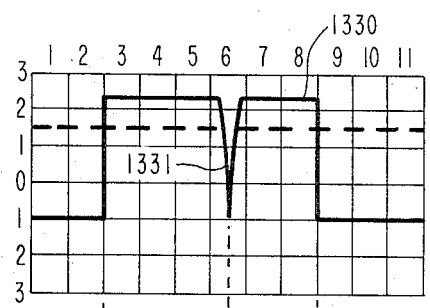
FIGS. 40D and 40E illustrate respectively an input signal to an amplitude discriminator and the output signal from such amplitude discriminator.
Figure 40E:
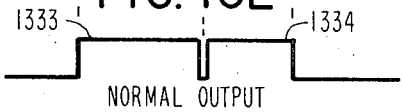
Figure 40C:
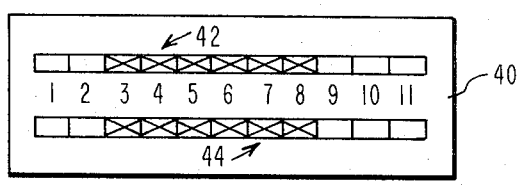
Figure 41A:
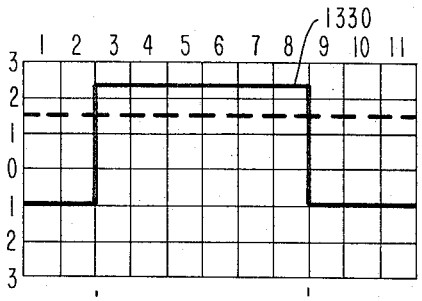
FIGS. 41A through 41C illustrate respectively an input signal to an amplitude discriminator, an output signal from the amplitude discriminator, and the resulting display.
Figure 41B:
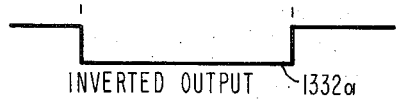
Figure 41D:
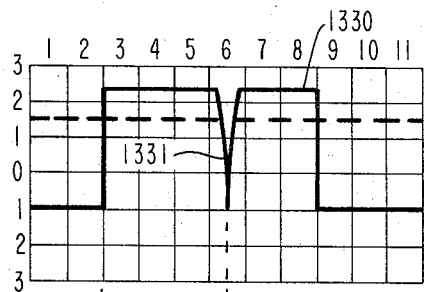
FIGS. 41D through 41F illustrate respectively an input signal to an amplitude discriminator, the resulting output signal from the amplitude discriminator, and the resulting display.
Figure 41E:
Figure 41C:
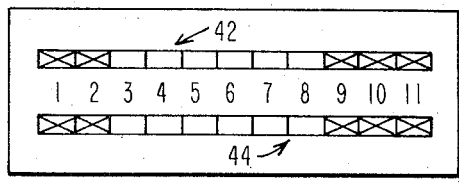
Figure 41F:
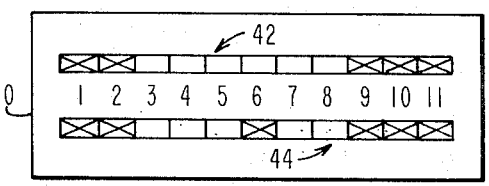

Monitoring for a transient or deviation which occurs within a time window presents a special case in some instances. To illustrate this problem let it be assumed that a signal such as shown in FIG. 40A is presented to a selected amplitude discriminator which has a clipping level of 0.5 volts. The input signal includes a positive pulse 1330 which exceeds the clipping level as indicated in 40A. If the normal output of the selected amplitude discriminator is used, the output signal is the waveform illustrated in FIG. 40B. It includes the positive pulse 1332. In the compare mode this signal is stored in the upper and lower buffers during the first sweep. The content of the upper buffer is displayed in the upper row 42, and the content of the lower buffer is displayed in the lower row 44. The display appears as illustrated in FIG. 40C. The display in the upper row 42 is a static display, and the display in the lower row 44 is a dynamic display. Let it be assumed that a transient or signal variation occurs within time window 6. It is emphasized that this transient condition is initiated after time window 6 commences, and the transient condition terminates before window 6 terminates. Such a transient is illustrated by the signal deviation 1331 in FIG. 40D. The output from the selected amplitude discriminator is illustrated in FIG. 40E. It is pointed out that the output signal is now composed of two positive pulses 1333 and 1334 closely spaced as illustrated in FIG. 40E. The positive signals in FIG. 40E, however, generate the identical display shown in the lower row 44 in FIG. 40C. It is pointed out that the transient signal 1331, being less in time duration than a window or sample period, does not prevent stage six in the lower buffer from being set during its sample window. Stated alternatively, a positive signal at any time during time window six is effective to set the latch in stage six of the lower buffer. It is pointed out that two positive signals are presented to this buffer state during time window six as may be observed in FIG. 40D. That is, one positive signal is supplied to the set input of stage six of the lower buffer during the first part of time window 6 in FIG. 40D, and a second positive signal is supplied to the set input of stage six of the lower buffer during the latter portion of the time window six. It is pointed out that the frequency of the oscillator may be increased to a point where each time window is reduced sufficiently that the duration of the transient signal 1331 in FIG. 40D exceeds the duration of each time window at the higher frequency. In this event one or more latches in the lower buffer are not set during their sample periods or time windows, and the deviations of the transient signal 1331 are stored in the lower buffer. Consequently, this deviation is presented in the lower row 44 of the display 40 as one or more dark or unlighted phosphor display elements. In case a deviation such as illustrated in FIG. 40D occurs when the oscillator is operating at maximum speed, there is a further option whereby the transient signal 1331 may be detected using a different technique. Let it be assumed for purposes of illustration that the signal 1330 in FIG. 40 is supplied to a selected amplitude discriminator which has a clipping level of 1.5 volts, and the inverted output of a selected amplitude discriminator is used. That is, the switch 1211 of the selected amplitude discriminator (FIG. 3) is set to the terminal 1210. The signal 1330 is illustrated again in FIG. 40A. The inverted output from the selected amplitude discriminator is illustrated in FIG. 41B. Note that the signal in FIG. 41B is opposite in polarity to that shown in FIG. 40B. The input signal 1330 it is pointed out, remains the same in both instances. The inverted signal in FIG. 41B is sampled and stored in the upper and lower buffers during the first sweep. The presentation on the display 40 is shown in FIG. 41C for the inverted output signal of the selected amplitude discriminator. Let it be assumed that in a subsequent sweep the transient signal 1331 occurs within time window six of the signal 1330 as illustrated in FIG. 41D. When this signal is supplied to the input of the selected amplitude discriminator, the inverted output from such amplitude discriminator is a signal such as shown in FIG. 41E. This signal is sampled and stored in the lower buffer. The resultant presentation in the lower row 44 of the display 40 is illustrated in FIG. 41F. It is pointed out that element 6 is illuminated, and this indicates the presence of the spurious transient 1331 in FIG. 41D. The presence of the spurious signal sets latch six of the lower buffer during time window 6, and a compare error signal is generated. This compare error signal is supplied as a positive signal on the line 52 from the Or circuit 830 in FIG. 18. This positive signal sets the compare error latch 585 in FIG. 13 because the display mode switch 220 in FIG. 6 is set to the compare mode position. Consequently, the compare error light 586 is illuminated, and the controlled stop latch 591 is set if the controlled stop switch 320 in FIG. 8 is set to the compare position. In this event the set output from the controlled stop latch is a positive signal on the line 52a, and it is presented through the driver circuits 340 in FIG. 9 and along the lines 121 and 122 to the system under test 10 in FIG. 3 where appropriate control action may be taken, if desired, by the system under test 10. Thus it is seen how the transient signal 1331 may be detected without changing the frequency of the oscillator.

While the foregoing illustrations of monitoring operation are described with reference to superimposed transients on pulses, it is pointed out that the same techniques may be employed to detect transient signals on waveshapes of other types. For example, transient pulses superimposed on direct current signals may be detected, and transient signals superimposed on AC signals may be detected.

A unique monitoring operation may be performed on a normally dead source such as the DC ground of the system under test 10. In this case the presence of a pulse signifies an error. This monitoring may be done in the compare mode. Any of the techniques described above may be employed. Triggering of the oscillator may be accomplished internally by the auto trigger, or externally by signals from the amplitude discriminator 15, or by operating the manual trigger 610 in FIG. 13. During the first sweep in the compare mode the upper and lower buffers have all of their stages set if the inverted output of the selected amplitude discriminator is used, or all of the stages remain reset if the normal output of the selected amplitude discriminator is used. Thereafter, the static display in the upper row 42 of the display 40 establishes the pattern against switch subsequent sweeps stored in the lower buffer may be compared. If a signal appears at the input of the selected amplitude discriminator which exceeds the clipping level, this represents a spurious pulse, and it is sampled and stored in the lower buffer. Consequently, the spurious signal is presented visually in the lower row 44 of the display 40. A compare error signal is generated, and it may be used to perform any of the options previously described.

Figure 33:
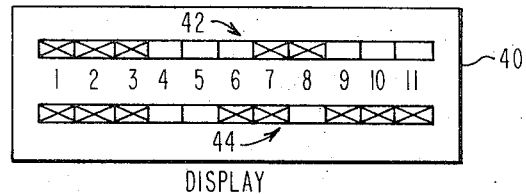
FIG. 33 illustrates the digital display of both of the signals shown in FIGS. 31A and 32A.

It is appropriate to point how a digital display may be interpreted to provide a variety of information. In FIG. 31B the pulse 1241 has a trailing edge which occurs in time window 3. The pulse 1243 in FIG. 32B likewise has a trailing edge which ocucrs in time window 3. By observing the display in FIG. 33 this is verified. Note that element 3 in the upper row and element 3 in the lower row are lighted. Since elements 4 in the upper and lower rows are not lighted, this signifies that the trailing edges of the signals 1214 and 1213 are substantially coincident in time. That is, they are coincident in the sense that both trailing edges occur within a specified time, and the accuracy is a function of the width of one time window. It is noted that the upper display element 6 in FIG. 33 is dark, and the lower display element 6 is lighted. This indicates that the leading edges of the signals 242 in FIG. 31B and 1344 in FIG. 32B are not coincident in time. It is noted that the upper element 8 in FIG. 33 is lighted, but the lower element 8 is not. This signifies that the trailing edge of the pulse 1242 in FIG. 31B occurs before the leading edge of the pulse 1245 in FIG. 32B. Further definition or measurement of real time can be achieved using the delay generator to shift the point where a sweep commences and thereby facilitate real time measurements within a window. For example, if it is desirable to measure the precise difference in time between the trailing edge of the pulse 1241 in FIG. 31B and the trailing edge of the pulse 1243 in FIG. 32B, this can be done by using the delay generator 155 in FIG. 4. Let it be assumed that the display mode switch 220 in FIG. 6 is set to the serial position, and the display source switch 260 in FIG. 7 is set to the dual position. The delay generator 155 in FIG. 4 is operated continuously by slowly changing the delay time potentiometer 161 in FIG. 4 to delay the commencement of a sweep with respect to the trigger pulse. This causes the pulse 1241 and the pulse 1242 in FIG. 31B to move slowly to the left. Also the pulse 1243, and associated pulses 1244 and 1245, move slowly to the left by the same amount of time delay. When the trailing edge of the pulse 1241 or the trailing edge of the pulse 1243 fails to light element 3, it is then apparent which of the trailing edges of the pulses 1241 or 1243 occurs first. The amount of the time delay is read from the calibrated delay time control 161 in FIG. 4. Let it be assumed that the delay added up to this point is equal to the value one microsecond. The time delay control 161 further is continuously adjusted to move the pulses 1241 and 1243 to the left until the trailing edge of the second one of these pulses fails to light element 3. This indicates that the trailing edge of the last pulse which fails to light element 3 is occurring during time window 2. The setting of the calibrated delay time control 161 in FIG. 4 is read again. Assume that it indicates 1.4 microseconds. By subtracting the first reading from the second reading of the calibrated dial of delay time control 161 the real time difference between trailing edges of the pulses 1241 in FIG. 31 and 1243 in FIG. 32B is 0.4 microseconds. Thus it is seen how a period of time which is less than one time window can be calculated by using the delay controls.

There are a number of options available in using the test instrument in FIG. 1 in the serial mode. For example, the upper buffer 22 in FIGS. 16 through 18 may be filled with data supplied in parallel from the parallel input source 833 in FIG. 16. Information from this source is supplied on lines 841 through 845 via a cable 834 to the set inputs of respective upper buffer stage 751 through 755. Also, information may be supplied in parallel from the parallel input source 933 in FIG. 19 on line 941 through 945 to the set input of respective stages 851 through 855 of the lower buffer 24 FIGS. 19 through 21. The parallel input sources 833 and 933 in FIGS. 16 and 19 may be utilized to insert data patterns in the upper and lower buffers respectively. A pattern may be inserted in the upper buffer where it is dynamically stored and presented on the display device 40 in the upper row 42 in FIGS. 25 and 26. The test instrument in FIG. 1 may be operated in the serial mode to select one of the amplitude discriminators to sample and store an incoming signal in the lower buffer for presentation in the lower row 44 of the display 40 in FIGS. 25 and 26. An operator visually may then compare the pattern of the incoming signal stored in the lower buffer with the pattern presented in parallel and stored in the upper buffer. Thus serial sampling stored in the lower buffer may be concurrent with the parallel setting of criteria patterns in the upper buffer. It should be noted that the visual comparisons may be substituted or augmented with the automatic comparison which takes place in the exclusive Or circuits 811 through 815. This automatic comparison takes place regardless of the mode of operation or the mode of display. If a compare error is generated by any exclusive Or circuit, it causes the Or circuit 830 in FIG. 18 to provide an output signal indicating the results of the comparison. The signal from the Or circuit 830 may be supplied to equipment not shown to signify the compare or lack of compare between the patterns supplied in parallel to the upper buffer and the patterns serially stored from the incoming signal in the lower buffer.

Alternatively, patterns may be supplied in parallel to the lower buffer 24 in FIGS. 19 through 21, and an incoming signal may be sampled serially and stored in the upper buffer 22 in FIGS. 16 through 18. Again signals from the Or circuit 830 in FIG. 18, indicating a compare or lack of compare, may be supplied to devices not shown. It is pointed out that information patterns stored in the stages 751 through 755 of the upper buffer in FIGS. 16 through 18 may be supplied on respective set output lines 801 through 805 via the cable 831 through the parallel output data register 832 in FIG. 26. Information in this register may be supplied to load devices not shown. Likewise, information patterns stored in the stages 851 through 855 of the lower buffer 24 in FIGS. 19 through 21 may be supplied on respective set output line 901 through 905 via the cable 910 to the parallel output data register 911 in FIG. 26. Information in this register may be supplied to load devices not shown.

In some instances it is desirable to use the parallel mode of operation. In the parallel mode information signals from the parallel input source 833 and information signals from the parallel input source 933 are used to fill the respective upper and lower buffers. In this case it is necessary to prevent the amplitude discriminators from supplying data signals to the upper buffer 22 and the lower buffer 24 as well as inhibit signals which might trigger the oscillator. This is easily accomplished by setting the coupling switch 1195 of each amplitude discriminator to the ground position. The display mode switch 220 in FIG. 6 is set to the parallel mode position. This grounds contact 1, 3, 4, 5, and 8 which deactivates the And circuits 221, 222 and 240 through 243 in FIG. 6 thereby further to prevent the transmission passage of any signals on the control lines 226 and 247 to the respective upper and lower buffers. Also, contact 2 of the display mode switch 220 in FIG. 6 is open, and this conditions the And circuit 464 in FIG. 11. Consequently, a positive signal from a remote device on the line 465 passes through the And circuit 464 to the Or circuit 463. The Or circuit 463 in turn responds to the positive input signal and supplies a negative output signal on the line 470 to perform a reset operation throughout the test instrument including desetting the latches in the upper buffer 22 and the lower buffer 24 in preparation for the reception of parallel data from the parallel input data sources 833 and 934 in respective FIGS. 16 and 19. Parallel signals supplied to the upper buffer and parallel signals supplied to the lower buffer may then be presented in the respective rows 42 and 44 of the display device 40 in FIGS. 25 and 26 for visual observation.

It is appropriate at this point to illustrate the operation of the test instrument in FIGS. 3 through 26 by a specific example. For this purpose let it be assumed that the various switches and controls in the gating and control circuits 20 of FIGS. 3 through 15 are set to the positions indicated in Table 7 below.

TABLE 7

| Switch or Control Device | FIG. No. | Position or Setting |
|---|---|---|
| 1195 | 3 | DC |
| 1207 | 3 | Resistor 1205 |
| 1211 | 3 | Terminal 1208 |

TABLE 7.—Continued

| 1202 | 3  | +1.5 volts         |
|------|----|--------------------|
| 131  | 4  | Any position       |
| 171  | 4  | Any position       |
| 160  | 4  | Any position       |
| 161  | 4  | Any position       |
| 190  | 5  | Stored             |
| 220  | 6  | Compare            |
| 260  | 7  | Input 1            |
| 320  | 8  | Compare            |
| 340  | 9  | Input 2            |
| 360  | 9  | Plus (+)           |
| 380  | 10 | No Delay           |
| 440  | 11 | Triggered          |
| 560  | 12 | Contact 541 (F1)   |
| 561  | 12 | 1.0 position       |
| 680  | 12 | Internal Oscillator |

Figure 37A:
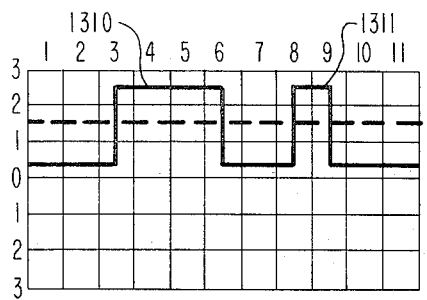
FIGS. 37A and 37B illustrate respectively an output signal from an smplitude discriminator and the resulting display.

In this illustration the test instrument in FIGS. 3 through 26 is operated in the compare mode with the amplitude discriminator 12 selected to supply the data signals for display and the amplitude discriminator 13 selected to supply a signal for triggering each sweep. The clipping level for each one of the amplitude discriminators 12 and 13 is set at +1.5 volts. It is assumed for purposes of illustration that the input signal to amplitude discriminator 12 for the first sweep is that shown in FIG. 36A and that during some subsequent sweep the input signal to amplitude discriminator 12 is that shown in FIG. 37A. A controlled stop is selected to take place when a compare error is found, and the pulse 1311 in FIG. 37A represents a spurious signal which causes a compare error to take place and cause a controlled stop. The oscillator frequency selected is F1 which is 10 MHz, and this makes each of the 20 time windows 50 nanoseconds. The total sweep is 20 × 50 which gives a total of 1,000 nanoseconds or 1 microsecond. Next the various steps in performing the foregoing events are described.

First, the manner of triggering a sweep in response to a trigger pulse from the amplitude discriminator 13 is described. A positive signal must be supplied to the input of the amplitude discriminator 13 which exceeds the clipping level of +1.5 volts. The output signal is taken from the normal output. That is, the switch 1211 in the amplitude discriminator 2 must be set to the normal position. Consequently, a positive output signal is supplied on the line 112 in FIG. 3 to the And circuit 344 in FIG. 9. This And circuit is conditioned because the trigger source switch 340 is set to the input 2 position, and the contact 4 is ungrounded. The positive signal on the line 112 thus is supplied to the Or circuit 346. This Or circuit responds to the positive input signal and supplies a negative output signal to the inverter 347 which in turn supplies a positive output signal to the upper input of the And circuit 348. Since the trigger slope switch 360 is set to the up or plus position, contact 3 is open, and this conditions the lower input to the And circuit 348. Therefore, the And circuit 348 supplies a positive pulse to the Or circuit 351 which in turn supplies a negative output signal on the line 352 to the inverter 413 in FIG. 10. This inverter supplies a positive output signal to the upper input of the And circuit 414. Since the trigger mode switch 440 in FIG. 11 is set to the triggered position, contact 5 is open, and this conditions the lower input to the And circuit 414 in FIG. 10. The And circuit 414, therefore, supplies a positive output signal to the Or circuit 416 which in turn supplies a negative output signal to the inverter 417. The negative going or leading edge of this output signal operates the inverter 417 to supply a negative output signal to the Or circuit 418. The Or circuit 418 responds to the negative input signal and supplies a positive output signal to the center input of the And circuit 383. Since the delayed triggering control switch 380 is set to the no delay position, contact 13 is open, and this conditions the upper input to the And circuit 383. The controlled stop latch 591 in FIG. 13 is in the reset state. It is pointed out that prior to commencing operations in the compare mode it is essential to reset all of the latches in the test instrument. This is done by operating the reset push-button switch 460 in FIG. 11, and the reset operation is performed in the manner previously explained. Since the controlled stop latch 591 is in the reset state, it supplies a positive signal to the lower input of the And circuit 383 in FIG. 10. Hence this And circuit supplies a positive output signal to the Or circuit 384 which in turn supplies a negative output signal to the inverter 385. The leading edge of this negative output signal operates the inverter 385 to supply a negative output signal to the inverter 386 which in turn supplies a positive output signal to the center input of the And circuit 613 in FIG. 14. The lower input to the And circuit 613 is a positive signal. It is pointed out that this line is positive at all times except when a reset operation is in process. The single shot 631 in FIG. 14 is in its stable state, and this causes a positive signal to be supplied to the Or circuit 632. The Or circuit 632 responds to a positive input signal and supplies a negative output signal to the inverter 633 provided the lower input to the Or circuit 632 has a + signal level. Since the start interlock latch is in the reset state, it supplies a positive output signal from the reset output on the line 655 to the Or circuit 632. Because the Or circuit 632 receives positive input signals on both of its inputs, it supplies a negative output signal. The inverter 633 responds to this negative signal and supplies a positive output signal to the upper input of the And circuit 613. Therefore, the And circuit 613 supplies a positive output signal to the Or circuit 614 which in turn supplies a negative signal to the set input of the ring start latch 615 thereby to set this latch. A positive output signal from the set output of the ring start latch 615 performs the following functions:

1. resets the latches 751 in FIG. 16 and 851 in FIG. 19 in the first stage of the upper and lower buffers, 2. condition the And circuit 961 of the element 1 latch 951 in FIG. 22 whereby this latch may be set by the first oscillator pulse, 3. turns on the oscillator 28 in FIG. 12, and 4. extends the period during which the triggered lamp 195 is lighted at the end of the sweep.

A negative signal is provided from the reset output of the ring start latch 615 in FIG. 14, and this negative signal performs the following functions:

1. resets the delay latch 174 in FIG. 5, 2. enables unblanking of the display 40 in FIGS. 25 and 26, and 3. turns on the triggered lamp 195 in FIG. 5 thereby to indicate that a sweep has been initiated.

Next the foregoing functions are described.

The positive signal from the ring start latch 615 operates the single shot 621 to provide a positive output signal on the line 565a to the And circuits 781 and 881 in respective FIGS. 16 and 19. This conditions one of the three inputs to each of these And circuits for the purpose of resetting the latches 751 and 851 in stage 1 of the upper and lower buffers. First, the And circuit 781 is considered. This And circuit receives a positive signal on the line 274 because the upper read in control latch 270 in FIG. 7 is in the reset state, and it supplies a negative signal from the set output which is inverted by the inverter 273 to a positive signal level on the line 274. A positive signal on the line 654 to the lower input of the And circuit 781 is provided by the reset output of the element 1 latch which is in the reset state at this time. Therefore, the And circuit 781 supplies a positive signal to the Or circuit 791 which in turn supplies a negative signal to the reset input of the latch 751 thereby to reset this latch. The positive signal on the line 654 from the reset output of the element 1 latch is supplied also to the And circuit 881 in FIG. 19. A positive signal to the upper input of the And circuit 881 is provided on the line 305 from the inverter 304 in FIG. 8 It is pointed out that this inverter supplies a constant positive signal on the line 305. Consequently, the And circuit 881 in FIG. 19 supplies a positive signal to the Or circuit 891 which in turn supplies a negative signal to the reset input of the latch 851 thereby to reset this latch. Thus it is seen how the latches 751 and 851 in respect to FIGS. 16 and 19 are reset by a positive signal from the set output of the ring start latch 615.

Next the setting of the element 1 latch is discussed. The positive signal from the set output of the ring start latch 615 on the line 565 is supplied to the And circuit 961 in FIG. 22. The center input to the And circuit 961 receives a positive signal on the line 655 from the reset output of the start interlock latch 653 in FIG. 14 because this latch is reset at this time. The And circuit 961 in FIG. 22 receives a positive signal on the line 694 when the first odd oscillator pulse arrives, and at that time the And circuit 961 supplies a negative output signal to the reset input of the element 1 latch thereby to reset this latch.

Next the operation of turning on the oscillator is considered. A positive signal from the set output of the ring start latch 615 on the line 565 is supplied to the oscillator 28 in FIG. 12, and this positive signal turns on the oscillator as previously explained. Since F1 of the oscillator is selected by the oscillator control switch 560, oscillator signals at a frequency of 10 MHz. are supplied through the Or circuit 686, the And circuit 684, the Or circuit 685, where this signal is distributed to the inputs of the delay circuit 686a and the inverter 687. The output of the delay circuit 686a produces the odd step pulses which are supplied through the inverter 688 on the line 694 to the ring circuit. The first odd oscillator pulse operates the And circuit 961 in the manner previously explained to set the element 1 latch 951. The even oscillator pulses are supplied by the inverter 687 through the inverter 689 on the line 695 to the ring circuit in FIGS. 22 through 24 as previously explained. The stepping of the ring circuit takes place to provide time windows to the latches of the upper and lower buffers as earlier explained. Thus it is seen how a sweep is initiated.

Next the negative signal from the reset output of the ring start latch 615 on the line 200 is discussed. This negative signal is supplied through the Or circuit 177 in FIG. 5 which in turn provides a negative output signal to the reset input of the delay latch 174 thereby to reset this latch. The negative signal on the line 200 is supplied also to the Or circuit 192 which in turn provides a positive output signal to the And circuit 191. Since the image control switch 190 is set to the stored position, contact 1 is open, and this conditions the lower input of the And circuit 191. Consequently, the And circuit 191 responds to positive signals on its input lines and supplies a negative output signal on the line 193 which operates the blank control 1142 in FIG. 26 to unblank the display 40 whereby signals stored in the upper and lower buffers may be visually displayed. It is pointed out that the image control switch 190 provides a constant ground level from contact 5 whenever this switch is placed in the stored position. Consequently, the ground potential is effective to operate the Or circuit 192 to provide a positive output signal as long as this switch remains in the stored position. This makes it unnecessary to utilize the negative output signal on the line 200 in this instance, but the negative signal on the line 200 is effective to unblank the display whenever the image control switch 190 is in the auto cleared position. The negative signal on the line 200 is supplied also to the Or circuit 194 in FIG. 5 which in turn supplies a negative signal from its output to the triggered lamp 195 thereby to illuminate this lamp.

It is pointed out in review of the foregoing sequence of operations that the test instrument is effective to initiate a sweep as soon as the oscillator is turned on. The oscillator is synchronized with the triggering pulse. It is important further to insure that a sweep once commenced proceeds until completion without interruption. This is accomplished by disabling the And circuit 961 of the element 1 latch 951 in FIG. 22 after this latch is set at the commencement of a sweep. This And circuit is disabled by the following sequence of events. As soon as the element 1 latch 951 is set, a negative signal from the reset output on the line 654 is supplied to the set input of the start interlock latch 653 in FIG. 14 thereby to set this latch. This causes a negative signal to be established on the reset output of the start interlock latch 653 on the line 655 to the center input of the And circuit 961. The negative signal on the line 655 deconditions the And circuit 961, and the negative level on the line 655 is maintained throughout the duration of the sweep. It is seen then that any odd oscillator pulse after the first one is ineffective to operate the And circuit 961 to set the element latch 951 during the remainder of the sweep.

However, the oscillator pulses following the first oscillator pulses are effective to step the subsequent stages of the ring circuit 26 in the manner previously explained. The first even oscillator pulse sets the element 2 latch 952. This establishes a positive signal on the set output line 1002 which conditions the And circuit 981 to pass the second odd oscillator pulse thereby to reset the element 1 latch 951. Thus the foregoing sequence of events describes how a positive signal at the input equal to or greater than the clipping level of the amplitude discriminator 13 in FIG. 3 is effective to initiate a sweep.

Described next is the manner in which the data signal supplied to the input of the amplitude discriminator 12 is propagated through the system of the test instrument to the upper buffer 22 and the lower buffer 24. Signals from the output of the amplitude discriminator 12 on the line 111 pass through the And circuit 260 in FIG. 7, the Or circuit 265, the inverter 266, and along the line 268 to the And circuits 222 and 241 in FIG. 6. These And circuits are conditioned to pass the input signals. The And circuit 222 passes the input signals through the Or circuit 223, the signal delay 224, the inverter 225 to the line 226. The And circuit 241 passes the input signals through the Or circuit 244, the signal delay circuit 245 and the Or circuit 246 to the line 247. Input signals on the lines 226 and 247 are supplied to the respective upper buffer 22 and the lower buffer 24. The sampled input signal is stored in the upper and lower buffers. Identical information is stored in each buffer during the first sweep. At the end of the first sweep the element 21 latch 956 is set, and a positive signal on the line 600 is supplied to the lower input of the And circuit 301 in FIG. 8. The upper input of the And circuit 301 is conditioned because the switch 220 in FIG. 6 is set to the compare mode, and contact 4 is open. Consequently, the And circuit 301 supplies a negative output signal which sets the first sweep end latch 300. A positive signal from the set output on the line 302 is supplied to the lower input of the And circuit 271 in FIG. 7. This And circuit receives a conditioning level on its upper input from the line 248 as explained above. Therefore, the And circuit 271 supplies a negative output signal which sets the upper read in control latch 270. This latch in turn supplies a positive output signal to the inverter 273 which in turn supplies a negative output signal on the control line 274 which inhibits changing the latches of the upper buffer in FIGS. 16 through 18. It is pointed out in conclusion that the content of the upper buffer stores the criterion pattern during the first sweep, and during subsequent sweeps the criterion pattern remains undisturbed in the upper buffer. Thus a static image is displayed in the upper row 42 of the display 40 during the second and subsequent sweeps. The signals stored in the upper and lower buffers are portrayed by the display device 40, and the presentation depicted in FIG. 36B represents the input signal depicted in FIG. 36A. It is assumed that the input signal shown in FIG. 36A is repetitively presented to the input of the amplitude discriminator 12 in FIG. 3. This signal is sampled and stored in the lower buffer 24 during each subsequent sweep. The content of the lower buffer is a dynamic storage, and it is regenerated during each subsequent sweep in response to the input signal. A comparison is made between the content of the upper buffer and the content of the lower buffer during each sweep by the exclusive Or circuits 811 through 815 in FIGS. 16 through 18. If the content of the upper buffer is unlike that of the lower buffer, a positive error signal is supplied through the Or circuit 830 on the line 52 to the And circuit 587 associated with the compare error latch 585.

If no compare error is indicated at the end of each sweep, then subsequent trigger signals from the amplitude discriminator 13 continue to initiate sweeps.

Let it be assumed that on a subsequent sweep the signal pattern illustrated in FIG. 37A is supplied to the amplitude discriminator 12 in FIG. 3. Since the input signal shown in FIG. 37A has a sporadic pulse 1311, this causes a compare error during such sweep. Described next are the events relating to the detection of an error by a mismatch between the content of the upper and the content of the lower buffer, the storage of the error signal, and the transmission of an error signal to the system under test 10.

Figure 37B:
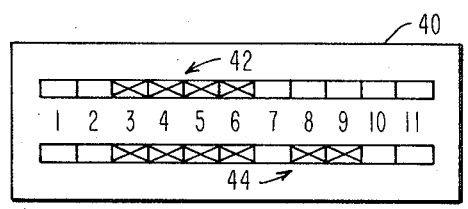

First, the detection of the sporadic pulse 1311 is described. When the signal shown in FIG. 37A is supplied to the lower buffer and stored, the display in the lower row 44 of the display device 40 assumes the pattern illustrated in FIG. 37B. It is readily seen by observation in FIG. 37B that elements 8 and 9 in the lower row 44 are lighted, and this represents a departure from the criterion pattern stored in the upper buffer and visually presented in the upper row 42 of the display 40 in FIG. 37B.

Described next are the events which take place at the end of the sweep during which the deviation occurs. A sweep is terminated by setting the element 21 latch 956 in FIG. 24. When the element 21 latch is set, a positive signal is supplied from the set output on the line 600 to the lower input of the And circuit 587 in FIG. 13. A positive signal is presented on the line 52 to the center input of the And circuit 587 whenever an error condition occurs as previously explained. The line 248 to the upper input of the And circuit 587 is conditioned because contact 4 of the display mode switch 220 in FIG. 6 is open. Consequently, the And circuit 587 supplies a negative output signal to the set input of the compare error latch 585 thereby to set this latch. A positive signal from the set output illuminates the compare error light 586. The positive signal from the set output is supplied also to the lower input of the And circuit 588. The upper input of this And circuit is conditioned because contact 3 of the controlled stop latch 320 in FIG. 8 is open. Therefore, the And circuit 588 supplies a negative output signal to the set input of the controlled stop latch thereby to set this latch. The controlled stop latch 591 supplies a positive output signal on the line 52a which illuminates the controlled stop light 592, and this positive signal is supplied also to the drive circuits 340 in FIG. 9. The drive circuits 340 in turn supply signals on the lines 121 and 122 to the system under test 10 in FIG. 3 where appropriate action may be taken as desired. The signals established on the lines 121 and 122 signify the existence of a compare error to the system under test 10 in this instance.

It is important at this point to preserve or freeze the criterion stored in the upper buffer and the error pattern stored in the lower buffer. In order to do this it is necessary to prevent further triggering operations by signals from the amplitude discriminator 13 in FIG. 3. This is accomplished in the following manner. The reset output of the controlled stop latch 591 in FIG. 13 is a negative signal which is supplied to the And circuit 381 through 383 in FIG. 10. This deconditions all of these And circuits and inhibits the passage of further triggering pulses. Thus it is seen in conclusion that by preventing any further triggering operations, the images in the upper and lower buffers are preserved. Further operations of the test instrument in FIG. 1 cannot take place until the reset push-button switch 460 in FIG. 11 is operated to perform a system reset. When the reset push-button switch 460 in FIG. 11 is operated to perform a system reset, subsequent monitoring operations may take place. The system, once set up in this fashion in the compare mode, monitors incessantly, and it automatically detects and retains sporadic pulse behavior for observation by the operator or analysis by the system under test 10. The search, compare, and retention of sporadic data, if found, is automatically performed merely by operating the reset switch 460 in FIG. 11 thereafter. This permits an operator to capture one or more samples of sporadic pulse behavior patterns and the criterion pattern against which they were compared. Moreover, two versions of the same pulse are available for analysis simultaneously. These are the criterion image and the random deviation pattern.

Discussed next are two aspects of display which assure visual observation of the indicators by an operator.

The devices affected are: (1) the triggered lamp 195 shown in FIG. 5 and (2) the display device 40 shown in FIG. 2. With respect to certain triggering and sweep conditions, discussed below, visual indication is enhanced to assure operator observation.

First, the extension of the duty cycle of the triggered lamp 195 shown in FIG. 5 is described. The conditions that cause an extremely short duty cycle (1) a very low repetition rate of the trigger signal from a selected amplitude discriminator shown in FIG. 3 and (2) with the ring circuit 26 shown in FIG. 2 running in the fastest sweep rate as controlled by oscillator range control switch 560 shown in FIG. 12. Referring now to Or circuit 194 in FIG. 5, it can be seen that the upper input, controlled of the ring start latch 615 in FIG. 14, assures that the triggered lamp 195 is stimulated for the duration of a sweep. If the duration of the sweep is extremely short, the triggered lamp 195 is on for an insufficient time to be observed by the operator. In the specific example chosen, the complete sweep is only 1 microsecond long. This is so short a time that it is beyond the range of normal visual perception. Referring to the lower input to Or circuit 194, it is seen that single shot 196 in FIG. 5 when timing out, provides an alternate stimulus to the triggered lamp 195. The input to the single shot 196 on the line 565 is under the control of the ring start latch 615 in FIG. 14. During the time that the sweep is in process, a plus potential is applied to the input of single shot 196. At the completion of a sweep, the loss of the positive potential on line 565 provides the required negative going transition to input of the single shot 196, thereby providing a negative pulse on its output which as previously stated activates the lower leg of Or circuit 194. The duration of this negative single shot output is adjusted to approximately 120 milliseconds, which is well within the range of visual observation by the human eye. In summary, it has been shown that an alternate circuit is provided to extend the duration of time that the triggered lamp 195 is on. Without this circuit, the duty cycle of lamp 195 is directly proportional to the duration of the sweep as reflected in the timing of the ring start latch 615 shown in FIG. 14. Extremely fast sweep rates which occur only occasionally, or at a low rep rate, are not indicated by the triggered lamp. Single shot 196 in FIG. 5 guarantees visual observation even under these worst-case conditions.

The manner in which this same circuit can extend the duration of signals displayed on the display panel 40 in FIGS. 25 and 26 is discussed next. Assume that the switch 190 in FIG. 5 is in the auto cleared position. When a sweep is initiated as reflected by the turning on of the ring start latch 615 in FIG. 14, the line 200 from the reset output of latch 615 is presented to the lower leg of Or circuit 192. The output of 192 is plus which is presented to And circuit 191. The output of And 191 changes to a minus condition which unblanks display 40 as previously explained. For the same reasons previously described, a very short duration sweep, results in a very short time during which display 40 is unblanked. This time could be extremely short and prevent operator observation of patterns occurring during the sweep. Referring now to single shot 196 shown in FIG. 5 it can be seen that the output of single shot 196 is connected to the input of Or circuit 192. The center leg of Or circuit 192 thus is changed to a minus condition at the completion of the sweep for the duration of single shot 196. This drives the output of Or circuit 192 into its plus state which conditions the upper leg of And circuit 191. Thus, line 193 is in a minus condition for 126 milliseconds following the completion of the sweep. For the foregoing examples it was assumed that the lower leg of And circuit 191 is in the plus conditioned state. It has been previously shown that contact 1 of the image control switch 190 is in the plus state when the switch is in the auto clear position. In review, the function of the single shot 196 primarily is to extend the duty cycle of both the triggered lamp 195 in FIG. 5 and display 40 shown in FIGS. 25 and 26. This assures visual observation by an operator under all conditions. The worst case is that of fast sweep speeds occurring only once or at a very low repetition rate.

Figure 42:
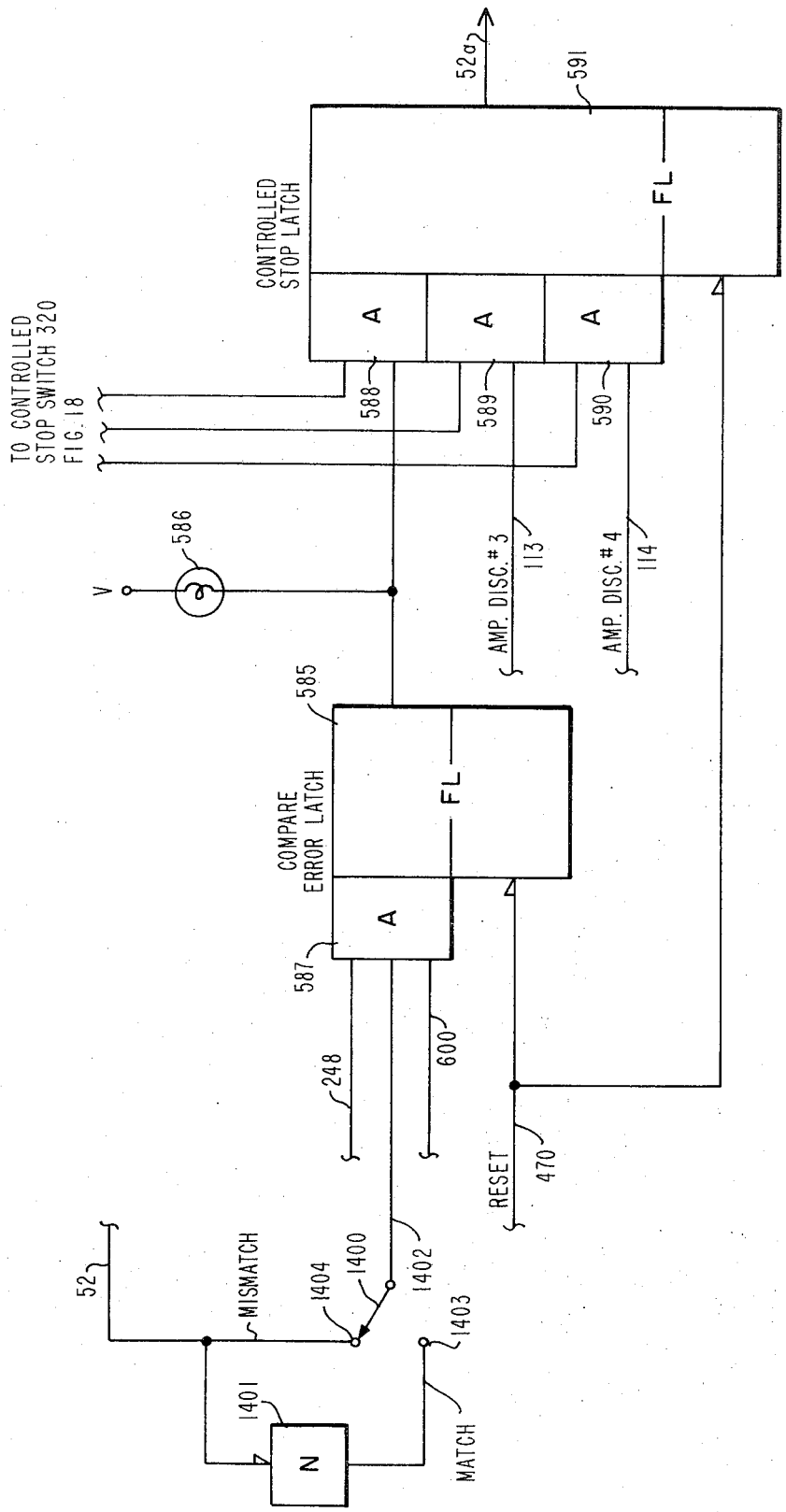
FIG. 42 illustrates a modification of the arrangement shown in FIG. 13 for utilizing the results of compare operations.

The field of trouble analysis is desirable at times to detect a lack of comparison between criterion patterns in the upper buffer and patterns of incoming data signals in the lower buffer. The lack of a comparison is detected and stored in the compare error latch 585 in FIG. 13 as previously explained. An alternative arrangement is illustrated in FIG. 42 which permits the compare error latch 585 to be set for a match or a mismatch condition of the two patterns stored in the upper and lower buffers. Referring to FIG. 42, the latches 585 and 591 together with their associated circuits are labelled with the same reference numerals as in FIG. 13. A switch 1400 and an inverter 1401 are added. The switch 1400 is connected via a line 1402 to the center input of the And circuit 587. The inverter 1401 is connected between the line 52 and a terminal 1403. When the switch 1400 is set as shown to engate a terminal 1404, a positive signal on the line 52, signifying a mismatch of data in the upper and lower buffers, is supplied via the line 1402 to the center input of the And circuit 587. If the lines 248 and 600 are conditioned, the And circuit 587 is operated to set the latch 585. A compare error is signified, and the sequence of events which follow take place in the manner explained above.

When the switch 1400 is changed to engage the terminal 1403, positive signals on the line 52, signifying a mismatch condition, are inverted by the inverter 1401, and the inverter supplies a negative signal via the line 1402 which deconditions the center input of the And circuit 587. When a negative signal appears on the line 52, signifying a match condition, the inverter 1401 responds to the negative input signal and supplies a positive output signal along the line 1402 to the center input of the And circuit 587. If the lines 248 and 600 are conditioned at this time, the And circuit 587 supplies a negative output signal to the set input of the latch 585 thereby to set this latch. The resulting positive signal from the set output of the latch 585 is used to light the indicator lamp 586. The positive signal from the set output of the latch 585 also conditions the lower input of the And circuit 588. If the upper input of the And circuit 588 is conditioned by the controlled stop switch 320 in FIG. 8, the And circuit 588 supplies a negative output signal which sets the latch 591. The resulting positive signal on the line 52a lights the indicator 592 in FIG. 13 and operates the device circuits 340 in FIG. 9. The drive circuits 340 in turn supply signals on the lines 121 and 122 to the device under test 10 in FIG. 3 to signify a match condition. Thus is is seen that the switch 400 in FIG. 42 permits an operator selectively to signal the device under test 10 either that a (1)

match condition of (2) a mismatch condition is found.

It is appropriate at this point to explain the use of the signal delay circuit 224 and the signal delay circuit 245 in FIG. 6. In some instances a single one of the amplitude discriminators 12 through 15 in FIG. 3 may be selected to provide data signals, and the leading edge of such data signals may be selected to trigger the sweeps. If input pulses of very short duration should appear at the input of the selected channel, it is possible that they might be able to trigger the sweep, but the signal might disappear before it can be sampled because of a finite time delay in initiating the sweep and starting the first sample or time window of the sweep. This is prevented by the signal delay circuits 224 and 245 in FIG. 6. These delay circuits serve to delay or store temporarily the data signals and present them to the upper and lower buffers at or slightly after the commencement of the first time window. Thus an image of a short pulse or sliver is captured if it is sufficient to trigger a sweep.

Figure 43:
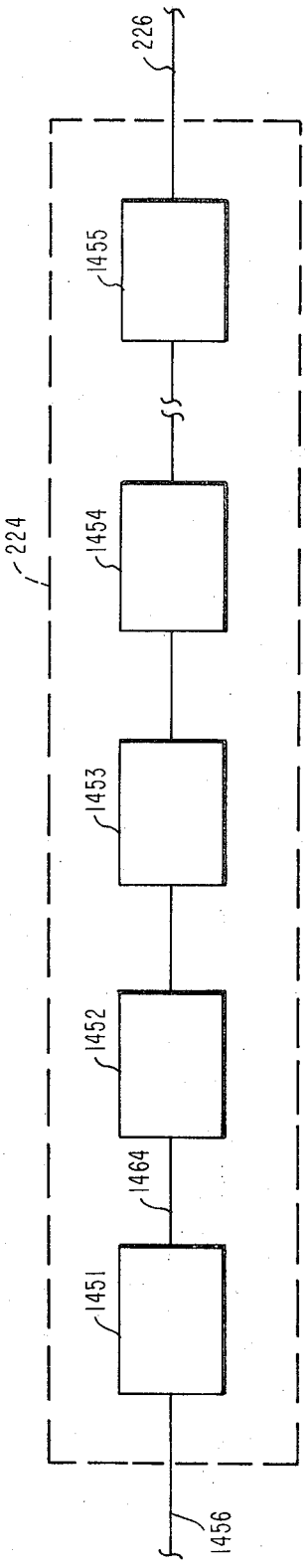
FIG. 43 illustrates in greater detail the signal delay element shown in FIG. 6.
Figure 44:
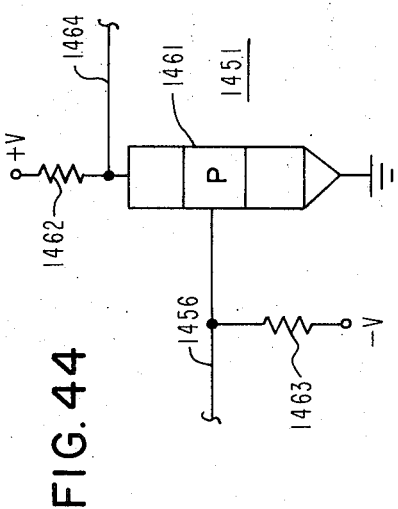
FIG. 44 illustrates in detail a circuit arrangement which may be used for each delay element shown in block form in FIG. 43.

The signal delay element 224 in FIG. 6 is shown in greater detail in FIGS. 43 and 44, and it is identical in construction to the signal delay element 245 in FIG. 6. The signal delay circuit 224 in FIG. 43 includes a plurality of delay elements 1451 through 1455 connected in series as shown. An input signal supplied on an input line 1456 passes through the delay elements 1451 through 1455. Each of the delay elements causes the input signal to be delayed a given amount of time. These delays are cumulative, and the total delay is equal to the sum of the delays in the individual delay elements.

Referring next to FIG. 44, the delay element 1451, shown in Block form in FIG. 43, is illustrated in detail. It includes a transistor 1461. The emitter of the transistor is grounded, and the collector is connected through a resistor 1462 to a positive source of potential. The input line 1456 is connected to the base. The base is connected through a resistor 1463 to a negative source of potential. A pulse supplied on the input line 1456 in FIG. 44 is supplied on an output line 1464. The output pulse is delayed a given amount of time with respect to the input pulse, and the polarity of the output pulse is opposite to that of the input pulse.

Figure 45:
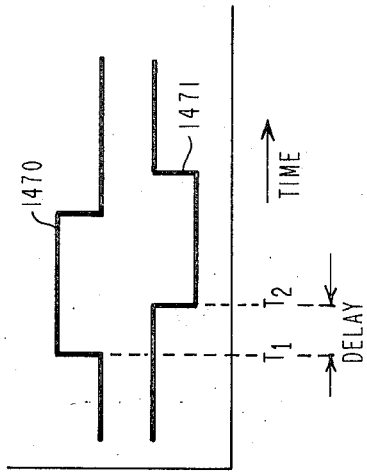
FIG. 45 is a timing diagram helpful in explaining the operation of the circuit shown in FIG. 44.

FIG. 45 illustrates an input pulse 470, and its leading edge occurs at time T1. An output pulse 1471 of opposite polarity has a leading edge which occurs at time T2. The difference between the times T1 and T2 represents the delay in transient through the transistor 1461 in FIG. 44. If the input pulse supplied on the line 1456 in FIG. 43 is a positive pulse, a positive pulse is supplied on the output line 226 provided there are an even number of delay elements in the delay circuit 224. If an inversion of polarity is desired, the delay circuit 224 is provided with an odd number of delay elements.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A test instrument including:
an amplitude discriminator,
an upper buffer and a lower buffer,
gating means disposed between said amplitude discriminator and said upper and lower buffers for selectively connecting said amplitude discriminator to the lower buffer only or to both said upper and lower buffers,
control means connected to said gating means for controlling the selection of the lower buffer only or both the upper and lower buffers,
first display means connected to said upper buffer for providing a visual display of the content of said upper buffer,
second display means connected to said lower buffer for making a visual presentation of the content of said lower buffer.

2. A test instrument including:
a plurality of amplitude discriminators,
an upper buffer and a lower buffer,
selection means connected to said plurality of amplitude discriminators, gating means connected to said selection means, said gating means being connected to said upper and said lower buffer,
a display device connected to said upper buffer and said lower buffer for providing a visual presentation of the content of the upper and lower buffers.

3. A test instrument including:
a plurality of amplitude discriminators,
an upper buffer and a lower buffer,
selection means connected to said plurality of amplitude discriminators for selecting said amplitude discriminators,
gating means connected between said selection means and said upper and lower buffers,
an oscillator connected to said gating means, first control means connected to said oscillator for operating said oscillator to provide a specified number of signals to said gating means,
a display device connected to said upper buffer and said lower buffer for making a visual presentation of the content of said upper and lower buffers.

4. A test instrument for analyzing signals, said test instrument including:
a plurality of amplitute discriminators, a device under test connected to said amplitude discriminators,
an upper buffer and a lower buffer, gating and control circuit means connected between said plurality of amplitude discriminators and said upper buffer and said lower buffer,
a display device connected to the upper buffer and the lower buffer for making a visual presentation of the content of the upper buffer and the lower buffer,
comparator means connected to the upper buffer and the lower buffer for comparing the content of the upper buffer with the content of the lower buffer, and
means connecting said comparator to said gating and control circuit means and the device under test whenever a predetermined condition is detected in the upper buffer and the lower buffer.

5. The apparatus of claim 4 wherein said gating and control circuit means includes first control means connected to the display device which blanks said display device at all times except when information signals are supplied to said test instrument.

6. The apparatus of claim 4 wherein signal delay means is connected between said amplitude discriminators and said upper and lower buffers.

7. The apparatus of claim 4 wherein said gating and control circuit means includes second control means which is selectively operated to inhibit operation of the upper buffer whereby a reference pattern may be stored therein and remain undisturbed.

8. A test instrument for analyzing signals, said test instrument including:
  a plurality of amplitude discrimiantors each having an input and an output, a device under test connected to supply signals to the input of said amplitude discriminators, each amplitude discriminator having an adjustable clipping level,
  first selection means connected to the output of said amplitude discriminators for selecting at least one of said amplitude discriminators,
  an upper buffer having a plurality of stages and a lower buffer plurality having a plurality of stages, gating means connected between said selection means and each stage of the upper buffer and each stage of the lower buffers
  an oscillator, a ring circuit having a plurality of stages, said oscillator being connected to said ring circuit, successive stages of said ring circuit being connected to the gating means of associated successive stages of the upper and lower buffers,
  a variable delay generator, second selection means connected between said plurality of amplitude discriminators and said variable delay generator for connecting a selected one of said amplitude discriminators to said variable delay generator, first control means connected between said variable delay generator and said oscillator, said variable delay generator responding to signals from a selected amplitude discriminator and subsequently operating said first control means to trigger said oscillator into operation, said oscillator providing signals to operate said ring circuit through one cycle of operation thereby to provide one sweep during which successive stages of said ring circuit operating said gating means thereby to sample the incoming signal at successive points and store the results in successive stages of the upper and lower buffers whereby data signals in different successive sample periods or time windows are stored in different stages of the upper and lower buffers, second control means connected between the ring circuit and the first control means for turning off the oscillator at the end of each sweep,
  a display device including an upper row of display elements and a lower row of display elements, means connecting the stages of the upper buffer to corresponding display elements in the upper row of display elements, and means connecting the stages of the lower buffer to corresponding display elements in the lower row of display elements, whereby the content of the upper buffer is visually displayed by the upper row of display elements and the content of the lower buffer is visually displayed by the lower row of display elements,
  comparator means connected between the stages of the upper buffer and the stages of the lower buffer, a first control latch, said comparator means being connected to the first control latch, said first control latch being operated by said comparator to indicate the result of the comparison, and
  a second control latch, third selection means connected to said second control latch, means connecting said first control latch to said third selection means, means connecting given ones of said amplitude discriminators to said third selection means, said third selection means being selectively operated to permit said second control latch to be operated by said first control latch or any selected one of said given amplitude discriminators, said second control latch being connected to said device under test and said first control means, whereby said second latch may be operated to signal the device under test and inhibit further triggering of the oscillator thereby to terminate operation of the test instrument at the end of such sweep.

9. The apparatus of claim 8 wherein the first control means includes a third control latch which is set by signals from the second selection means to trigger the oscillator on and is reset by signals from the second control means to turn off the oscillator at the end of each sweep.

10. The apparatus of claim 8 wherein each amplitude discriminator has an output switch which may be operated to supply normal or inverted output signals to the first selection means.

11. The apparatus of claim 8 wherein the first control latch includes switch means which permits the first control latch to be set by the comparator means for a match or mismatch condition between the signals stored in the upper and lower buffers.

12. The apparatus of claim 8 wherein the first selection means is operated to select two amplitude discriminators and signals from one amplitude discriminator are stored in the upper buffer and displayed in the upper row of display elements, and signals from the other amplitude discriminator are stored in the lower buffer and displayed in the lower row of display elements.

13. The apparatus of claim 8 further including image control means connected to the display device, and said image control including third control means for selectively operating said display device to be unblanked at all times, to be blanked at all times, or to be automatically blanked at all times except during a sweep.

14. The apparatus of claim 13 wherein the image control means further includes fourth control means for extending the time of operation of the display device at the end of each sweep whenever the image control means is operated by the third control means to blank the display automatically at the end of each sweep whereby visual persistence of the display elements may be extended to permit viewing by an operator after a high speed sweep.

15. The apparatus of claim 8 wherein a pair of run indicators are connected to the oscillator with each run indicator being energized alternately with signals from the oscillator, said run indicators being lighted with equally intensity when the oscillator signals are symmetrical or equal in duration and being lighted with different intensities when the oscillator signal are unsymmetrical or different in duration.

16. The apparatus of claim 8 further including third control means connected to the gating means and the ring circuit which permits signals from a selected amplitude discriminator to be stored in the stages of the upper buffer during one sweep and thereafter inhibits operation of the stages of the upper buffer whereby signal stored in the upper buffer are preserved as a reference pattern which is thereafter compared with incoming signals stored in the lower buffer during each subsequent sweep.

17. A test instrument for analyzing signals, said test instrument including:
a plurality of amplitude discriminators each having an input and an output, a device under test connected to supply signals to the input of said amplitude discriminators, each amplitude discriminator having an adjustable clipping level,
first selection means connected to the output of said amplitude discriminators for selecting at least one of said amplitude discriminators,
an upper buffer having a plurality of stages and a lower buffer plurality having a plurality of stages, gating means connected between said selection means and each stage of the upper buffer and each stage of the lower buffers,
an oscillator, a ring circuit having a plurality of stages, said oscillator being connected to said ring circuit, successive stages of said ring circuit being connected to the gating means of associated successive stages of the upper and lower buffers,
second selection means connected to said plurality of amplitude discriminators for selecting any one of said amplitude discriminators for a triggering operation, first control means connected between said second selection means and said oscillator, said first control means responding to signals equal to or greater than the clipping level of any selected amplitude discriminator to trigger said oscillator into operation, said oscillator providing signals to operate said ring circuit through one cycle of operation thereby to provide one sweep during which successive stages of said ring circuit operating said gating means thereby to sample the incoming signal at successive points and store the results in successive stages of the upper and lower buffers whereby data signals in different successive sample periods or time windows are stored in different stages of the upper and lower buffers, second control means connected between the ring circuit and the first control means for turning off the oscillator at the end of each sweep,
a display device including an upper row of display elements and a lower row of display elements, means connecting the stages of the upper buffer to corresponding display elements in the upper row of display elements, and means connecting the stages of the lower buffer to corresponding display elements in the lower row of display elements, whereby the content of the upper buffer is visually displayed by the upper row of display elements and the content of the lower buffer is visually displayed by the lower row of display elements,
comparator means connected between the stages of the upper buffer and the stages of the lower buffer, a first control latch, said comparator means being connected to the first control latch, said first control latch being operated by said comparator to indicate the result of the comparison, and
a second control latch, third selection means connected to said second control latch, means connecting said first control latch to said third selection means, means connecting given ones of said amplitude discriminators to said third selection means, said third selection means being selectively operated to permit said second control latch to be operated by said first control latch or any selected one of said given amplitude discriminators, said second control latch being connected to said device under test and said first control means, whereby said second latch may be operated to signal the device under test and inhibit further triggering of the oscillator thereby to terminate operation of the test instrument at the end of such sweep.

18. The apparatus of claim 17 wherein the first control means includes a third control latch which is set by signals from the second selection means to trigger the oscillator on and is reset by signals from the second control means to turn off the oscillator at the end of each sweep.

19. The apparatus of claim 17 wherein each amplitude discriminator has an output switch which may be operated to supply normal or inverted output signals to the first selection means.

20. The apparatus of claim 17 wherein the first control latch includes swtich means which permits the first control latch to be set by the comparator means for a match or mismatch condition between the signals stored in the upper and lower buffers.

21. The apparatus of claim 17 wherein the first selection means is operated to select two amplitude discriminators and signals from one amplitude discriminator are stored in the upper buffer and displayed in the upper row of display elements and signals from the other amplitude discriminator are stored in the lower buffer and displayed in the lower row of display elements.

22. The apparatus of claim 17 further including image control means connected to the display device, and said image control including third control means for selectively operating said display device to be unblanked at all times to be blanked at all times, or to be automatically blanked at all times except during a sweep.

23. The apparatus of claim 22 wherein the image control means further includes fourth control means for extending the time of operation of the display device at the end of each sweep whenever the image control means is operated by the third control means to blank the display automatically at the end of each sweep whereby visual persistance of the display elements may be extended to permit viewing by an operator after a high speed sweep.

24. The apparatus of claim 17 wherein a pair of run indicators are connected to the oscillator with each run indicator being energized alternately with signals from the oscillator, said run indicators being lighted with equally intensity when the oscillator signals are symmetrical or equal in duration and being lighted with different intensities when the oscillator signals are unsymmetrical or different in duration.

25. The apparatus of claim 17 further including third control means connected to the gating means and the ring circuit which permits signals from a selected amplitude discriminator to be stored in the stages of the upper buffer during one sweep and thereafter inhibits operation of the stages of the upper buffer whereby signal stored in the upper buffer serve as a reference pattern which is thereafter compared with signals stored in the lower buffer during each subsequent sweep.

26. The apparatus of claim 17 further including a signal delay circuit disposed between the first selection means and the gating means whereby signals from the first selection means are delayed before successive sampling operations commence.

27. The apparatus of claim 17 wherein the signal delay circuit includes a plurality of delay elements connect in series, and each delay element a transistor having a base, emitter, and collector, the base being connected to the collector of the transistor in the preceding delay element, the emitter being grounded, and the collector being connected to the base of the succeeding transistor.

28. The apparatus of claim 17 wherein the first means include slope selection means for selecting a plus slope or a minus slope of the signals from the second selection means to trigger the oscillator.

29. A test instrument for analyzing signals, said test instrument including:
a plurality of amplitude discriminators each having an input and an output, a device under test connected to supply signals to the input of said amplitude discriminators, each amplitude discriminator having an adjustable clipping level,
first selection means connected to the output of said amplitude discriminators for selecting at least one of said amplitude discriminators, signal delay means connected to said first selection means,
an upper buffer having a plurality of stages and a lower buffer plurality having a plurality of stages, gating means connected between said signal delay circuit and each stage of the upper buffer and each stage of the lower buffers,
an oscillator, a ring circuit having a plurality of stages, said oscillator being connected to said ring circuit, successive stages of said ring circuit being connected to the gating means of associated successive stages of the upper and lower buffers,
second selection means connected to said plurality of amplitude discriminators for selecting any one of said amplitude discriminators for a triggering operation, first control means connected between said second selection means and said oscillator, said first control means responding to input signal equal to or greater than the clipping level of the selected amplitude discriminator to trigger said oscillator into operation, said oscillator providing signals to operate said ring circuit through one cycle of operation thereby to provide one sweep during which successive stages of said ring circuit operating said gating means thereby to sample the incoming signal at successive points and store the results in successive stages of the upper and lower buffers whereby data signals in different successive sample periods or time windows are stored in different stages of the upper and lower buffers, second control means connected between the ring circuit and the first control means for turning off the oscillator at the end of each sweep,
a display device including an upper row of display elements and a lower row of display elements, means connecting the stages of the upper buffer to corresponding display elements in the upper row of display elements, and means connecting the stages of the lower buffer to corresponding display elements in the lower row of display elements, whereby the content of the upper buffer is visually displayed by the upper row of display elements and the content of the lower buffer is visually displayed by the lower row of display elements,
comparator means connected between the stages of the upper buffer and the stages of the lower buffer, third control means, said comparator means being connected to the third control means, said third control means being operated by said comparator to indicate the result of the comparison, and fourth control means, third selection means connected to said fourth control means, means connecting said third control means to said third selection means, means connecting given ones of said amplitude discriminators to said third selection means, said third selection means being selectively operated to permit said forth control means to be operated by said third control means or any selected one of said given amplitude discriminators, said fourth control means being connected to said device under test and said fourth control means being connected to said first control means to inhibit operation of the first control means when operated by said signals from the third selection means, whereby said fourth control means is operated to signal the device under test and inhibit further triggering of the oscillator thereby to terminate operation of the test instrument at the end of such sweep and preserve signals stored in the upper and lower buffers.

30. The apparatus of claim 29 wherein the first control means includes a start latch which is set by signals from the second selection means to trigger the oscillator on and is reset by signals from the second control means to turn off the oscillator at the end of each sweep.

31. The apparatus of claim 29 wherein each amplitude discriminator has an output switch which may be operated to supply normal or inverted output signals to the first selection means.

32. The apparatus of claim 29 wherein the third control means includes switch means which permits the third control means to be set by the comparator means for a match or mismatch condition between the signals atored in the upper and lower buffers.

33. The apparatus of claim 29 wherein the first selection means is operated to select two amplitude discriminators and signals from one amplitude discriminator are stored in the upper buffer and displayed in the upper row of display elements, and signals from the other amplitude discriminator are stored in the lower buffer and displayed in the lower row of display elements.

34. The apparatus of claim 29 further including image control means connected to the display device, and said image control including fifth control means for selectively operating said display device to be unblanked at all times, to be blanked at all times, or to be automatically blanked at all times except during a sweep.

35. The apparatus of claim 34 wherein the image control means further includes sixth control means for extending the time of operation of the display device at the end of each sweep whenever the image control means is operated by the fifth control means to blank the display automatically as the end of each sweep whereby visual persistence of the display elements may be extended to permit viewing by an operator after a high speed sweep.

36. The apparatus of claim 29 wherein a pair of run indicator are connected to the oscillator with each run indicator being energized alternately with signals from the oscillator, said run indicator being lighted with equally intensity when the oscillator signals are symmetrical or equal in duration and being light with different intensities when the oscillator signal are unsymmetrical or different in duration.

37. The apparatus of claim 29 further including fifth control means connected to the gating means and the ring circuit which permits signals from a selected amplitude discriminator to be stored in the stages of the upper buffer during one sweep and thereafter inhibits operation of the stages of the upper buffer whereby signal stored in the upper buffer are preserved as a reference pattern which is thereafter compared with incoming signals stored in the lower buffer during each subsequent sweep.

38. A test instrument for analyzing signals, said test instrument including:
a plurality of amplitude discriminators each having an input and an output, a device under test connected to supply signals to the input of said amplitude discriminators, each amplitude discriminator having an adjustable clipping level, each amplitude discriminator responding to input signals equal to or greater than the clipping level to provide an output signal having an up level, each amplitude discriminator responding to input signals less than the clipping level to provide an output signal having a relatively lower level,
first selection means connected to the output of said amplitude discriminators for selecting at least one of said amplitude discriminators, signal delay means connected to said first selection means,
an upper buffer having a plurality of stages and a lower buffer plurality having a plurality of stages, gating means connected between said signal delay circuit and each stage of the upper buffer and each stage of the lower buffers,
an oscillator, a ring circuit having a plurality of stages, said oscillator being connected to said ring circuit, successive stages of said ring circuit being connected to the gating means of associated successive stages of the upper and lower buffers,
second selection means connected to said plurality of amplitude discriminators for selecting any one of said amplitude discriminators for a triggering operation, first control means connected between said second selection means and said oscillator, said first control means responding to input signal equal to or greater than the clipping level of the selected amplitude discriminator to trigger said oscillator into operation, said first control means including variable delay means which may be selectively operated manually to delay a triggering operation, said oscillator providing signals to operate said ring circuit through one cycle of operation thereby to provide one sweep during which successive stages of said ring circuit operate said gating means thereby to sample the incoming signal at successive points and store the results in successive stages of the upper and lower buffers whereby data signals in different successive sample periods or time windows are stored in different stages of the upper and lower buffers, second control means connected between the ring circuit and the first control means for turning off the oscillator automatically at the end of each sweep,
a display device including an upper row of display elements and a lower row of display elements, means connecting the stages of the upper buffer to corresponding display elements in the upper row of display elements, and means connecting the stages of the lower buffer to corresponding display elements in the lower row of display elements, whereby the content of the upper buffer is visually displayed by the upper row of display elements and the content of the lower buffer is visually displayed by the lower row of display elements,
comparator means connected between the stages of the upper buffer and the stages of the lower buffer, for indicating a match condition of the content of the upper and lower buffers, third control means, said comparator means being connected to the third control means, said third control means being operated by said comparator to indicate the result of the comparison performed by the comparator, fourth control means, third selection means connected to said fourth control means, means connecting said third control means to said third selection means, means connecting given ones of said amplitude discriminators to said third selection means, said third selection means being selectively operated to permit said fourth control means to be operated by said third control means or any selected one of said given amplitude discriminators, said fourth control means being connected to said first control means to inhibit operation of the first control means when operated by said signals from the third selection means, whereby said fourth control means is operated to signal the device under test and inhibit further triggering of the oscillator thereby to terminate operation of the test instrument at the end of such sweep and preserve signals stored in the upper and lower buffers.

39. The apparatus of claim 38 wherein the first control means includes a start latch which is set by signals from the second selection means to trigger the oscillator on and is reset by signals from the second control means to turn off the oscillator at the end of each sweep.

40. The apparatus of claim 39 wherein each amplitude discriminator has an output switch which may be operated to supply normal or inverted output signals to the first selection means.

41. The apparatus of claim 40 wherein the third control means includes switch means which permits the third control means to be set by the comparator means for a match or mismatch condition between the signals stored in the upper and lower buffers.

42. The apparatus of claim 41 wherein the first selection means is operated to select two amplitude discriminators and signals from one amplitude discriminator are stored in the upper buffer and displayed in the upper row of display elements, and signals from the other amplitude discriminator are stored in the lower buffer and displayed in the lower row of display elements.

43. The apparatus of claim 42 further including image control means connected to the display device, and said image control including fifth control means for selectively operating said display device to be unblanked at all times, to be blanked at all times, or to be automatically blanked at all times except during a sweep.

44. The apparatus of claim 43 wherein the image control means further includes sixth control means for extending the time of operation of the display device at the end of each sweep whenever the image control means is operated by the fifth control means to blank the display automatically at the end of each sweep whereby visual persistence of the display elements may be extended to permit viewing by an operator after a high speed sweep.

45. The apparatus of claim 44 wherein a pair of run indicators are connected to the oscillator with each run indicator being energized alternately with signals from the oscillator, said run indicators being lighted with equally intensity when the oscillator signals are symmetrical or equal in duration and being lights with different intensities when the oscillator signal are unsymmetrical or different in duration.

46. The apparatus of claim 45 further including seventh control means connected to the gating means and the ring circuit which permits signals from a selected amplitude discriminator to be stored in the stages of the upper buffer during one sweep and thereafter inhibits operation of the stages of the upper buffer whereby signal stored in the upper buffer are preserved as a reference pattern which is thereafter compared with incoming signals stored in the lower buffer during each subsequent sweep.

47. The apparatus of claim 38 wherein the first selection means is operated to select two amplitude discriminators, and signals from one amplitude discriminator are stored in the upper buffer and displayed in the upper row of display elements, and signals from the other amplitude discriminator are stored in the lower buffer and displayed in the lower row of display elements, display elements in the upper row of display elements being illuminated whenever the input signal to the one amplitude discriminator equals or exceeds the clipping level of the one amplitude discriminator, and display elements in the lower row of display elements being illuminated when the input signals to the other amplitude discriminator equal or exceed the clipping level of such other amplitude discriminator.

48. The apparatus of claim 38 wherein said first control means further includes an internal source of trigger pulses which may be employed to trigger the oscillator whenever triggering signals are not available from the second selection means.

49. The apparatus of claim 38 further including a first external source of digital data signals connected to supply such signals in parallel to the stages of the upper buffer, a second external source of digital data signals connected to supply such signals in parallel to the stages of the lower buffer, whereby the upper and lower buffers selectively may be loaded with digital data signals representing reference patterns.

50. The apparatus of claim 38 wherein said first control means includes fifth control means selectively connected to one of said amplitude discriminators for receiving external oscillator pulses, said fifth control means being connected to operate said ring circuit whereby said test instrument may be operated by oscillator signals from a remote location.

51. The apparatus of claim 38 wherein reset means is provided to reset all controls and all stages of the ring circuit, the upper buffer, and the lower buffer, said reset means including a first input and a second input, manually operable means connected to the first input for resetting the test instrument, responding to signals and said second input on a line from a remote location to reset the test instrument.

* * * * *